US007531708B2

(12) United States Patent
Carson et al.

(10) Patent No.: US 7,531,708 B2
(45) Date of Patent: May 12, 2009

(54) MEDIATED ELECTROCHEMICAL OXIDATION FOR DECONTAMINATION

(75) Inventors: Roger W. Carson, Vienna, VA (US); Bruce W. Bremer, Franklin, MA (US)

(73) Assignee: Scimist, Inc., Springfield, VA (US)

( * ) Notice: Subject to any disclaimer, the term of this patent is extended or adjusted under 35 U.S.C. 154(b) by 819 days.

(21) Appl. No.: 10/522,768

(22) PCT Filed: Jul. 29, 2003

(86) PCT No.: PCT/US03/23491

§ 371 (c)(1),
(2), (4) Date: Mar. 4, 2005

(87) PCT Pub. No.: WO2004/012206

PCT Pub. Date: Feb. 5, 2004

(65) Prior Publication Data

US 2006/0016689 A1 Jan. 26, 2006

Related U.S. Application Data

(60) Provisional application No. 60/398,808, filed on Jul. 29, 2002.

(51) Int. Cl.
A62D 3/00 (2007.01)
(52) U.S. Cl. .................................. 588/312; 588/900
(58) Field of Classification Search .................. 588/312, 588/405, 410, 900
See application file for complete search history.

(56) References Cited

U.S. PATENT DOCUMENTS

| 4,013,552 A | 3/1977 | Kreuter |
| 4,069,371 A | 1/1978 | Zito |
| 4,749,519 A | 6/1988 | Koehly et al. |
| 4,752,364 A | 6/1988 | Dhooge |
| 4,874,485 A | 10/1989 | Steele |
| 4,925,643 A | 5/1990 | Steele |
| 4,967,673 A | 11/1990 | Gunn |
| 5,047,224 A | 9/1991 | Dhooge |
| 5,261,336 A | 11/1993 | Williams |
| 5,380,445 A | 1/1995 | Rivard et al. |
| 5,516,972 A | 5/1996 | Farmer |
| 5,707,508 A | 1/1998 | Surma et al. |
| 5,756,874 A | 5/1998 | Steward |
| 5,810,995 A | 9/1998 | Soilleux et al. |
| 5,855,763 A | 1/1999 | Conlin et al. |
| 5,911,868 A | 6/1999 | Balazs et al. |
| 5,919,350 A | 7/1999 | Balazs et al. |
| 5,952,542 A | 9/1999 | Steele |
| 5,968,337 A | 10/1999 | Surma |
| 6,402,932 B1 | 6/2002 | Bremer et al. |

FOREIGN PATENT DOCUMENTS

| DE | 4113817 | 11/1991 |
| DE | 4205739 | 8/1993 |
| WO | WO97/15356 | 1/1997 |

OTHER PUBLICATIONS

Chiba et al.; *Mediated Electrochemical Oxidation as an Alternative to Incineration for Mixed Wastes*; Lawrence Livermore National Laboratory Paper (UCRL-JC-119133) prepared for WM95 Synposia, Tucson, AZ, Mar. 1, 1995 (dated Feb. 1995) (12 pages).
Davidson, L. et al.; *Ruthenium-Mediated Electrochemical Destruction of Organic Wastes*; Platinum Metal Reviews; 1998; vol. 42, No. 3; pp. 90-98 (Ruthenium).
Morrison, R. & Boyd, R. (Editors); *Organic Chemistry*; New York University; Allen & Bacon, Inc.; 1973; (Third Edition); Chapter 1—Structure & Properties; pp. 1-2 (Organic).
Pletcher, D. & Walsh, F.; *Industrial Electrochemistry*; 1990; Chapman & Hall; Chapters 1 & 2; pp. 1-172.
Surma et al.; *Catalyzed Electrochemical Oxidation (CEO) of Rocky Flats Contaminated Combustible Materials*; Mar. 1996; Report prepared for U.S. Department of Energy, Pacific Northwest National Laboratory, Richland, WA; 25 pages.
Steward Tony; *Electrochemical Oxidation of Hazardous Organics*; Sep. 20, 1996; EO Systems, Inc.; 2 pages.
Whaley, S.; *UNR Attacks Hazardous Waste Riddle*; Las Vegas Review-Journal Oct. 21, 1997; 3 pages.
Lewis, R.; *Hawley's Condensed Chemical Dictionary*; Twelfth Edition; 1993; Van Nostrand—Reinhold; 4 pages.
Anonymous; *Chemical Storage Tank Systems—Good Practice Guide (Summary Guidance Document)*; CIRIA Publication WO02; Classic House, 174-180 Old Street, London, EC1V-9BP, England. 43 pages.

*Primary Examiner*—Edward M Johnson
(74) *Attorney, Agent, or Firm*—James Creighton Wray

(57) ABSTRACT

A mixed waste mediated electrochemical oxidation process (MEO) process and apparatus for the dissolution of transuranic elements, and/or compounds thereof in transuranic waste, low level waste (LLW), low level mixed waste, special case waste, and greater than class C LLWS, and also the destruction of the non-fluorocarbon organic component in the waste. The MEO process and apparatus operates in three different modes: dissolution, destruction, and decontamination. In the first mode, dissolution, the process runs until the transuranics such as a mixed oxide or carbide, and/or mixture of oxides or carbides of uranium and plutonium are totally dissolved into solution. The second mode, destruction, the process is operated such that the mixed waste materials are reduced to $CO_2$, water and small amounts of inorganic salts. The third mode, decontamination, involves contaminated equipment. In the decontamination mode the MEO process destroys the mixed wastes that have contaminated the equipment.

23 Claims, 7 Drawing Sheets

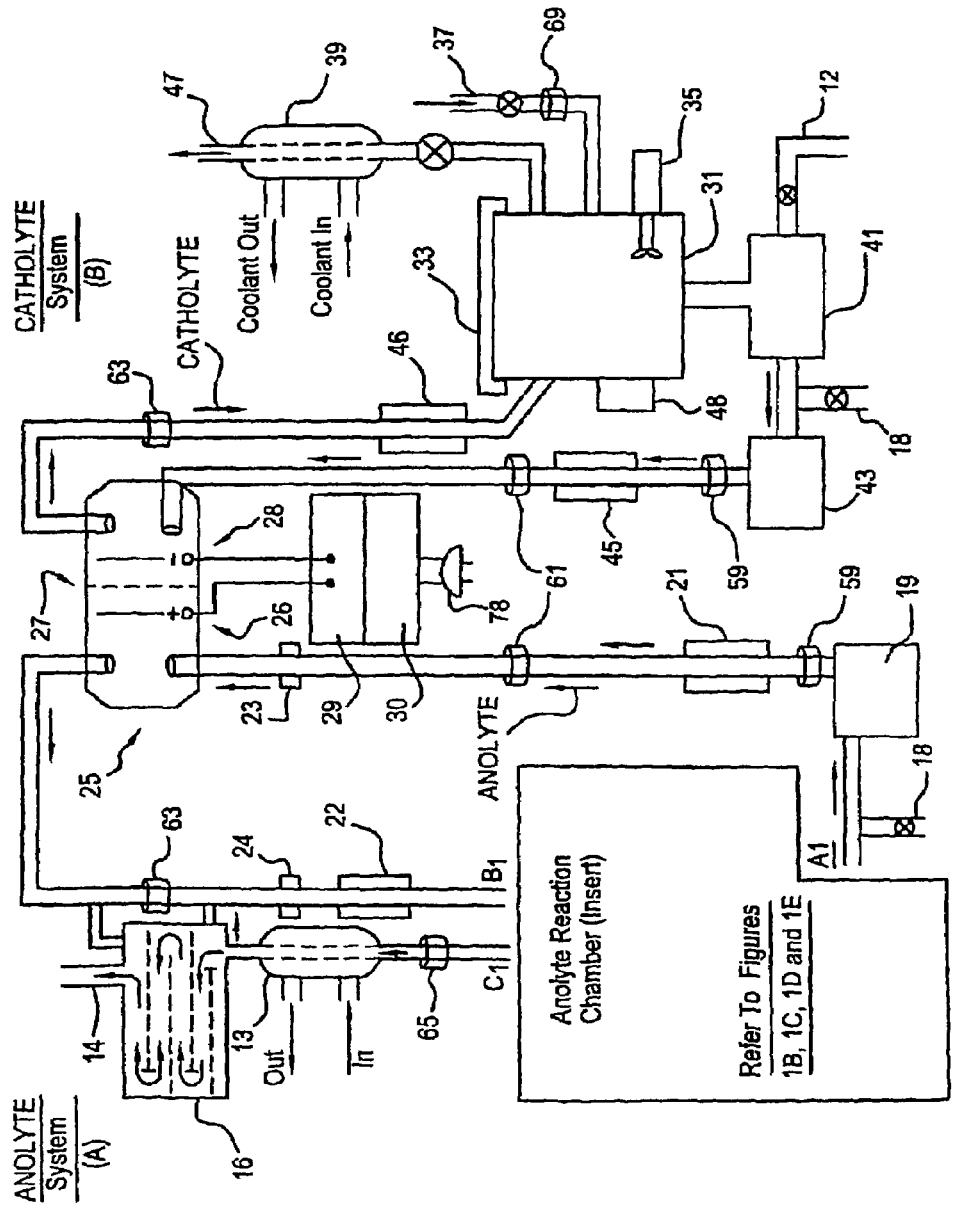

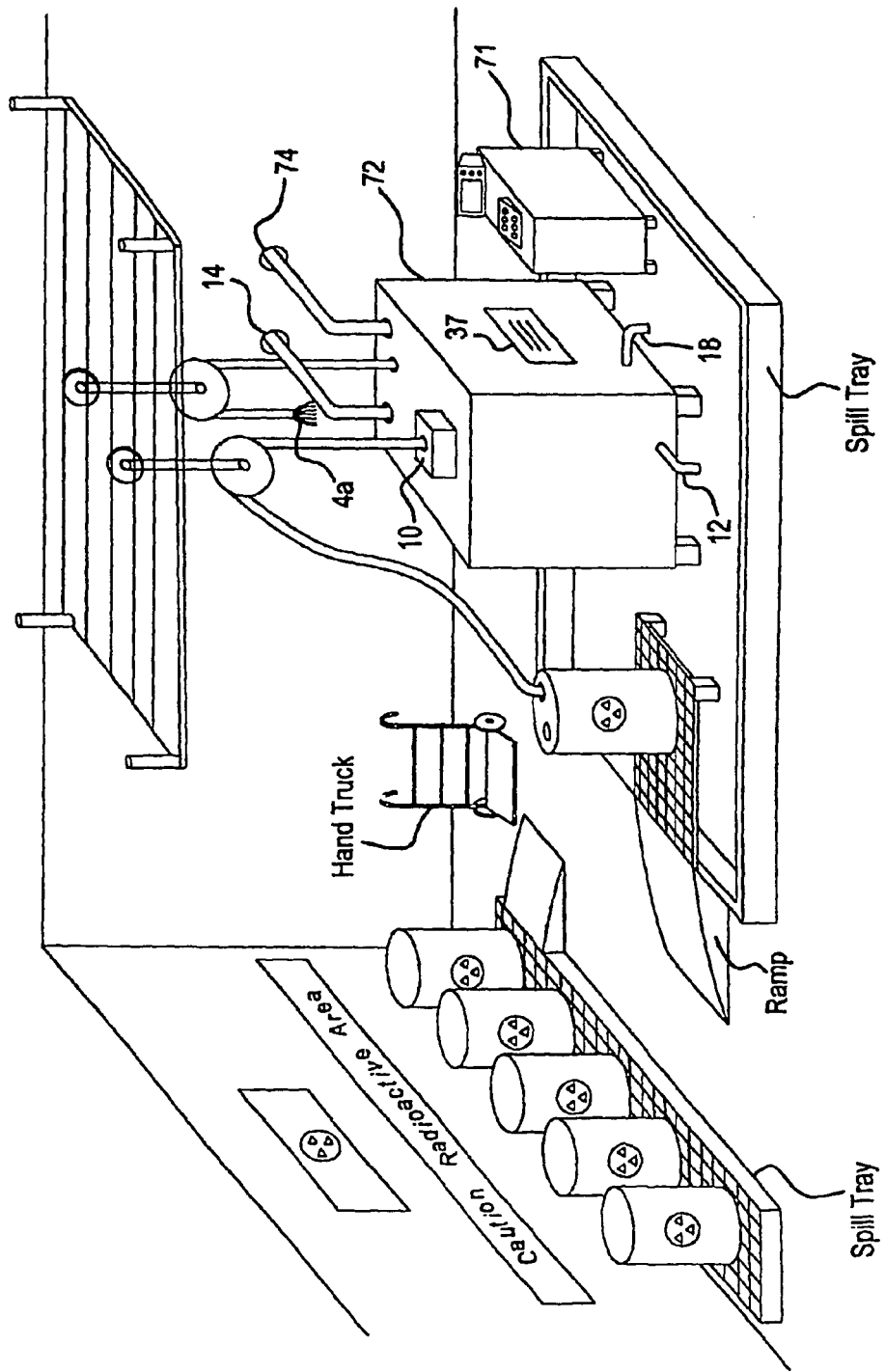

MEDIATED ELECTROCHEMICAL OXIDATION FOR DECONTAMINATION

This application claims the benefit of U.S. Provisional Application No. 60/398,808, filed Jul. 29, 2002 and PCT Application No. PCT/US2003/023491, filed Jul. 29, 2003.

U.S. Provisional Application No. 60/398,808, filed Jul. 29, 2002, PCT Application No. PCT/US2003/023491, filed Jul. 29, 2003, U.S. Ser. No. 10/628,720, filed Jul. 28, 2000, now U.S. Pat. No. 6,402,932, PCT Application No. PCT/US03/02151, filed Jul. 23, 2004, now U.S. Ser. No. 10/502,439, PCT Application No. PCT/US03/02152, filed Jul. 23, 2004, now U.S. Ser. No. 10/502,324, U.S. Ser. No. 10/512,484, filed Oct. 26, 2004, U.S. Ser. No. 10/492,017, filed Apr. 8, 2004, U.S. Provisional Application No. 60/285,708, filed Apr. 23, 2002, now U.S. Ser. No. 10/127,604, PCT Application No. PCT/US03/02153, filed Jul. 23, 2004, now U.S. Ser. No. 10/502,323, U.S. Provisional Application No. 60/327,005, filed Oct. 4, 2002, now U.S. Ser. No. 10/263,810, and U.S. Ser. No. 10/493,500, filed Aug. 4, 2004 are hereby incorporated by reference in their entirety.

FIELD OF THE INVENTION

This invention relates generally to the use of a Mediated Electrochemical Oxidation process and apparatus for: (a)the dissolution of transuranic elements (e.g., plutonium, neptunium, americium, curium, and californium), and/or compounds thereof in transuranic waste (TRUW), low level waste (LLW), low level mixed waste (LLMW), special case waste (SCW), and greater than class C (GTCC) LLW's;. (b) the destruction of the non-fluorocarbon organic component in these waste types; and (c) the decontamination of transuranic/actinide contaminated equipment.

These various waste forms are defined as follows:

Transuranic Waste—TRUW is waste containing more than 100 nanocuries per gram of alpha-emitting transuranic isotopes, with half lives greater than 20 years, except for (a) high-level waste (HLW), (b) waste that the Department of Energy (DOE) has determined, with the concurrence of the U.S. Environmental Protection Agency (EPA), does not need the degree of isolation required by 40CFR 191, or (c) waste the U.S. Nuclear Regulatory Commission (NRC) has approved for disposal on a case by case basis in accordance with 10CFR 61. TRUW has radioactive components such as plutonium, with lesser amounts of neptunium, americium, curium, and californium, and/or compounds thereof, and may also contain hazardous waste (HW) components subject to the Resource Conservation and Recovery Act (RCRA) (42USC 6901 et seq.).

High Level Waste—HLW is the highly radioactive waste material that results form the reprocessing of spent nuclear fuel, including liquid waste produced directly from reprocessing and any solid waste derived from the liquid that contains a combination of transuranic and fission product nuclides in quantities that require permanent isolation. High level waste may include other highly radioactive material that the NRC, consistent with existing law, determines by rule requires permanent isolation.

Hazardous Waste—HW is defined under the RCRA (42USC 6901 et seq.) as a solid waste, or combination of solid wastes, which because of its quantity, concentration, or physical, chemical, or infectious characteristics may (a) causes or significantly contribute to an increase in mortality or an increase in serious irreversible, or incapacitating reversible, illness or (b) pose a substantial present or potential hazard to human health or the environment when improperly treated, stored, transported, disposed or, or otherwise managed. RCRA defines a "solid" waste to include solid, liquid, semi-solid, or contained gaseous materials. By definition HW alone contains no radioactive components.

Low Level Waste—LLW includes all radioactive waste that is not classified as HLW, TRUW, spent nuclear fuel, or byproduct tailings containing uranium or thorium from processed ore (as defined in Section 11(e)(2) of the Atomic Energy Act (AEA) of 1954 [42USC 2011 et seq.]). Test specimens of fissionable materials irradiated for research and development only, and not for the production of power or plutonium may be classified as LLW provided the concentration of transuranics is less than 100 nanocuries per gram of waste. Most LLW consists of relatively large amounts of non-RCRA controlled waste materials contaminated with small amounts of radio nuclides, such as contaminated equipment (e.g., glove boxes, ventilation ducts, shielding, and laboratory apparatus, etc.), protective clothing, paper, rags, packing material, ion exchange resins, and solidified sledges.

Low Level Mixed Waste—LLMW contains both hazardous waste (HW) components subject RCRA (42USC 6091 et seq.) and low-level radioactive waste (LLW) components subject to the AEA of 54 (42USC 2011, et seq.).

Special Case Waste—SCW is radioactive waste owned or generated by DOE that does not fit into typical management plans developed for the major radioactive waste types (e.g., HLW, LLW, LLMW, TRUW, etc.). For example, LLW that because of its high radioactivity levels cannot currently be disposed of at existing DOE LLW disposal facilities without exceeding their performance standards and TRUW that cannot meet geological disposal acceptance criteria are SCW.

Greater Than Class C LLW—GTCC LLW is waste that exceeds the Nuclear Regulatory Commission (NRC) radio-isotope concentration limits for Class C LLW as specified in 10CFR 61, and thus exceeds the limits for shallow land burial. Commercial GTCC LLW includes, but is not limited to, activated metals, process wastes, other contaminated solids generated from the operation of commercial nuclear power plants, and radioactive materials that are used in mineral exploration and as part of medical treatments.

Henceforth all the aforementioned waste forms, except HLW and HW, shall be collectively referred to as "mixed waste".

The following documents are added to the definition sp as to further clarify the scope and definition or mixed waste as any waste that is considered by any of, but not limited to, the following statutes and regulation:

10 CFR 20 Chapter I Nuclear Regulatory Commission, Subpart K, 20.2005 Disposal of Specific Waste 10 CFR 20 Chapter I Nuclear Regulatory Commission, Part 20 Standard for Protection Against Radiation, Subpart A-general Provisions, Sec 20.1003 definitions 10 CFR 20 Chapter I Nuclear Regulatory Commission, Licensing requirements for Land Disposal of Radioactive Waste, Sec 61.55 Waste Classification 32 CFR 627 Bio Defense Safety Program technical Safety Regulations, Sec 627.34 Disposal In addition to the aforementioned treatment of mixed waste, this invention relates to a process and apparatus for the dissolution of transuranic elements in mixed oxides, carbides, and nitrides formed by their co-precipitation, mechanical mixing, etc. with similar uranium compounds.

The MEO process and apparatus operates in three different modes; dissolution, destruction, and decontamination. When non-radioactive materials are combined in the same waste they are henceforth referred to as mixed waste. The principle component of mixed waste of concern in this patent is the organic materials that are contaminated with radioactive compounds. In the first mode (dissolution) the process runs until the transuranics (such as a mixed oxide or carbide, and/or mixture of oxides or carbides of uranium and plutonium) are totally dissolved into solution. The second mode (destruction) the process is operated such that the mixed waste materials are reduced to a $CO_2$, water and small amounts of inorganic salts.

The third mode (decontamination) involves contaminated equipment, instruments, glassware, containers (e.g., 50 gallon drums, etc.) and materials. In this mode the MEO process destroys the mixed wastes that have contaminated them and places the transuranic/transuranic/actinides into solution.

The basis of the process is a mediated electrochemical oxidation process in which one or more regenerable oxidizing redox couples (specified in Tables I and II) interact with the mixed waste to decompose it. The oxidizers are present in electrolytic solutions that are acidic, alkaline, or neutral, operating in the temperature range of just above the freezing point and just below the boiling point temperatures of the electrolyte and at ambient atmosphere pressure. The process is an improvement over the state of the art relative to oxidizers and electrolytes represented in existing patented processes and apparatus.

BACKGROUND OF THE INVENTION

Mixed waste is a growing problem for today's technological society. The mixed waste generated by our Federal government and local electrical utilities sector is an increasing burden on these activities as well as a concern for the whole country in general.

The cost of disposing of mixed waste or transuranic/actinides in the U.S. are a multi-billion dollar per year program. The Department of Energy report *Current and Planned Low-Level Waste Disposal Capacity Report Revision* 1, Sep. 18, 1998 estimates the volume of low-level and mixed waste to be approximately 8.1 billion cubic feet during the period 1998 to 2070. All companies and institutions and businesses that generate and handle this category of waste or transuranic/actinides must provide safe, effective and preferably, inexpensive disposal of the waste or transuranic/actinides. In recent years there has been increasing concern over the disposal of mixed waste and/or transuranic/actinides. The principle method for the handling of this mixed waste and/or transuranic/actinides are self-storage or transportation to other facilities. The NRC and DOE have issued new regulations that require very stringent levels of control and maintenance of the storage facilities. The new regulations will, for practical purposes, require major modifications to almost all such storage facilities in the foreseeable future. Storage and transportation facilities have already begun to limit acceptance of mixed waste and/or transuranic/actinides, especially if it is from other then their own existing relationships Processes based on the use of silver, cobalt, cerium and peroxysulfate have been proposed, but each has severe limitations.

Research into the application of the MEO process to date has involved the use of the process to dispose of materials in several areas. In the first area, the MEO process uses an electrochemical cell in which the electrolyte is restricted to a composition of nitric acid and silver ions in a specific temperature, concentration, and pH range. The silver ions serve as the regenerable mediating oxidizing species which is used in an oxidative dissolution process to recover plutonium contained in solid waste from processes, technological and laboratory waste (U.S. Pat. No. 4,749,519), and subsequently extended to the dissolution of the plutonium dioxide component of uranium and plutonium oxide mixtures (i.e. mixed oxide reactor fuel) (U.S. Pat. No. 5,745,835).

In the second area, the MEO process was used for the oxidation (i.e., decomposition) of organic matter contaminated with radioactive materials, such as that contained in the solid waste generated in extracting plutonium from irradiated nuclear reactor fuel ( U.S. Pat. Nos. 4,874,485; 4,925,643.

Both of the two areas discussed have involved similar use of the MEO process using nitric acid and silver ions being generated by an electrochemical cell with the anode and cathode being separated by a membrane. The two uses have differed in the temperature range used in each of the applications. The first use is operated below 50° C. (i.e., generally around 25° C. or room temperature) to minimize water reactions with the Ag(II) ion, which are parasitic as they do not assist in dissolution of the plutonium dioxide, but do consume electrons, thus reducing the coulombic efficiency of the process. The second use is operated between 50° C. and slightly below 100° C. to promote reaction of the Ag(II) ions with the nitric acid solution which produces a range of highly reactive free radicals (e.g., .OH, $.O_2H$, $.NO_3$, etc) and $H_2O_2$, all of capable oxidizing organic materials.

Others have substituted cerium and nitric acid; and cobalt, and nitric acid, sulfuric acid or neutral solutions for the silver and nitric acid as the electrolyte (U.S. Pat. Nos. 4,686,019, 5,516,972, 5,756,874, 5,911,868, and 5,919,350). The temperatures vary among the electrolytes being substituted for the silver and nitric acid combination. Following the aforementioned work a U.S. Pat. No. 5,952,542, ruthenium (also mentioned are osmium, iridium, and rhodium) has been proposed as the electrolyte for the MEO process, to decompose organic materials in a slightly acidic solution operating between 60° C. and 90° C.

Most recently in U.S. Pat. No. 6,096,283, peroxydisulfate is used in a system combining hydrolysis and direct chemical oxidation (DCO). The hydrolysis is performed under the following conditions: at 100° C. ° C. to 120° C. ° C., a pH of greater than 7 and at greater than atmospheric pressure. The DCO is operated at temperatures at or less than 105° C. ° C., atmospheric pressure, and under alkaline, neutral and acidic conditions. The stated purpose of this patent is to destroy halogenated organic solvents, contaminated soils and sludge, and organic components of mixed waste.

All of the descriptions reviewed are similar in their application to the decomposition of organic materials and each patent has restricted the anions, cations, electrolyte, pH and temperature range used.

The processes defined in the foregoing patents each have severe limitations in their techniques and apparatus for using silver, cobalt, cerium and peroxysulfate. The silver based process requires the presence of strong nitric acid for the formation of a useful population of the $Ag^{+2}$ oxidizing species and silver is removed from the system by parasitic reactions if halogens are present in the mixed waste. Silver ions diffusion across the membrane from the anolyte to the catholyte where it is necessary to conduct a recovery process due to the high cost of silver. Reduction of the concentrated nitric acid at the cathode ultimately leads to the formation of $NO_x$ in the cathode chamber, thus necessitating inclusion of a cathode off-gas treatment system.

The lower oxidation potential of cobalt and cerium species relative to many oxidizing species listed in Tables 1 and 2 herein, limit their ability to decompose some of the components of mixed waste and/or transuranic/actinides, at a practical rate. Both cobalt and cerium are costly for an industrial process and their migration through the membrane will require a recovery system.

This patent offer new features for an MEO process and apparatus not cover in the present art which address these limitations the features in this patent are: (a) alternative redox couple species, (b) different anolyte and catholyte electrolytes in the same MEO process and apparatus, (c) MEO apparatus design provides for the same apparatus using many different redox couples without changing the apparatus, (d) MEO process avoids the emission of $NO_x$, (e) redox couples and electrolyte(s) can directly replace silver II in the existing apparatus to eliminate their major problems, (f) the redox couples dissolve plutonium oxides, nitrides or carbides, uranium oxides, nitrides or carbides, and other transuranics/ actinides directly in to solution for ease of recovery.

These and further and other objects and features of the invention are apparent in the disclosure, which includes the above and ongoing written specification, with the drawings.

SUMMARY OF THE INVENTION

This invention relates generally to the use of a Mediated Electrochemical Oxidation process and apparatus for: the dissolution of transuranic/actinide elements (e.g., plutonium, neptunium, americium, curium, and californium), and/or compounds thereof in transuranic waste (TRUW), low level waste (LLW), low level mixed waste (LLMW), special case waste (SCW), and greater than class C (GTCC) LLW's;. the destruction of the non-fluorocarbon organic component in these waste types; and the decontamination of transuranic/ actinide contaminated equipment.

Using this MEO methodology and process nearly all solid or liquid mixed wastes are decomposed into carbon dioxide, water, and trace amounts of inorganic salts. The tranuranics/ actinides are placed into solution during the decomposition of the mixed waste. The process may be operated in three different modes (dissolution, destruction, and decontamination).

In the first mode (dissolution) the process runs until the mixed waste transuranic elements in mixed oxides, carbides, and nitrides formed by their co-precipitation, mechanical mixing, etc. with similar uranium compounds materials are totally decomposed dissolved into solution these benign natural components as previously mentioned.

The second mode (destruction) the process involves mixed waste materials. In this mode the MEO process destroys the mixed waste materials by reducing them to $CO_2$, water and small amounts of inorganic salts. The transuranic material on the mixed waste is dissolved into solution and separated from the MEO electrolyte.

The third mode (decontamination) involves contaminated equipment, instruments, glassware, containers (e.g., metal or plastic drums, etc.) and materials (e.g., clothing, rags, absorbents, etc.). In this mode the MEO process dissolves the radioactive component of the mixed waste and destroys the organic component. These items are placed in an anolyte reaction chamber(s) (see FIGS. 1B, 1C, 1D, and 1E) and the electrolyte containing the oxidizing species is introduced into the chamber(s). The MEO process cleans the contaminated items rendering them non-toxic and safe for reuse or disposal and places the radioactive materials into solution for capture and removal.

The MEO process involves the anolyte portion of the electrolyte containing one or more redox couples, wherein the oxidized form of at least one redox couple is produced by anodic oxidation at the anode of an electrochemical cell. The oxidized forms of any other redox couples present are produced either by similar anodic oxidation or reaction with the oxidized form of other redox couples present capable of affecting the required redox reaction. The anodic oxidation in the electrochemical cell is driven by an externally induced electrical potential induced between the anode(s) and cathode (s) of the cell. The oxidized species of the redox couples oxidize the mixed waste molecules and are themselves converted to their reduced form, whereupon they are reoxidized by either of the aforementioned mechanisms and the redox cycle continues until all oxidizable waste species, including intermediate reaction products, have undergone the desired degree of oxidation. The redox species ions are thus seen to "mediate" the transfer of electrons from the waste molecules to the anode, (i.e., oxidation of the waste).

A membrane in the electrochemical cell separates the anolyte and catholyte, thereby preventing parasitic reduction of the oxidizing species at the cathode. The membrane is ion-selective or semi-permeable (i.e., microporous plastic, porous ceramic, sintered glass frit, etc.). The preferred MEO process uses the mediator species described in Table I (simple anions redox couple mediators); the Type I isopolyanions (IPA) formed by Mo, W, V, Nb, and Ta, and mixtures thereof; the Type I heteropolyanions (HPA) formed by incorporation into the aforementioned isopolyanions of any of the elements listed in Table II (heteroatoms) either singly or in combinations there of; any type heteropolyanion containing at least one heteropolyatom (i.e. element) contained in both Table I and Table II; or combinations of mediator species from any or all of these generic groups.

Simple Anion Redox Couple Mediators

Table I show the simple anion redox couple mediators used in the preferred MEO process wherein "species" defines the specific ions for each chemical element that have applicability to the MEO process as either the reduced (e.g., $Fe^{+3}$) or oxidizer (e.g., $FeO_4^{-2}$) form of the mediator characteristic element (e.g., Fe), and the "specific redox couple" defines the specific associations of the reduced and oxidized forms of these species (e.g., $Fe^{+3}/FeO_4^{-2}$) that are claimed for the MEO process. Species soluble in the anolyte are shown in Table I in normal print while those that are insoluble are shown in bold underlined print. The characteristics of the MEO Process claimed in this patent are specified in the following paragraphs.

The anolyte contains one or more redox couples which in their oxidized form consist of either single multivalent element anions (e.g., $Ag^{+2}$, $Ce^{+4}$, $Co^{+3}$, $Pb^{+4}$, etc.), insoluble oxides of multivalent elements (e.g., $PbO_2$, $CeO_2$, $PrO_2$, etc.), or simple oxoanions (also called oxyanions) of multivalent elements (e.g., $FeO_4^{-2}$, $NiO_4^{-2}$, $BiO_3^{-}$, etc.). The redox couples in their oxidized form are called the mediator species. The nonoxygen multivalent element component of the mediator is called the characteristic element of the mediator species. We have chosen to group the simple oxoanions with the simple anion redox couple mediators rather than with the complex (i.e., polyoxometallate (POM)) anion redox couple mediators discussed in the next section and refer to them collectively as simple anion redox couple mediators.

In one embodiment of this process both the oxidized and reduced forms of the redox couple are soluble in the anolyte. The reduced form of the couple is anodically oxidized to the oxidized form at the cell anode(s) whereupon it oxidizes molecules of mixed wastes either dissolved in or located on waste particle surfaces wetted by the anolyte, with the concomitant reduction of the oxidizing agent to its reduced form, whereupon the MEO process begins again with the reoxidation of this species at the cell anode(s). If other less powerful redox couples of this type (i.e., reduced and oxidized forms soluble in anolyte) are present, they too may undergo direct anodic oxidation or the anodically oxidized more powerful oxidizing agent may oxidize them rather than a waste molecule. The weaker redox couple(s) is selected such that their oxidation potential is sufficient to affect the desired reaction with the waste molecules. The oxidized species of all the redox couples oxidize the mixed waste molecules and are themselves converted to their reduced form, whereupon they are reoxidized by either of the aforementioned mechanisms and the redox cycle continues until all oxidizable waste species, including intermediate reaction products, have undergone the desired degree of oxidation.

The preferred mode for the MEO process as described in the preceding section is for the redox couple species to be soluble in the anolyte in both the oxidized and reduced forms, however this is not the only mode of operation claimed herein. If the reduced form of the redox couple is soluble in the anolyte (e.g., $Pb^{+2}$) but the oxidized form is not (e.g., $PbO_2$), the following processes are operative. The insoluble oxidizing agent is produced either as a surface layer on the anode by anodic oxidation, or throughout the bulk of the anolyte by reacting with the oxidized form of other redox couples present capable of affecting the required redox reaction, at least one of which is formed by anodic oxidation. The oxidizable waste is either soluble in the anolyte or dispersed therein at a fine particle size, (e.g., emulsion, colloid, etc.) thereby affecting intimate contact with the surface of the insoluble oxidizing agent (e.g., $PbO_2$) particles. Upon reaction of the waste with the oxidizing agent particles, the waste is oxidized and the insoluble oxidizing agent molecules on the anolyte wetted surfaces of the oxidizing agent particles reacting with the waste are reduced to their soluble form and are returned to the bulk anolyte, available for continuing the MEO process by being reoxidized.

In another variant of the MEO process, if the reduced form of the redox couple is insoluble in the anolyte (e.g., $TiO_2$) but the oxidized form is soluble (e.g., $TiO_2^{+2}$), the following processes are operative. The soluble (i.e., oxidized) form of the redox couple is produced by the reaction of the insoluble (i.e., reduced form) redox couple molecules on the anolyte wetted surfaces of the oxidizing agent particles with the soluble oxidized form of other redox couples present capable of affecting the required redox reaction, at least one of which is formed by anodic oxidation and soluble in the anolyte in both the reduced and oxidized forms. The soluble oxidized species so formed are released into the anolyte whereupon they oxidize waste molecules in the manner previously described and are themselves converted to the insoluble form of the redox couple, thereupon returning to the starting point of the redox MEO cycle.

In this invention, when an alkaline anolyte is used, the $CO_2$ resulting from oxidation of the mixed waste reacts with the anolyte to form alkali metal bicarbonates/carbonates. The bicarbonate/carbonate ions circulate within the anolyte where they are reversibly oxidized to percarbonate ions either by anodic oxidation within the electrochemical cell or alternately by reacting with the oxidized form of a more powerful redox couple mediator, when present in the anolyte. The carbonate thus functions exactly as a simple anion redox couple mediator, thereby producing an oxidizing species from the waste oxidation products that it is capable of destroying additional mixed waste.

The electrolytes used in this patent are from a family of acids, alkali, and neutral salt aqueous solutions (e.g. sulfuric acid, potassium hydroxide, sodium sulfate aqueous solutions, etc.).

A given redox couple or mixture of redox couples (i.e. mediator species) are to be used with different electrolytes.

The electrolyte composition is selected based on demonstrated adequate solubility of the compound containing at least one of the mediator species present in the reduced form (e.g., sulfuric acid may be used with ferric sulfate, etc.).

The concentration of the mediator species containing compounds in the anolyte may range from 0.0005 molar (M) up to the saturation point.

The concentration of electrolyte in the anolyte is governed by its effect upon the solubility of the mediator species containing compounds and by the conductivity of the anolyte solution desired in the electrochemical cell for the given mediator species being used.

The temperature over which the electrochemical cell may be operated ranges from approximately 0° C. to slightly below the boiling point of the electrolytic solution. By using simple and/or complex redox couples mediators and attacking specific organic molecules with the oxidizing species while operating at low temperature, the formation of toxic materials such as dioxin and furans is prevented.

The MEO process is operated at ambient atmospheric pressure.

The mediator species are differentiated on the basis of whether they are capable of reacting with the electrolyte to produce free radicals (e.g., $.O_2H$ (perhydroxyl), $.OH$ (hydroxyl), $.SO_4$ (sulfate), $.NO_3$ (nitrate), etc.). Such mediator species are classified herein as "super oxidizers" (SO) and typically exhibit oxidation potentials at least equal to that of the $Ce^{+3}/Ce^{+4}$ redox couple (i.e., 1.7 volts at 1 molar, 25° C. and pH 1).

The electrical potential between the electrodes in the electrochemical cell is based upon the oxidation potential of the most reactive redox couple presents in the anolyte and serving as a mediator species, and the ohmic losses within the cell. In the case of certain electrolyte compositions a low level AC voltage is impressed upon the DC voltage to retard the formation of cell performance limiting surface films on the electrode and/or membranes. Within the current density range of interest the electrical potential may be approximately 2.5 to 3.0 volts.

Complex Anion Redox Couple Mediators

The preferred characteristic of the oxidizing species in the MEO process is that it be soluble in the aqueous anolyte in both the oxidized and reduced states. The majorities of metal oxides and oxoanion (oxyanion) salts are insoluble, or have poorly defined or limited solution chemistry. The early transition elements, however, are capable of spontaneously forming a class of discrete polymeric structures called polyoxometallate (POMs) which are highly soluble in aqueous solutions over a wide pH range. The polymerization of simple tetrahedral oxoanions of interest herein involves an expansion of the metal, M, coordination number to 6, and the edge and corner linkage of $MO_6$ octahedra. Chromium is limited to a coordination number of 4, restricting the POMs based on $CrO_4$ tetrahedra to the dichromate ion $[Cr_2O_7]^{-2}$ which is included in Table I. Based upon their chemical composition POMs are divided into the two subclasses isopolyanions (IPAs) and heteropolyanions (HPAs), as shown by the following general formulas:

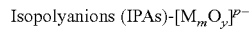

and,

where the addenda atom, M, is usually Molybdenum (Mo) or Tungsten (W), and less frequently Vanadium (V), Niobium (Nb), or Tantalum (Ta), or mixtures of these elements in their highest ($d^0$) oxidation state. The elements that can function as addenda atoms in IPAs and HPAs appear to be limited to those with both a favorable combination of ionic radius and charge, and the ability to form dn-pn M-O bonds. However, the heteroatom, X, have no such limitations and can be any of the elements listed in Table II.

There is a vast chemistry of POMs that involves the oxidation/reduction of the addenda atoms and those heteroatoms listed in Table II that exhibit multiple oxidation states. The partial reduction of the addenda, M, atoms in some POMs strictures (i.e., both IPAs and HPAs) produces intensely colored species, generically referred to as "heteropoly blues". Based on structural differences, POMs can be divided into two groups, Type I and Type II. Type I POMs consist of $MO_6$ octahedra each having one terminal oxo oxygen atom while Type II have 2 terminal oxo oxygen atoms. Type II POMs can only accommodate addenda atoms with $d^0$ electronic configurations, whereas Type I; e.g., Keggin ($XM_{12}O_{40}$), Dawson ($X_2M_{18}O_{62}$), hexametalate ($M_6O_{19}$), decatungstate ($W_{10}O_{32}$), etc., can accommodate addenda atoms with $d^0$, $d^1$, and $d^2$ electronic configurations. Therefore, while Type I structures can easily undergo reversible redox reactions, structural limitations preclude this ability in Type II structures. Oxidizing species applicable for the MEO process are therefore Type I POMs (i.e., IPAs and HPAs) where the addenda, M, atoms are W, Mo, V, Nb, Ta, or combinations there of.

The high negative charges of polyanions often stabilize heteroatoms in unusually high oxidation states, thereby creating a second category of MEO oxidizers in addition to the aforementioned Type I POMs. Any Type I or Type II HPA containing any of the heteroatom elements, X, listed in Table II, that also are listed in Table I as simple anion redox couple mediators, can also function as an oxidizing species in the MEO process.

The anolyte contains one or more complex anion redox couples, each consisting of either the afore mentioned Type I POMs containing W, Mo, V, Nb, Ta or combinations there of as the addenda atoms, or HPAs having as heteroatoms (X) any elements contained in both Tables I and II, and which are soluble in the electrolyte (e.g. sulfuric acid, etc.).

The electrolytes used in this claim are from a family of acids, alkali, and neutral salt aqueous solutions (e.g. sulfuric acid, potassium hydroxide, sodium sulfate aqueous solutions, etc.).

A given POM redox couple or mixture of POM redox couples (i.e., mediator species) may be used with different electrolytes.

The electrolyte composition is selected based on demonstrating adequate solubility of at least one of the compounds containing the POM mediator species in the reduced form and being part of a redox couple of sufficient oxidation potential to affect oxidation of the other mediator species present.

The concentration of the POM mediator species containing compounds in the anolyte may range from 0.0005M (molar) up to the saturation point.

The concentration of electrolyte in the anolyte may be governed by its effect upon the solubility of the POM mediator species containing compounds and by the conductivity of the anolyte solution desired in the electrochemical cell for the given POM mediator species being used to allow the desired cell current at the desired cell voltage.

The temperature over which the electrochemical cell may be operated ranges from approximately 0° C. to just below the boiling point of the electrolytic solution. If the temperature range for any given process reaches the 200° C. to 300° C., then they have the potential to produce volatile organics that may have serious health and environmental consequences. Typical of these substances are dioxins and furans, which are, controlled materials.

The MEO process is operated at ambient atmospheric pressure.

The POM mediator species are differentiated on the basis of whether they are capable of reacting with the electrolyte to produce free radicals (e.g., $.O_2H$, $.OH$, $.SO_4$, $.NO_3$). Such mediator species are classified herein as "super oxidizers" (SO) and typically exhibit oxidation potentials at least equal to that of the $Ce^{+3}/Ce^{+4}$ redox couple (i.e., 1.7 volts at 1 molar, 25° C. and pH 1).

The electrical potential between the anode(s) and cathode(s) in the electrochemical cell is based on the oxidation potential of the most reactive POM redox couple presents in the anolyte and serving as a mediator species, and the ohmic losses within the cell. Within the current density range of interest the electrical potential may be approximately 2.5 to 3.0 volts. AC voltage In the case of certain electrolyte compositions, a low level is impressed across the electrodes in the electrochemical cell. The AC voltage is used to retard the formation of surface films on the electrodes and/or membranes that would have a performance limiting effect.

Mixed Simple and Complex Anion Redox Couple Mediators

The preferred MEO process for a combination of simple anion redox couple mediators (A) and complex anion redox couple mediators (B) may be mixed together to form the system anolyte. The characteristics of the resulting MEO process is similar to the previous discussions.

The use of multiple oxidizer species in the MEO process has the following potential advantages:

a. The overall mixed waste destruction rate is increased if the reaction kinetics of anodically oxidizing mediator "A", oxidizing mediator "B" and oxidized mediator "B" oxidizing the mixed waste and/or transuranic/actinides is sufficiently rapid such that the combined speed of the three step reaction train is faster than the two step reaction trains of anodically oxidizing mediator "A" or "B", and the oxidized mediators "A" or "B" oxidizing the organic waste and/or transuranic/actinides.

b. If the cost of mediator "B" is sufficiently less than that of mediator "A", the used of the above three step reaction train results in lowering the cost of mixed waste and/or transuranic/actinides destruction due to the reduced cost associated with the smaller required inventory and process losses of the more expensive mediator "A". An example of this is the use of silver (II)-peroxysulfate mediator system to reduce the cost associated with a silver (I/II) only MEO process and overcome the slow anodic oxidation kinetics of a sulfate/peroxysulfate only MEO process.

c. The MEO process is "desensitized" to changes in the types of molecular bonds present in the mixed waste as the use of multiple mediators, each selectively attacking different types of chemical bonds, results in a highly "nonselective" oxidizing system.

Anolyte Additional Features

In one preferred embodiment of the MEO process in this invention, there are one or more simple anion redox couple mediators in the anolyte aqueous solution. In a preferred embodiment of the MEO process, there are one or more complex anion (i.e., POMs) redox couple mediators in the anolyte aqueous solution. In another preferred embodiment of the MEO process, there are one or more simple anion redox couples and one or more complex anion redox couples in the anolyte aqueous solution.

The MEO process of the present invention uses any oxidizer species listed in Table I that are found in situ in the mixed waste to be destroyed; For example, when the mixed waste also contains lead compounds that become a source of $Pb^{+2}$ ions under the MEO process conditions within the anolyte, the waste-anolyte mixture may be circulated through an electrochemical cell. Where the oxidized form of the reversible lead redox couple may be formed either by anodic oxidation within the electrochemical cell or alternately by reacting with the oxidized form of a more powerful redox couple, if present in the anolyte and the latter being anodically oxidized in the electrochemical cell. The lead thus functions exactly as a simple anion redox couple species thereby destroying the mixed waste organic component leaving only the lead and the transuranic/actinides to be disposed of. Adding one or more of any of the anion redox couple mediators described in this patent further enhances the MEO process described above.

In the MEO process of the invention, anion redox couple mediators in the anolyte part of an aqueous electrolyte solution uses an acid, neutral or alkaline solution depending on the temperature and solubility of the specific mediator(s). In the presence of halogenated hydrocarbons in the mixed waste additional processes are ongoing. The anion oxidizers used in the basic MEO process preferably attack specific halogenated hydrocarbon molecules. Hydroxyl free radicals preferentially attack halogenated hydrocarbon molecules containing aromatic rings and unsaturated carbon-carbon bonds. Oxidation products such as the highly undesirable aromatic compounds chlorophenol or tetrachlorodibenzodioxin (dioxin) upon formation would thus be preferentially attacked by hydroxyl free radicals, preventing the accumulation of any meaningful amounts of these compounds. Even free radicals with lower oxidation potentials than the hydroxyl free radical preferentially attack carbon-halogen bonds such as those in carbon tetrachloride and polychlorobiphenyls (PCBs).

Some redox couples having an oxidation potential at least equal to that of the $Ce^{+3}/Ce^{+4}$ redox couple (i.e., 1.7 volts at 1 molar, 25° C. and pH 1), and sometimes requiring heating to above about 50° C. (i.e., but less then the boiling point of the electrolyte) can initiate a second oxidation process wherein the mediator ions in their oxidized form interact with the aqueous anolyte, creating secondary oxidizer free radicals (e.g., $.O_2H$, $.OH$, $.SO_4$, $.NO_3$, etc.) or hydrogen peroxide. Such mediator species in this invention are classified herein as "super oxidizers" (SO) to distinguish them from the "basic oxidizers" incapable of initiating this second oxidation process.

The oxidizer species addressed in this patent (i.e., characteristic elements having atomic number below 90) are described in Table I (simple anions redox couple mediators): Type I IPAs formed by Mo, W, V, Nb, Ta, or mixtures there of as addenda atoms; Type I HPAs formed by incorporation into the aforementioned IPAs if any of the elements listed in Table II (heteroatoms) either singly or in combinations thereof; or any HPA containing at least one heteroatom type (i.e., element) contained in both Table I and Table II; or mediator species from any or all of these generic groups.

Each oxidizer anion element has normal valence states (NVS) (i.e., reduced form of redox couple) and higher valence states (HVS) (i.e., oxidized form of redox couple) created by stripping electrons off NVS species when they pass through and electrochemical cell. The MEO process of the present invention uses a broad spectrum of anion oxidizers; these anion oxidizers used in the basic MEO process may be interchanged in the preferred embodiment without changing the equipment.

In preferred embodiments of the MEO process, the basic MEO process is modified by the introduction of additives such as tellurate or periodate ions which serve to overcome the short lifetime of the oxidized form of some redox couples (e.g., $Cu^{+3}$) in the anolyte via the formation of more stable complexes (e.g., $[Cu(IO_6)_2]^{-7}$, $[Cu(HTeO_6)_2]^{-7}$). The tellurate and periodate ions can also participate directly in the MEO process as they are the oxidized forms of simple anion redox couple mediators (see Table I) and participate in the oxidation of mixed waste in the same manner as previously described for this class of oxidizing agents.

Alkaline Electrolytes

In one preferred embodiment, a cost reduction is achieved in the basic MEO process by using an alkaline electrolyte, such as but not limited to aqueous solutions of NaOH or KOH with mediator species wherein the reduced form of said mediator redox couple displays sufficient solubility in said electrolyte to allow the desired oxidation of the mixed waste to proceed at a practical rate. The oxidation potential of redox reactions producing hydrogen ions (i.e., both mediator species and mixed waste and/or transuranic/actinides molecules reactions) are inversely proportional to the electrolyte pH, thus with the proper selection of a redox couple mediator, it is possible, by increasing the electrolyte pH, to minimize the electric potential required to affect the desired oxidation process, thereby reducing the electric power consumed per unit mass of mixed waste and/or transuranic/actinides processed.

When an alkaline anolyte (e.g., NaOH, KOH, etc.) is used, benefits are derived from the saponification (i.e., base promoted ester hydrolysis) of fatty acids to form water soluble alkali metal salts of the fatty acids (i.e., soaps) and glycerin, a process similar to the production of soap from animal fat by introducing it into a hot aqueous lye solution.

In this invention, when an alkaline anolyte is used, the $CO_2$ resulting from oxidation of the mixed waste and/or transuranic/actinides reacts with the anolyte to form alkali metal bicarbonates/carbonates. The bicarbonate/carbonate ions circulate within the anolyte where they are reversibly oxidized to percarbonate ions either by anodic oxidation within the electrochemical cell or alternately by reacting with the oxidized form of a more powerful redox couple mediator, when present in the anolyte. The carbonate thus functions exactly as a simple anion redox couple mediator, thereby producing an oxidizing species from the mixed waste oxidation products that it is capable of destroying additional organic components of the mixed waste.

Additional MEO Electrolyte Features

In one preferred embodiment of this invention, the catholyte and anolyte are discrete entities separated by a membrane, thus they are not constrained to share any common properties such as electrolyte concentration, composition, or pH (i.e., acid, alkali, or neutral). The process operates over the temperature range from approximately 0° C. to slightly below the boiling point of the electrolyte used during the destruction of the mixed waste and/or transuranic/actinides.

MEO Process Augmented by Ultraviolet/Ultrasonic Energy

Decomposition of the hydrogen peroxide into free hydroxyl radicals is well known to be promoted by ultraviolet (UV) irradiation. The destruction rate of mixed waste and/or transuranic/actinides obtained using the MEO process in this invention, therefore, is increased by UV irradiation of the reaction chamber anolyte to promote formation of additional hydroxyl free radicals. In a preferred embodiment, UV radiation is introduced into the anolyte chamber using a UV source either internal to or adjacent to the anolyte chamber. The UV irradiation decomposes hydrogen peroxide, which is produced by secondary oxidizers generated by the oxidized form of the mediator redox couple, into hydroxyl free radical. The result is an increase in the efficiency of the MEO process since the energy expended in hydrogen peroxide generation is recovered through the oxidation of mixed waste and/or transuranic/actinides materials in the anolyte chamber.

Additionally, ultrasonic energy is introduced into the anolyte chamber. Implosion of the microscopic bubbles formed by the rapidly oscillating pressure waves emanating from the sonic horn generate shock waves capable of producing extremely short lived and localized conditions of 4800° C. and 1000 atmospheres pressure within the anolyte. Under these conditions water molecules decompose into hydrogen atoms and hydroxyl radicals. Upon quenching of the localized thermal spike, the hydroxyl radicals undergo the aforementioned reactions with the mixed waste or combine with each other to form another hydrogen peroxide molecule which then itself oxidizes additional mixed waste and/or transuranic/actinides.

In another preferred embodiment, the destruction rate of non-anolyte soluble mixed waste is enhanced by affecting a reduction in the dimensions of the individual second (i.e., mixed waste) phase entities present in the anolyte, thereby increasing the total waste and/or transuranic/actinides surface area wetted by the anolyte and therefore the amount of waste and/or transuranic/actinides oxidized per unit time. Immiscible liquids may be dispersed on an extremely fine scale within the aqueous anolyte by the introduction of suitable surfactants or emulsifying agents. Vigorous mechanical mixing such as with a colloid mill or the microscopic scale mixing affected by the aforementioned ultrasonic energy induced microscopic bubble implosion could also be used to affect the desired reduction in size of the individual second phase waste and/or transuranic/actinides volumes dispersed in the anolyte. The vast majority of solid mixed waste and/or transuranic/actinides may be converted into a liquid phase, thus becoming treatable as above, using a variety of cell disruption methodologies. Examples of these methods are mechanical shearing using various rotor-stator homogenizers and ultrasonic devices (i.e., sonicators) where the aforementioned implosion generated shock wave, augmented by the 4800° C. temperature spike, mixes the liquid and solids for better access to the oxidizers. Since water is a product of the oxidation process it requires no further energy to dispose of the mixed waste thus saving energy that would be expended in a thermal based process.

In another preferred embodiment, increasing the surface area exposed to the anolyte enhances the destruction rate of non-anolyte solid mixed waste and/or transuranic/actinides. The destruction rate for any given concentration of oxidizer in solution in the anolyte is limited to the area of the solid with which the oxidizer can make contact. The embodiment used for solids contains a mechanism for multiply puncturing the solid when it is placed in the anolyte reaction chamber basket. The punctures allow the oxidizer to penetrate into the interior of the solid and increase the rate of destruction.

If the amount of water released directly from the mixed waste and/or formed as a reaction product from the oxidation of hydrogenous waste dilutes the anolyte to an unacceptable level, the anolyte can easily be reconstituted by simply raising the temperature and/or lowering the pressure in an optional evaporation chamber to affect removal of the required amount of water. The soluble constituents of the mixed waste and/or transuranic/actinides are rapidly dispersed throughout the anolyte on a molecular scale while the insoluble constituents are dispersed throughout the anolyte as an extremely fine second phase using any of the aforementioned dispersal methodologies, thereby vastly increasing the mixed waste and/or transuranic/actinides anolyte interfacial contact area beyond that possible with an intact solid configuration and thus increasing the rate at which the mixed waste and/or transuranic/actinides is destroyed and the MEO efficiency.

In another preferred embodiment, increasing the surface area exposed to the anolyte enhances the destruction rate of non-anolyte solid mixed waste and/or transuranic/actinides. The destruction rate for any given concentration of oxidizer in solution in the anolyte is limited to the area of the solid with which the oxidizer can make contact. The embodiment used for solids contains a mechanism for multiply puncturing the solid when it is placed in the anolyte reaction chamber basket. The punctures allow the oxidizer to penetrate into the interior of the solid by-passing difficult to destroy surface layers and increase the rate of destruction.

MEO Process Augmented with Free Radicals

The principals of the oxidation process used in this invention in which a free radical (e.g., $.O_2H$, $.OH$, $.SO_4$, $.NO_3$,) cleaves and oxidize the mixed waste and/or transuranic/actinides resulting in the formation of successively smaller hydrocarbon compounds. The intermediate compounds so formed are easily oxidized to carbon dioxide and water during sequential reactions.

Inorganic radicals are generated in aqueous solution variants of the MEO process in this invention. Radicals have been derived from carbonate, azide, nitrite, nitrate, phosphate, phosphite, sulphite, sulphate, selenite, thiocyanate, chloride, bromide, iodide and formate ions. The MEO process may generate organic free radicals, such as sulfhydryl. When the MEO process in this invention is applied to mixed waste materials they are broken down into organic compounds that are attacked by the aforementioned inorganic free radicals, producing organic free radicals, which contribute to the oxidation process and increase the efficiency of the MEO process.

These and further and other objects and features of the invention are apparent in the disclosure, which includes the above and ongoing written specification, with the characteristics and drawings.

BRIEF DESCRIPTION OF THE DRAWINGS

FIG. 1A MEO Apparatus Diagram is a schematic representation of a system for destroying mixed waste and/or the dissolution of tranuranics/actinides materials. FIG. 1A is a representation of a general embodiment of the present invention (with the understanding that not all of the components shown therein must necessarily be employed in all situations) and others may be added as needed for a particular application.

FIG. 2 MEO System Model 5.b is a schematic representation of a preferred embodiment using the FIG. 1B anolyte reaction chamber configuration. The Model 5.b uses the anolyte reaction chamber 5a in the MEO apparatus depicted in FIG. 1A. This model is used for mixed waste and/or transuranic/actinides fluids, and mixtures which include small particulate.

FIG. 3 is a representation of a general embodiment of a controller for the present invention (with the understanding that not all of the components shown therein must necessarily be employed in all situations) and others may be added as needed for a particular application.

DETAILED DESCRIPTION OF PREFERRED EMBODIMENTS

MEO Chemistry

Figure 1B:
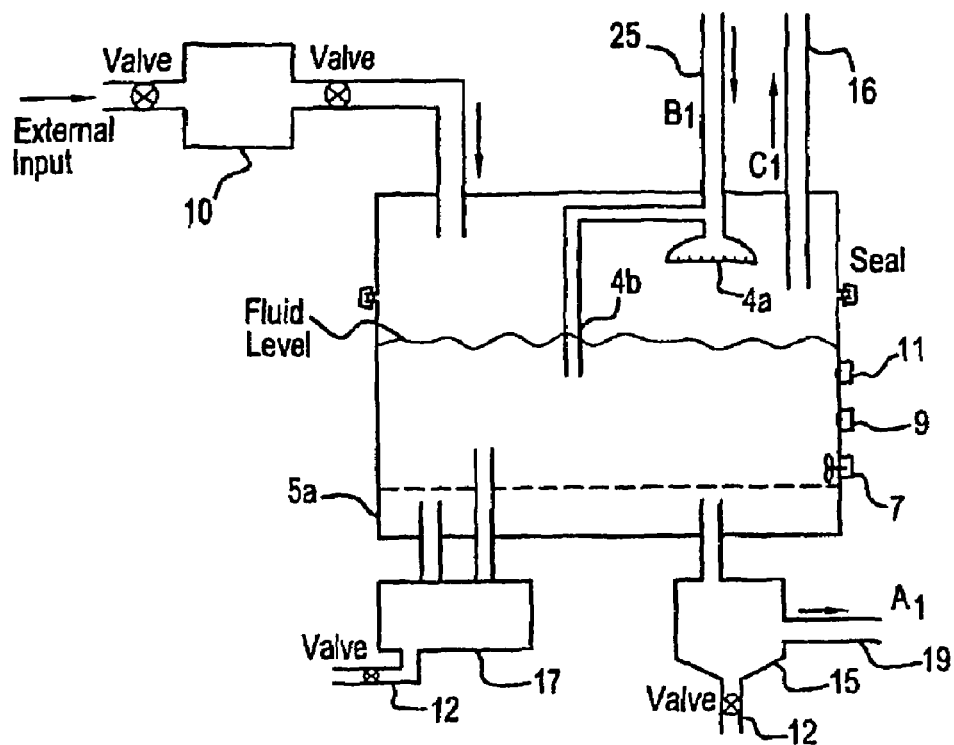
FIG. 1B Anolyte Reaction Chamber for Liquids, Mixtures, Small Particulate and with Continuous Feed is a schematic representation of the anolyte reaction chamber used for destruction of mixed waste and/or dissolution of transuranic/actinides fluids, and mixtures which include small particulate. The anolyte reaction chamber is used for dissolution of transuranics/actinides (such as a mixed oxide, nitride or carbide and/or mixture of oxides, nitrides or carbides of uranium and plutonium) totally dissolving them into solution. This chamber accommodates a continuous feed of these materials into the chamber.

Mediated Electrochemical Oxidation (MEO) process chemistry described in this patent uses oxidizer species as described in Table I (simple anions redox couple mediators); Type I IPAs formed by Mo, W, V, Nb, Ta, or mixtures there of as addenda atoms; Type I HPAs formed by incorporation into the aforementioned IPAs of any of the elements listed in Table II (heteroatoms) either singly or in combination there of; or any HPA containing at least one heteroatom type (i.e., element) contained in both Table I and Table II; or combinations of mediator species from any or all of these generic groups. Since the anolyte and catholyte are completely separated entities, it is not necessary for both systems to contain the same electrolyte. Each electrolyte may, independent of the other, consist of an aqueous solution of acids, typically but not limited to nitric, sulfuric, of phosphoric; alkali, typically but not limited to sodium or potassium hydroxide; or neutral salt typically but not limited to sodium or potassium salts of the aforementioned strong mineral acids.

The MEO Apparatus is unique in that it accommodates the numerous choices of mediator ions and electrolytes by simply draining, flushing, and refilling the system with the mediator/electrolyte system of choice.

Because of redundancy and similarity in the description of the various mediator ions, only the iron and nitric acid combination is discussed in detail. However, it is to be understood that the following discussion of the ferric/ferrate, $(Fe^{+3})/(FeO_4^{-2})$ redox couple reaction in nitric acid $(HNO_3)$ also applies to all the aforementioned oxidizer species and electrolytes described at the beginning of this section. Furthermore, the following discussions of the interaction of ferrate ions with aqueous electrolytes to produce the aforementioned free radicals also applies to all aforementioned mediators having an oxidation potential sufficient to be classified super oxidizers (SO). An SO has an oxidation potential at least equal to that of the redox couple $Ce^{+3}/Ce^{+4}$ which has a potential of approximately 1.7 volts at 1 molar, 25° C. and pH 1 in an acid electrolyte.

FIG. 1A shows a MEO Apparatus in a schematic representation for operating in the three modes (dissolution, destruction, and decontamination) on mixed waste and/or transuranic/actinides.

At the anode of the electrochemical cell 25 Fe(III) ions $(Fe^{+3}$, ferric) are oxidized to Fe(VI) ions $(FeO_4^{-2}$, ferrate),

$$Fe^{+3} + 4H_2O \rightarrow FeO_4^{-2} + 8H^+ + 3e^-$$

If the anolyte temperature is sufficiently high, typically above 50° C., the Fe(VI) species may undergo a redox reaction with the water in the aqueous anolyte. The oxidation of water proceeds by a sequence of reactions producing a variety of intermediate reaction products, some of which react with each other. A few of these intermediate reaction products are highly reactive free radicals including, but not limited to the hydroxyl (.OH) and hydrogen peroxide or perhydroxyl (.HO$_2$) radicals. Additionally, the mediated oxidizer species ions may interact with anions present in the acid or neutral salt electrolyte (e.g., $NO_3^-$, $SO_4^{-2}$, or $PO_4^{-3}$, etc.) to produce free radicals typified by, but not limited to .NO$_3$, or the anions may undergo direct oxidation at the anode of the cell. The population of hydroxyl free radicals may be increased by ultraviolet irradiation of the anolyte (see ultraviolet source 11) in the reaction chambers 5(a,b,c) and buffer tank 20 to cleave the hydrogen peroxide molecules, and intermediate reaction products, into two such radicals. Free radical populations also be increased by ultrasonic vibration (see ultrasonic source 9) induced by the aforementioned implosion generated shock wave, augmented by the 4800° C. temperature spike and 1000 atmospheres pressure.

These secondary oxidation species are capable of oxidizing mixed waste and/or transuranic/actinides materials and thus act in consort with Fe(VI) ions to oxidize the mixed waste and/or transuranic/actinides materials.

The mediator oxidizing species reacts in the anolyte to produce the secondary oxidizer species (free radicals). The free radical generated reacts with and oxidizes a reductant. When the mixed waste has halogenated hydrocarbons (such as solvents) in the mixture they react with the reductants. The reductants are strong reducing agents and they reduce the halogenated hydrocarbons which results in their dehalogenation. The reduced halogens remain in solution as halogen ions, since Table I offer alternative oxidizers to those previously used such as silver which would precipitate. The remaining hydrocarbon molecules are oxidized to $CO_2$ and water. Typical of this process is the removal of the chlorine from halogen hydrocarbons such as PCBs. The chlorine remains in solution and the remaining hydrocarbon molecules are further decomposed into $CO_2$ and water. A resin column to avoid any release into the atmosphere may be used to remove the chlorine. The oxidizing species is chosen from Table I so as to avoid the forming of participates such as silver chloride. An example of a suitable oxidizer from Table I would be the selection of the iron oxidizer being discussed in the foregoing paragraphs.

The oxidizers react with the mixed waste to produce $CO_2$ and water. These processes occur in the anolyte on the anode side of the system in the reaction chambers 5(a,b,c,d), buffer tank 20, and throughout the anolyte system when in solution. Addition of ferric ions to non-iron-based MEO systems are also proposed as this has the potential for increasing the overall rate of mixed waste and/or transuranic/actinides oxidation compared to the non-iron MEO system alone. (Again it is to be understood this discussion of the ferric/ferrate redox couple also applies to all the aforementioned oxidizer species described at the beginning of this section.) An example is considering the two step process of first of which is to electrochemically forming a $FeO_4^{-2}$ ion. In the second step is the $FeO_4^{-2}$ ion oxidizes a mediator ion, from its reduced form (e.g., sulfate) to its oxidized form (e.g., peroxysulfate), faster than by the direct anodic oxidation of the sulfate ion itself. Thus there is an overall increase in the rate of mixed waste and/or transuranic/actinides destruction.

Membrane 27 separates the anode and the cathode chambers in the electrochemical cell 25. Hydrogen ions ($H^+$) or hydronium ions ($H_3O^+$) travel through the membrane 27 due to the electrical potential from the dc power supply 29 applied between the anode(s) 26 and cathodes(s) 28. In the catholyte the nitric acid is reduced to nitrous acid

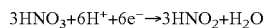

by the reaction between the $H^+$ ions and the nitric acid. Oxygen is introduced into the catholyte through the air sparge 37 located below the liquid surface, and the nitric acid is regenerated,

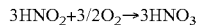

In the case where the catholyte contain compounds other then nitrogen such as sulfuric or phosphoric acids or their salts, the hydrogen ions ($H^+$) or hydronium ions ($H_3O^+$) contact the cathode and hydrogen gas evolves. The hydrogen gas is diluted with the air from the air sparge and released to the atmosphere or the evolved hydrogen gas can be feed to devices that use hydrogen as a fuel such as the fuel cells. The hydrogen may under go purification prior to use (e.g., palladium diffusion, etc.) and/or solid state storage (e.g., adsorption in zirconium, etc.).

In some cases oxygen is evolved at the anode due to the over voltage necessary to create the oxidation species of some of the mediator ions. The efficiency of these mediators is somewhat less under those conditions. The evolved oxygen can be feed to the devices that use hydrogen as a fuel such as the fuel cells. Using the evolved oxygen to enrich the air above its nominal oxygen content of 20.9 percent increases the efficiency of fuel cells deriving their oxygen supply from ambient air.

The overall MEO process may be operate in three different modes (dissolution, destruction, and decontamination). In the first mode (dissolution) the process runs until the transuranics (such as a mixed oxides or carbides, mixture of oxides or carbides of uranium and plutonium, etc.) are totally dissolved into solution. The transuranic materials are usually in form of powder or powder in solution.

The second mode (destruction) the process is operated such that the mixed waste materials are reduced to $CO_2$, water and small amounts of inorganic salts. These mixed waste materials are composed of any item that has been used in connection with radioactive materials and have become contaminated (e.g., clothing, rags, absorbents, etc.).

The third mode (decontamination) involves contaminated equipment, instruments, glassware, containers (such as 50 gallon drums) and materials. In this mode the MEO process destroys the mixed waste materials that have contaminated them. FIG. 1E is typical of this use. These items are used as an anolyte reaction chamber and the electrolyte containing the oxidizing species is introduced into them. The MEO process cleans the contaminated items rendering them non-toxic and safe to reuse or dispose of them.

In modes two and three the mixed waste is converted to carbon dioxide, water, and a small amount of inorganic compounds and/or transuranic/actinides in solution or as a precipitate, which may be extracted by the inorganic compound removal and treatment system 15. The MEO process will proceed until complete destruction of the mixed waste and the dissolving of the transuranic/actinides on contaminated equipment, instruments, glassware, containers (such as 50 gallon drums) and materials.

Each of the following patent(s)/co-pending applications are incorporated herein by reference in their entireties:
U.S. Pat. No. 6,402,932 issued Jun. 11, 2002.
U.S. application Ser. No 10/263,810 filed Oct. 4, 2002.
U.S. application Ser. No 10/127,604 filed Apr. 23, 2002.
U.S. Provisional Application Ser. No. 60/409,202 filed Sep. 10, 2002.
U.S. Provisional Application Ser. No. 60/398,808 filed Jul. 29, 2002.
U.S. Provisional Application Ser. No. 60/398,808 filed Jul. 29, 2002.
PCT/US02/03249 filed Feb. 6, 2002.
PCT/US03/02151 based on U.S. Provisional Application Ser. No. 60/350,352 filed Jan. 24, 2002.
PCT/US03/02152 based on U.S. Provisional Application Ser. No. 60/350,377 filed Jan. 24, 2002.
PCT/US03/02153 based on U.S. Provisional Application Ser. No. 60/350,378 filed Jan. 24, 2002.
PCT/US03/13051 based on U.S. Provisional Application Ser. No. 60/375,430 filed Apr. 26, 2002.
PCT/US03/04065 filed Feb. 12, 2003.
PCT/US02/33732 based on U.S. Provisional Application Ser. No. 60/330,436 filed Oct. 22, 2001.
PCT/US02/32040 based on U.S. Provisional Application Ser. No. 60/327,306 filed Oct. 9, 2001.

These and further and other objects and features of the invention are apparent in the disclosure, which includes the above and ongoing written specification, with the drawings.

MEO Apparatus

A schematic drawing of the MEO apparatus shown in FIG. 1A MEO Apparatus Diagram illustrates the application of the MEO process to all three modes of operation; dissolution, destruction and decontamination. FIGS. 1B through 1F illustrate typical anolyte reaction chambers that may be used will the overall system in FIG. 1A. There are numerous combinations of five anolyte reaction chambers and three modes of operation.

The bulk of the anolyte resides in the anolyte reaction chambers 5(a,b,c,d) and the buffer tank 20. In the case where the mixed waste is solids, liquids and large particles in suspension, the chamber is accessed by raising the Lid 1 The anolyte portion of the electrolyte solution contains for example $Fe^{+3}/FeO_4^{-2}$ redox couple anions and secondary oxidizing species (e.g., free radicals, $H_2O_2$, etc.).

The MEO apparatus is composed of two separate closed-loop systems containing an electrolyte solution composed of anolyte and catholyte solutions. The anolyte and catholyte solutions are contained in the anolyte (A) system and the catholyte (B) system, respectively. These two closed-loop systems are discussed in detail in the following paragraphs.

Anolyte System (A)

Referring to FIG. 1A, the mixed waste and/or transuranic/actinides may be a liquid, solid, a mixture of solids and liquids, or combined waste and/or transuranic/actinides. FIGS. 1B through 1E provide preferred embodiments of the anolyte reaction chambers 5a through 5d and buffer tank 20.

The anolyte reaction chamber 5a in FIG. 1B is designed for liquids, mixtures, and small particulate and introduced in a continuous feed mode. The mixed waste and/or transuranic/actinides is introduced into the anolyte reaction chamber 5a by input pump 10 through the Lid 1 into anolyte reaction chamber 5a. The apparatus continuously circulates the anolyte portion of the electrolyte directly from the electrochemical cell 25 through the anolyte reaction chamber 5a to maximize the concentration of oxidizing species contacting the waste and/or transuranic/actinides. The anolyte is introduced into the anolyte reaction chamber 5a through the spray head 4(a) and stream head 4(b). The two heads are designed to increase the exposure of the mixed waste and/or transuranic/actinides to the anolyte by enhancing the mixing in the anolyte reaction chamber 5a. Introducing the anolyte into the anolyte reaction chamber 5a as a spray onto the anolyte surface promotes contact with (i.e., oxidation of) any immiscible organic surface layers present. A filter 6 is located at the base of the reaction chamber 5a to limit the size of the solid particles to approximately 1 mm in diameter (i.e., smaller that the minimum dimension of the anolyte flow path in the electrochemical cell 25) thereby preventing solid particles large enough to clog the electrochemical cell 25 flow paths from exiting the reaction chamber 5a. Contact of the oxidizing species with incomplete oxidation products that are gaseous at the conditions within the reaction chamber 5a may be further enhanced by using conventional techniques for promoting gas/liquid contact (e.g., ultrasonic vibration 9, mechanical mixing 7). An ultraviolet source 11 is introduced into the anolyte reaction chamber 5a to decompose the hydrogen peroxide formed by the MEO process into free hydroxyl radicals.

Figure 1C:
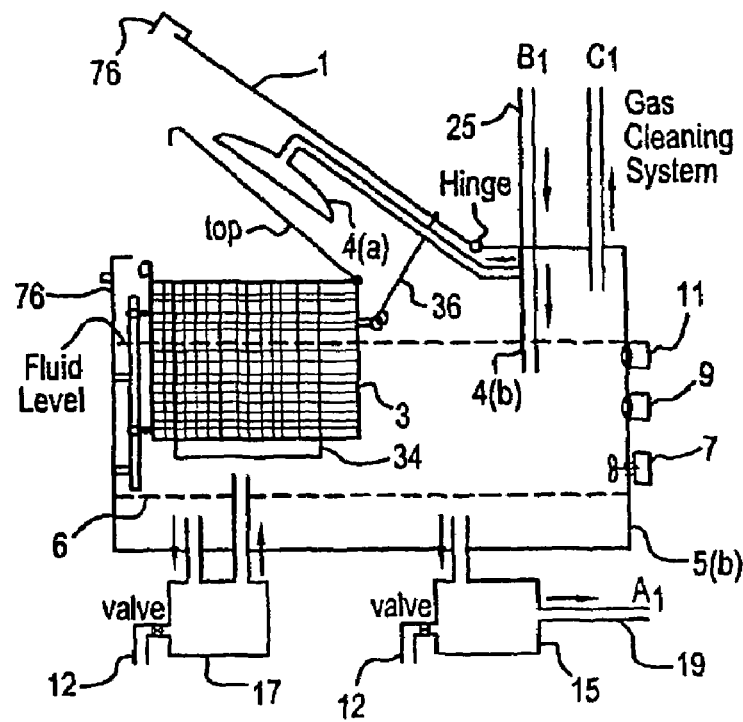
FIG. 1C Anolyte Reaction Chamber for Solids, Mixtures, and Larger Particulate and with Batch Operation is a schematic representation of the anolyte reaction chamber used for destruction of mixed waste solids, and mixtures that include large particulate. This chamber may be used for batch mode processing of mixed waste and/or dissolution of transuranic/actinides.

The anolyte reaction chamber 5b in FIG. 1C is designed for solids, mixtures and batch operations. The hinged lid 1 is lifted, and the top of the basket 3 is opened. The mixed waste and/or transuranic/actinides is introduced into the basket 3 in the anolyte reaction chamber 5b where the solid waste and/or transuranic/actinides remains while the liquid portion of the waste and/or transuranic/actinides flows into the anolyte. The basket 3 top is closed and the basket 3 is lowered by a lever 36 connected to the lid 1 into the anolyte such that all its contents are held submerged in the anolyte throughout the oxidization process. Lid 1 has a seal around the opening and it is locked before operation begins.

A mechanical device (penetrator 34) is incorporated into the basket 3 that create multiple perforations in the outer layers of the solid mixed waste and/or transuranic/actinides so that the anolyte can penetrate into the waste and/or transuranic/actinides. This penetration speeds up the oxidation of the solid mixed waste and/or transuranic/actinides by increasing the surface area exposed to the anolyte oxidizer, and allowing said oxidizer immediate access to portions of the aforementioned waste and/or transuranic/actinides that are encased in (i.e., protected by) more difficult to oxidize surrounding outer layers.

The apparatus continuously circulates the anolyte portion of the electrolyte directly from the electrochemical cell 25 through the anolyte reaction chamber 5b to maximize the concentration of oxidizing species contacting the waste and/or transuranic/actinides. The anolyte enters the anolyte reaction chamber 5b and is injected through two nozzles; one a spray head to distribute the anolyte throughout the anolyte reaction chamber 5b, and the second is a stream head to promote circulation and turbulence in the anolyte in the chamber. Introducing the anolyte into the anolyte reaction chamber 5b as a spray onto the anolyte surface promotes contact with (i.e., oxidation of) any immiscible organic surface layers present. A filter 6 is located at the base of the anolyte reaction chamber 5b to limit the size of the solid particles to approximately 1 mm in diameter (i.e., smaller that the minimum dimension of the anolyte flow path in the electrochemical cell 25) thereby preventing solid particles large enough to clog the electrochemical cell 25 flow paths from exiting the anolyte reaction chamber 5b. Contact of the oxidizing species with incomplete oxidation products that are gaseous at the conditions within the anolyte reaction chamber 5b may be further enhanced by using conventional techniques for promoting gas/liquid contact (e.g., ultrasonic vibration 9, mechanical mixing 7). An ultraviolet source 11 is introduced into the anolyte reaction chamber 5b to decompose the hydrogen peroxide formed by the MEO process into free hydroxyl radicals.

Figure 1D:
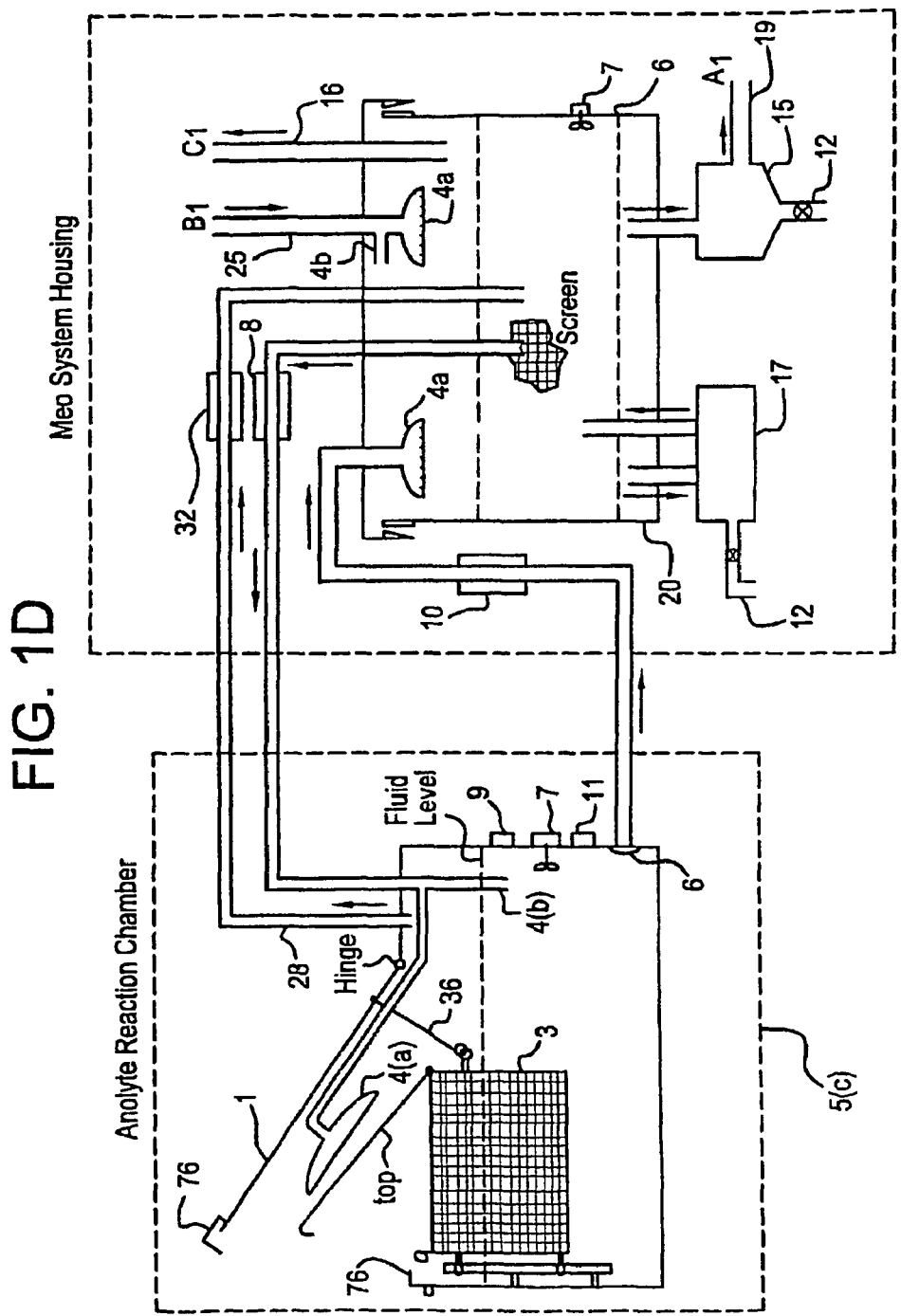
FIG. 1D Anolyte Reaction Chamber Remote is a schematic representation of the anolyte reaction chamber used for destruction of mixed waste and/or dissolution of transuranic/actinides where the anolyte reaction chamber is separated from the basic MEO apparatus. This configuration allows the chamber to be a part of production line or similar use.
Figure 1E:
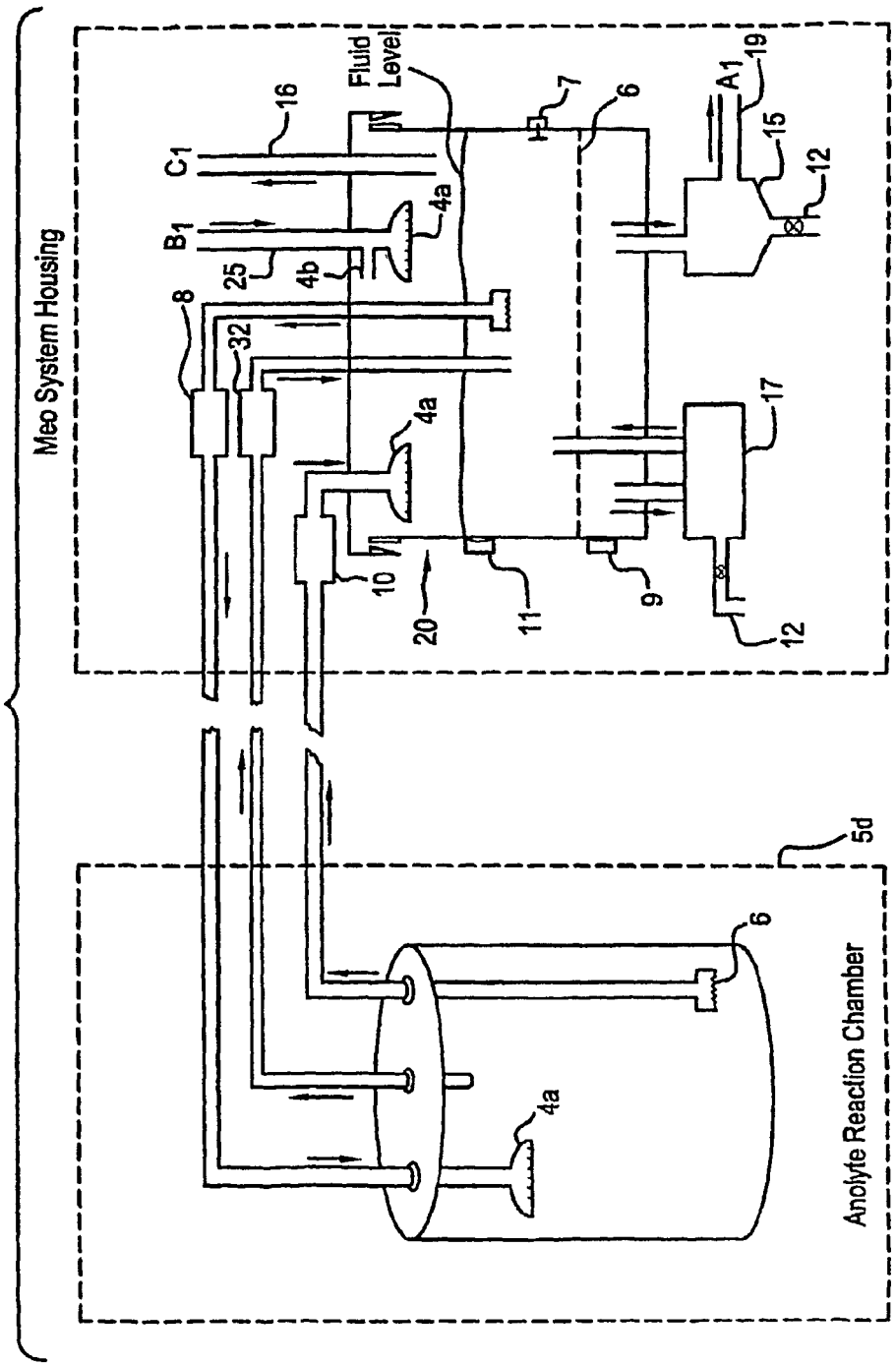
FIG. 1E Storage Container Used as Anolyte Reaction Chamber is a schematic representation of an anolyte reaction chamber that is a container contaminated with transuranic/actinides. The MEO process will decontaminate this type of equipment, instruments, glassware, and containers (such as 50 gallon drums) by destroying the mixed waste and dissolving the transuranic/actinides. This configuration is used to decontaminate items and clean them for future use or disposal.

The anolyte reaction chamber 5c in FIG. 1D is designed to use an anolyte reaction chamber that is exterior to the basic MEO apparatus. Typical of this configuration is an apparatus that is similar to an ultrasonic bath. The anolyte reaction chamber 5c may be integrated into a production process to be used to destroy halogenated hydrocarbons as a part of the process. The anolyte reaction chamber 5c may be connected to the basic MEO apparatus through tubing and a pumping system. The anolyte is pumped from the buffer tank 20 in the basic MEO apparatus by the pump 8 where it is introduced into the anolyte reaction chamber 5c through spray head 4(a) as a spray onto the anolyte surface thereby promoting contact with (i.e., oxidation of) any immiscible organic surface layers present in addition to reacting with (i.e., oxidizing) the mixed waste and/or transuranic/actinides dissolved, suspended or submerged within the anolyte in the anolyte reaction chamber 5c. The inlet to pump 8 is protected by an in-line screen filter 6 which prevents solid particles large enough to clog the spray head 4(a) from exiting the buffer tank 20. Contact of the oxidizing species with incomplete oxidation products that are gaseous at the conditions within the anolyte reaction chamber 5c may be further enhanced by using conventional techniques for promoting gas/liquid contact (e.g., ultrasonic vibration 9, mechanical mixing 7). An ultraviolet source 11 is introduced into the anolyte reaction chamber 5c to decompose the hydrogen peroxide formed by the MEO process into free hydroxyl radicals. The input pump 10 pumps the anolyte and mixed waste and/or transuranic/actinides liquid in the anolyte reaction chamber 5c back to the buffer tank in the basic MEO apparatus through a return tube protected by an in-line screen filter 6 which prevents solid particles large enough to clog the spray head 4(a) from exiting the anolyte reaction chamber 5c. A third tube is connected to the anolyte reaction chamber 5c to pump out any gas that is present from the original contents or from the MEO process. The gas is pumped by the air pump 32. The return gas tube is submerged in the buffer tank 20 in the basic MEO system so as to oxidize any volatile organic compounds in the gas to $CO_2$ before release to the gas cleaning system 16. Contact of the oxidizing species with incomplete oxidation products that are gaseous at the conditions within the anolyte reaction chamber 5c may be further enhanced by using conventional techniques for promoting gas/liquid contact (e.g., ultrasonic vibration 9, mechanical mixing 7). The apparatus continuously circulates the anolyte portion of the electrolyte directly from the electrochemical cell 25 through the buffer tank 20 to maximize the concentration of oxidizing species contacting the waste and/or transuranic/actinides.

The hinged lid 1 is lifted, and the top of the basket 3 is opened. The mixed waste and/or transuranic/actinides is introduced into the wastebasket 3 in the anolyte reaction chamber 5c where the solid waste and/or transuranic/actinides remains while the liquid portion of the waste and/or transuranic/actinides flows into the anolyte. The basket 3 top and the lid 1 are closed and lid 1 has a seal around the opening and it is locked before operation begins. With basket 3 lid closed, the basket 3 is lowered into the anolyte so that all it contents are held submerged in the anolyte throughout the oxidization process.

A mechanical device (penetrator 34) may be incorporated into the basket 3 in the anolyte reaction chamber 5c that create multiple perforations in the outer portion of the solid mixed waste and/or transuranic/actinides so that the anolyte can rapidly penetrate into the interior of the waste and/or transuranic/actinides. The penetrator 34 serves the same purpose it does in the anolyte reaction chamber 5b described in the foregoing section. A filter 6 is located at the base of the buffer tank 20 to limit the size of the solid particles to approximately 1 mm in diameter (i.e., smaller that the minimum dimension of the anolyte flow path in the electrochemical cell 25) thereby preventing solid particles large enough to clog the electrochemical cell 25 flow paths from exiting the buffer tank (20).

The anolyte reaction chamber 5d in FIG. 1E is designed to use a closed container exterior to the basic apparatus as the anolyte reaction chamber. FIG. 1E illustrates one example of an exterior container, which in this case is a metal vessel such as a 50 gallon storage drum containing mixed waste and/or transuranic/actinides. A similar system may be applied to a larger buried storage tank with the same results.

The drum may be connected to the basic MEO apparatus through tubing and a pumping system. The anolyte is pumped by the pump 8 from the buffer tank 20 in the basic MEO apparatus into the anolyte reaction chamber 5d where it reacts with the contents and oxidizes the mixed waste and/or transuranic/actinides. The anolyte stream is oscillated within the anolyte reaction chamber 5d to allow for thorough mixing and for cleaning of the walls of the anolyte reaction chamber. The input pump 10 pumps the anolyte and mixed waste and/or transuranic/actinides liquid in the anolyte reaction chamber 5d back to the buffer tank in the basic MEO apparatus through a return tube protected by an in-line screen filter 6 which prevents solid particles large enough to clog the spray head 4(a) from exiting the anolyte reaction chamber 5d. A third tube is connected to the reaction chamber 5d through the air pump 32 to pump out any gas that is present from the original contents or from the MEO process. The return gas tube is submerged below the anolyte level in the buffer tank 20 in the basic MEO system so as to oxidize any volatile organic compounds in the gas to $CO_2$ before release to the gas cleaning system 16.

The anolyte from the electrochemical cell 25 is introduced into the buffer tank 20 through the spray head 4(a) and stream head 4(b). The two heads are designed to increase the exposure of the mixed waste and/or transuranic/actinides to the anolyte by enhancing the mixing in the anolyte reaction chambers. Introducing the anolyte into the buffer tank 20 as a spray onto the anolyte surface promotes contact with (i.e., oxidation of) any immiscible halogenated hydrocarbon surface layers present.

The MEO apparatus continuously circulates the anolyte portion of the electrolyte directly from the electrochemical cell 25 into the buffer tank 20 to maximize the concentration of oxidizing species contacting the waste and/or transuranic/actinides. A filter 6 is located at the base of the buffer tank to-limit the size of the solid particles to approximately 1 mm in diameter (i.e., smaller than the minimum dimension of the anolyte flow path in the electrochemical cell 25). Contact of the oxidizing species with incomplete oxidation products that are gaseous at the conditions within the buffer tank 20 may be enhanced by using conventional techniques for promoting gas/liquid contact (e.g., ultrasonic vibration 9, mechanical mixing 7). An ultraviolet source 11 is introduced into the buffer tank 20 to decompose the hydrogen peroxide formed by the MEO process into free hydroxyl radicals.

All surfaces of the apparatus in contact with the anolyte are composed of stainless steel, glass, or nonreactive polymers (e.g., polytetrafluoroethylene (PTFE), PTFE lined tubing, etc), PTFE coated metallic tubing, glazed ceramic, glazed metallic, and glazed composite from metallurgic isostatic pressing. These materials provide an anolyte containment boundary to protect the components of the MEO apparatus from being oxidized by the electrolyte.

The anolyte circulation system contains a pump 19 and a removal and treatment system 15 (e.g., filter, centrifuge, hydrocyclone, etc.) to remove any insoluble inorganic compounds that form as a result of mediator or electrolyte ions reacting with anions of or containing halogens, sulfur, phosphorous, nitrogen, etc. that may be present in the waste and/or transuranic/actinides stream thus preventing formation of unstable compounds (e.g., perchlorates, etc.). The anolyte is then returned to the electrochemical cell 25, where the oxidizing species are regenerated, which completes the circulation in the anolyte system (A).

The residue of the inorganic compounds is flushed out of the treatment system 15 during periodic maintenance if necessary. If warranted, the insoluble inorganic compounds are converted to water-soluble compounds using any one of several chemical or electrochemical processes.

Waste and/or transuranic/actinides is added to the anolyte reaction chambers 5(a,b,c,d) either continuously or in the batch mode depending on the anolyte reaction configuration chosen.

The MEO system apparatus incorporates two methods that may control the rate of destruction of mixed waste and/or dissolution of the transuranic/actinides and control the order of which halogenated hydrocarbon molecular bonds are broken. In first method the anolyte temperature is initially at or below the operating temperature and subsequently increased by the thermal controls 21 and 22 until the desired operating temperature for the specific waste and/or transuranic/actinides stream is obtained. In the second method the mixed waste and/or transuranic/actinides is introduced into the apparatus, with the concentration of electrochemically generated oxidizing species in the anolyte being limited to some predetermined value between zero and the maximum desired operating concentration for the waste stream by controlling of the electric current in the electrochemical cell 25 with the dc power supply 29 and subsequently increased to the desired operating concentration. These two methods can be used in combination.

The electrolyte is composed of an aqueous solution of mediator species and electrolytes appropriate for the species selected and is operated within the temperature range from approximately 0° C. to slightly below the boiling point of the electrolytic solution, usually less then 100° C., at a temperature or temperature profile most conducive to the desired mixed waste destruction rate (e.g., most rapid, most economical, etc.). The acid, alkaline, or neutral salt electrolyte used is determined by the conditions in which the species may exist.

Considerable attention has been paid to halogens, especially chlorine and their deleterious interactions with silver mediator ions, however this is of much less concern or importance to this invention. The wide range of properties (e.g., oxidation potential, solubility of compounds, cost, etc.) of the mediator species claimed in this patent allows selection of a single or mixture of mediators either avoiding formation of insoluble compounds, or easily recovering the mediator from the precipitated materials, or being sufficiently inexpensive so as to allow the simple disposal of the insoluble compounds as waste, while still maintaining the capability to oxidize (i.e., destroy) the mixed waste economically.

The mixed waste destruction process may be monitored by several electrochemical and physical methods. First, various cell voltages (e.g., open circuit, anode vs. reference electrode, ion specific electrode, etc.) yield information about the ratio of oxidized to reduced mediator ion concentrations which may be correlated with the amount of reducing agent (i.e., mixed waste and/or transuranic/actinides) either dissolved in or wetted by the anolyte. Second, if a color change accompanies the transition of the mediator species between it's oxidized and reduced states (e.g., heteropoly blues, etc.), the rate of decay of the color associated with the oxidized state, under zero current conditions, could be used as a gross indication of the amount of reducing agent (i.e., oxidizable waste and/or transuranic/actinides) present. If no color change occurs in the mediator, it may be possible to select another mediator to simply serve as the oxidization potential equivalent of a pH indicator. Such an indicator is required to have an oxidation potential between that of the working mediator and the halogenated hydrocarbon, species, and a color change associated with the oxidization state transition.

The anolyte reaction chambers 5(*a,b,c,d*) off-gas consists of $CO_2$ and CO from complete and incomplete combustion (i.e., oxidation) of the carbonaceous material in the mixed waste, and possibly oxygen from oxidation of water molecules at the anode. Standard anesthesiology practice requires these three gases to be routinely monitored in real time under operating room conditions, while many other respiratory related medical practices also require real time monitoring of these gases. Thus, a mature industry exists for the production of miniaturized gas monitors directly applicable to the continuous quantitative monitoring of anolyte off-gas for the presence of combustion products. Although usually not as accurate and requiring larger samples, monitors for these same gasses are used in the furnace and boiler service industry for flue gas analysis.

The anolyte is circulated into the reaction chambers 5(*a,b,c,d*) through the electrochemical cell 25 by pump 19 on the anode 26 side of the membrane 27. A membrane 27 in the electrochemical cell 25 separates the anolyte portion and catholyte portion of the electrolyte.

Small thermal control units 21 and 22 are connected to the flow stream to heat or cool the anolyte to the selected temperature range. If warranted a heat exchanger 23 can be located immediately upstream from the electrochemical cell 25 to lower the anolyte temperature within the cell to the desired level. Another heat exchanger 24 can be located immediately upstream of the anolyte reaction chamber inlet to control the anolyte temperature in the reaction chamber to within the desired temperature range to affect the desired chemical reactions at the desired rates.

The electrochemical cell 25 is energized by a DC power supply 29, which is powered by the AC power supply 30. The DC power supply 29 is low voltage high current supply usually operating below 4V DC but not limited to that range. The AC power supply 30 operates off a typical 110v AC line for the smaller units and 240v AC for the larger units.

The oxidizer species population produced by electrochemical generation (i.e., anodic oxidation) of the oxidized form of the redox couples referenced herein can be enhanced by conducting the process at low temperatures, thereby reducing the rate at which thermally activated parasitic reactions consume the oxidizer.

Reaction products resulting from the oxidation processes occurring in the anolyte system (A) that are gaseous at the anolyte operating temperature and pressure are discharged to the condenser 13. The more easily condensed products of incomplete oxidation are separated in the condenser 13 from the anolyte off-gas stream and are returned to the anolyte reaction chamber 5(*a,b,c*) or the buffer tank 20 for further oxidation. The non-condensable incomplete oxidation products (e.g., low molecular weight organics, carbon monoxide, etc.) are reduced to acceptable levels for atmospheric release by a gas cleaning system 16. The gas cleaning system 16 is not a necessary component of the MEO apparatus for the destruction of most types of mixed waste and/or dissolution of the transuranic/actinides.

If the gas cleaning system 16 is incorporated into the MEO apparatus, the anolyte off-gas is contacted in a counter current flow gas scrubbing system in the off-gas cleaning system 16 wherein the noncondensibles from the condenser 13 are introduced into the lower portion of the column through a flow distribution system of the gas cleaning system 16 and a small side stream of freshly oxidized anolyte direct from the electrochemical cell 25 is introduced into the upper portion of the column. This results in the gas phase continuously reacting with the oxidizing mediator species as it rises up the column past the down flowing anolyte. Under these conditions the gas about to exit the top of the column may have the lowest concentration of oxidizable species and also be in contact with the anolyte having the highest concentration of oxidizer species thereby promoting reduction of any air pollutants present down to levels acceptable for release to the atmosphere. Gas-liquid contact within the column may be promoted by a number of well established methods (e.g., packed column, pulsed flow, ultrasonic mixing, etc,) that does not result in any meaningful backpressure within the anolyte flow system. Anolyte exiting the bottom of the countercurrent scrubbing column is discharged into the anolyte reaction chamber 5(*a,b,c*) or buffer tank 20 and mixed with the remainder of the anolyte. Unique waste and/or transuranic/actinides compositions may result in the generation of unusual gaseous products that could more easily be removed by more traditional air pollution technologies. Such methodologies could be used in series with the afore described system as a polishing process treating the gaseous discharge from the countercurrent column, or if advantageous, instead of it. The major products of the oxidation process are $CO_2$, and water (including minor amounts of Co and inorganic salts), where the $CO_2$ is vented 14 out of the system.

An optional inorganic compound removal and treatment systems 15 is used should there be more than trace amount of halogens, or other precipitate forming anions present in the mixed waste being processed, thereby precluding formation of unstable oxycompounds (e.g., perchlorates, etc.).

The MEO process proceeds until complete destruction of the mixed waste and/or the dissolution of the transuranic/actinides has been affected.

Catholyte System (B)

The bulk of the catholyte is resident in the catholyte reaction chamber 31. All surfaces of the apparatus in contact with the catholyte are composed of acid and alkaline resistant materials. The catholyte portion of the electrolyte is circulated by pump 43 through the electrochemical cell 25 on the cathode 28 side of the membrane 27. The catholyte portion of the electrolyte flows into a catholyte reservoir 31. Small thermal control units 45 and 46 are connected to the catholyte flow stream to heat or cool the catholyte to the selected temperature range.

External air is introduced through an air sparge 37 into the catholyte reservoir 31. In the case where nitrogen compounds (such as nitrates) are used in the catholyte, the oxygen contained in the air oxidizes any nitrous acid and the small amounts of nitrogen oxides ($NO_x$), produced by the cathode reactions. Contact of the oxidizing gas with nitrogen compounds (nitrous acid) may be enhanced by using conventional techniques for promoting gas/liquid contact such as ultrasonic vibration 48, mechanical mixing 35, etc. Systems using non-nitric acid catholytes may also require air sparging to dilute and remove off-gas such as hydrogen. An off-gas cleaning system 39 is used to remove any unwanted gas products (e.g. $NO_2$, etc.). The cleaned gas stream, combined with the unreacted components of the air introduced into the system is discharged through the atmospheric vent 47.

Optional anolyte recovery system 41 is positioned on the catholyte side. Some mediator oxidizer ions may cross the membrane 27 and this option is available if it is necessary to remove them through the anolyte recovery system 41 to maintain process efficiency or cell operability, or their economic worth necessitates their recovery. Operating the electrochemical cell 25 at higher than normal membrane 27 current densities (i.e., above about 0.5 amps/cm$^2$) increases the rate of mixed waste destruction and/or the dissolution of the transuranic/actinides, but also result in increased mediator ion transport through the membrane into the catholyte. It may be economically advantageous for the electrochemical cell 25 to be operated in this mode. It is advantageous whenever the replacement cost of the mediator species or removal/recovery costs are less than the cost benefits of increasing the waste throughput (i.e., oxidation rate) of the electrochemical cell 25. Increasing the capitol cost of expanding the size of the electrochemical cell 25 can be avoided by using this operational option.

MEO Controller

Figure 3:
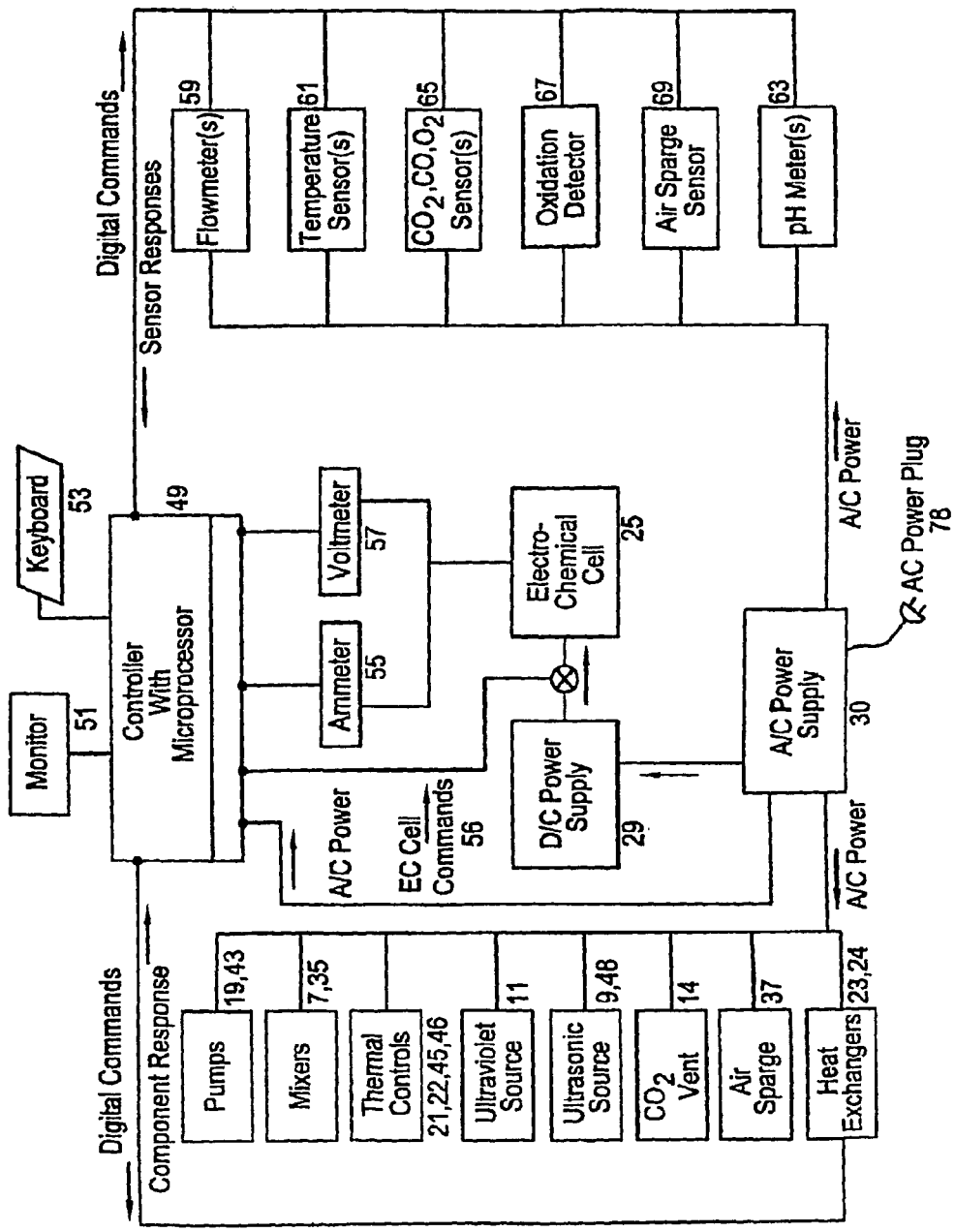
FIG. 3 MEO Controller for System Model 5.b is a schematic representation of the MEO electrical and electronic systems.

An operator runs an MEO Apparatus (FIG. 1A) by using an MEO Controller. FIG. 3 MEO Controller for System Model 5.b is used to depict a typical controller such as would be used with MEO Apparatus (FIG. 1A). The controller 49 with microprocessor is connected to a monitor 51 and a keyboard 53. The operator inputs commands to the controller 49 through the keyboard 53 responding to the information displayed on the monitor 51. The controller 49 runs a program that sequences the steps for the operation of the MEO apparatus. The program has pre-programmed sequences of standard operations that the operator may follow or may choose his own sequences of operations. The controller 49 allows the operator to select his own sequences within limits that assure a safe and reliable operation. The controller 49 sends digital commands that regulates the electrical power (AC 30 and DC 29) to the various components in the MEO apparatus; pumps 19 and 43, mixers 7 and 35, thermal controls 21, 22, 45, 46, ultraviolet sources 11, ultrasonic sources 9 and 48, $CO_2$ vent 14, air sparge 37, and electrochemical cell 25. The controller receives component response and status from the components. The controller sends digital commands to the sensors to access sensor information through sensor responses. The sensors in the MEO apparatus provide digital information on the state of the various components. Sensors measure flow rate 59, temperature 61, pH 63, $CO_2$, CO, $O_2$, venting 65, degree of oxidation 67, air sparge sensor 69, etc. The controller 49 receives status information on the electrical potential (voltmeter 57) across the electrochemical cell, or individual cells if a multi-cell configuration, and between the anode(s) and reference electrodes internal to the cell(s) 25 and the current (ammeter 55) flowing between the electrodes within each cell.

Example System Model

A preferred embodiment, MEO System Model 5.b (shown in FIG. 2 MEO System Model 5.b) is sized for use for a small to mid-size application for the destruction of solids and mixtures of solids and liquid mixed waste and/or transuranic/actinides being batch feed. This embodiment depicts a configuration using the system apparatus presented in FIGS. 1A and 1C. Other preferred embodiments (representing FIGS. 1B, 1D, and 1E have differences in the external configuration and size but are essentially the same in internal function and components as depicted in FIGS. 1A and 1C.

The preferred embodiment in FIG. 2 comprises a housing 72 constructed of metal or high strength plastic surrounding the electrochemical cell 25, the electrolyte and the foraminous basket 3. The AC power is provided to the AC power supply 30 by the power cord 78. A monitor screen 51 is incorporated into the housing 72 for displaying information about the system and about the waste and/or transuranic/actinides being treated. Additionally, a control keyboard 53 is incorporated into the housing 72 for inputting information into the system. The monitor screen 51 and the control keyboard 53 may be attached to the system without incorporating them into the housing 72. In a preferred embodiment, status lights 73 are incorporated into the housing 72 for displaying information about the status of the treatment of the mixed waste and/or transuranic/actinides material. An air sparge 37 is incorporated into the housing 72 to allow air to be introduced into the catholyte reaction chamber 31 below the surface of the catholyte. In addition, a $CO_2$ vent 14 is incorporated into the housing 72 to allow for $CO_2$ release from the anolyte reaction chamber 5*b* via the gas cleaning system 16 housed within. In a preferred embodiment, the housing includes means for cleaning out the MEO waste treatment system, including a flush(s) 18 and drain(s) 12 through which the anolyte and catholyte pass. The preferred embodiment further comprises an atmospheric vent 47 facilitating the releases of gases into the atmosphere from the catholyte reaction chamber 31 via the gas cleaning system 39. Other preferred embodiment systems are similar in nature but are scaled up in size to handle a larger capacity of waste, such as a incinerator replacement units.

The system has a control keyboard 53 for input of commands and data. The On/Off button 74 is used to turn the apparatus power on and off. There is a monitor screen 51 to display the systems operation and functions. Below the keyboard 53 and monitor screen 51 are the status lights 73 for on, off, and standby.

Mixed waste and/or transuranic/actinides is introduced into the anolyte reaction chambers 5b as depicted in FIGS. 1C. In the case of solid, mixtures, and batch feed operation, the hinged lid 1 is opened and the mixed waste and/or transuranic/actinides is deposited in the basket 3 in the anolyte reaction chamber 5b. The top of basket 3 is closed and the basket 3 is lowered so that the mixed waste and/or transuranic/actinides is totally submerged in the anolyte. Lid 1 is closed and lid stop 2 keeps the lid opening controlled. The hinged lid 1 is equipped with a locking latch 76 that is operated by the controller 49. A penetrator 34 attached to the basket 3 punctures the solids in the basket 3 thus increasing the surface area exposed to the oxidizer and providing mediator flow paths into the interior of the solid mixed waste and/or transuranic/actinides.

In the anolyte reaction chamber 5b is the aqueous acid, alkali, or neutral salt electrolyte and mediated oxidizer species solution in which the oxidized form of the mediator redox couple initially may be present or may be generated electrochemically after introduction of the mixed waste and/or transuranic/actinides and application of DC power 29 to the electrochemical cell 25. Similarly, the mixed waste and/or transuranic/actinides may be introduced when the anolyte is at or below room temperature, operating temperature or some optimum intermediate temperature. DC power supply 29 provides direct current to an electrochemical cell 25. Pump 19 circulates the anolyte portion of the electrolyte and the mixed waste and/or transuranic/actinides material is rapidly oxidized at temperatures below 100° C. and at ambient pressure. An in-line filter 6 prevents solid particles large enough to clog the electrochemical cell 25 flow paths from exiting this anolyte reaction chamber 5b. The oxidation process continues to break the materials down into smaller and smaller molecules until the products are $CO_2$, water, and some CO and inorganic salts. Any residue is pacified in the form of a salt and may be periodically removed through the Inorganic Compound Removal and Treatment System 15 and drain outlets 12. The basic design of the MEO apparatus permits the user to change the type of electrolyte without having to alter the equipment in the apparatus. The changing of the electrolyte is accomplished by using the drain(s) 12 and flush(s) 18 or by opening the anolyte reaction chamber 5b and catholyte reaction chamber 31 to introduce the electrolyte(s). The ability to change the type of electrolyte(s) allows the user to tailor the MEO process to differing mixed waste and/or transuranic/actinides properties. The catholyte reservoir 31 has a screwed top 33 (shown in FIG. 1A), which allow access to the reservoir 31 for cleaning and maintenance by service personnel.

The MEO process advantageous properties of low power consumption and very low loses of the mediated oxidizer species and electrolyte, provide as an option for the device to be operated at a low power level during the day to achieve a 'slow rate of destruction of the mixed waste and/or the dissolution of the transuranic/actinides throughout the day. While the MEO apparatus is in this mode, mixed waste and/or transuranic/actinides is added as it is generated throughout the day and the unit placed in full activation during non-business hours.

The compactness of the device makes it ideal small and mid-size applications as well as being suitable for use with high volume inputs of industrial processes activities. The process operates at low temperature and ambient atmospheric pressure and does not generate toxic compounds during the destruction of the mixed waste and/or dissolution of the transuranic/actinides, making the process indoors compatible. The system is scalable to a unit large enough to replace a hospital incinerator system. The $CO_2$ oxidation product from the anolyte system A is vented out the $CO_2$ vent 14. The off-gas products from the catholyte system B is vented through the atmospheric air vent 47 as shown.

Steps of the Operation of the MEO System Model 5.b

Figure 4:
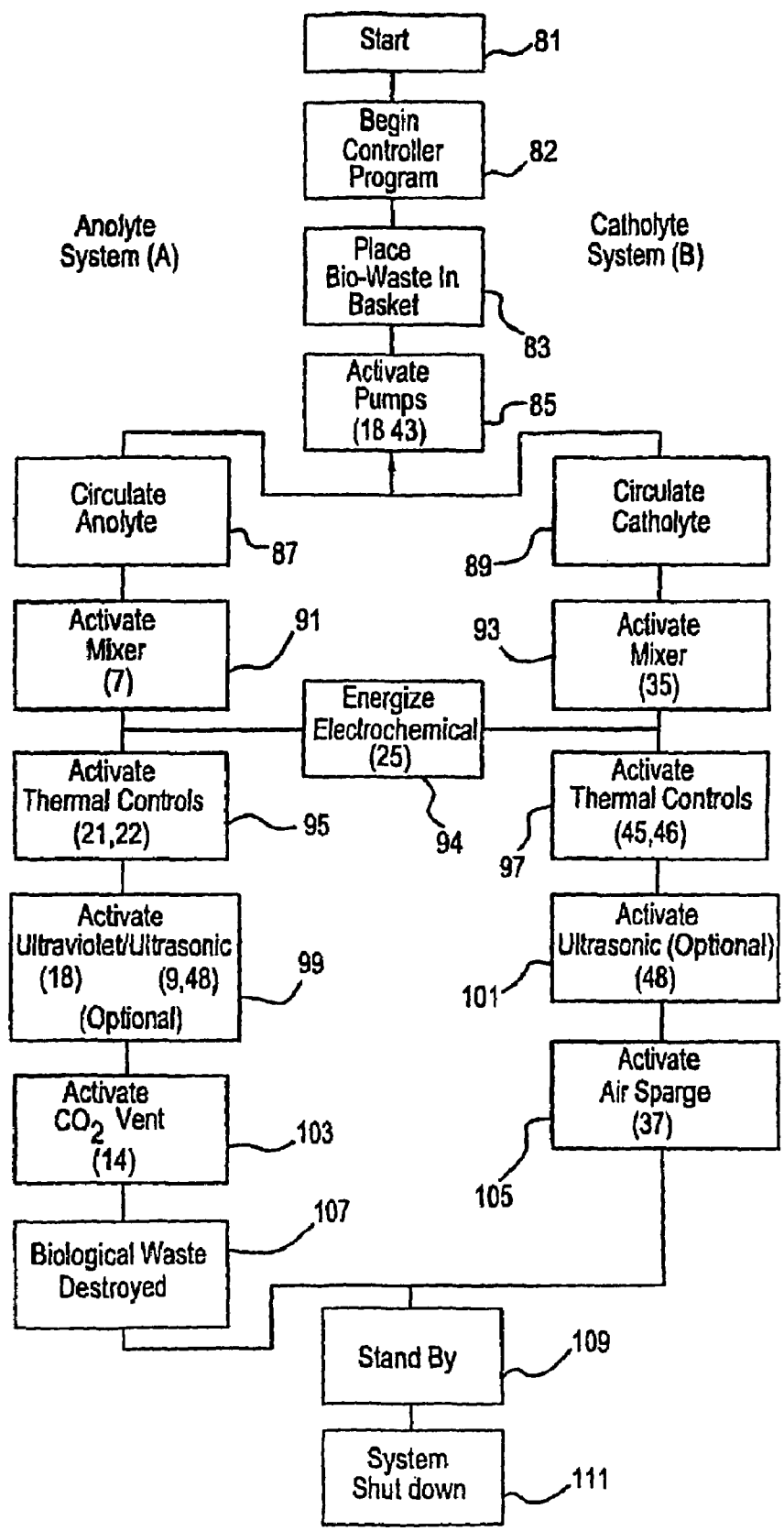
FIG. 4 MEO System Model 5.b Operational Steps is a schematic representation of the generalized steps of the process used in the MEO apparatus System Model 5.b (with the understanding that not all of the components shown therein must necessarily be employed in all situations) and others may be added as needed for a particular application.

The steps of the operation of the MEO process are depicted in FIG. 4 MEO System Model 5.b Operational Steps. These operational steps are presented to illustrate the operation of one of the MEO apparatus' from the four configurations previously discussed for oxidizing the various types of mixed waste. When other anolyte reaction chambers 5(*a,c,d*) configurations are used the series of steps would be similar to the ones for FIG. 1C which covers solids, mixtures of solids and liquids being processed in a batch feed mode.

This MEO apparatus is contained in the housing 72. The MEO system is started 81 by the operator engaging the 'ON' button 74 on the control keyboard 53. The system controller 49, which contains a microprocessor, runs the program that controls the entire sequence of operations 82. The monitor screen 51 displays the steps of the process in the proper sequence. The status lights 73 on the panel provide the status of the MEO apparatus (e.g. on, off, ready, standby).

The mixed waste and/or transuranic/actinides is introduced into the anolyte reaction chambers 5b as depicted in FIG. 1C. In the case of solids, mixtures, and batch operation, lid 1 is opened and the mixed waste and/or transuranic/actinides (which can be in liquid, solid, and a mixture) is placed 83 in the basket 3, whereupon the solid portion of the mixed waste and/or transuranic/actinides is retained and the liquid portion flows through the basket and into the anolyte. The locking latch 76 is activated.

The pumps 19 and 43 begin circulation 85 of the anolyte 87 and catholyte 89, respectively. As soon as the electrolyte circulation is established throughout the system, the mixers 7 and 35 begin to operate 91 and 93. Depending upon mixed waste characteristics (e.g., reaction kinetics, heat of reaction, etc.) it may be desirable to introduce the mixed waste and/or transuranic/actinides into a room temperature or cooler anolyte system with little or none of the mediator redox couple in the oxidized form. Once flow is established the thermal controls units 21, 22, 45, and 46 are turned on 95/97, initiating predetermined anodic oxidation and electrolyte heating programs.

The electrochemical cell 25 is energized 94 (by electrochemical cell commands 56) to apply the correct voltage and current as is monitored by the voltmeter 57 and ammeter 55 determined by the controller program. By using programmed electrical power levels and electrolyte temperature it is possible to maintain a predetermined mixed waste destruction and/or the dissolution of transuranic/actinides rate profile such as a relatively constant reaction rate as the more reactive mixed waste and/or transuranic/actinides components are oxidized, thus resulting in the remaining mixed waste and/or transuranic/actinides becoming less and less reactive, thereby requiring more and more vigorous oxidizing conditions.

The ultrasonic sources 9 and 48 and ultraviolet systems 11 are activated 99 and 101 in the anolyte reaction chambers 5b and catholyte reaction chamber 31 respectively, if those options are chosen in the controller program.

The $CO_2$ vent 14 is activated 103 to release $CO_2$ from the mixed waste and/or transuranic/actinides oxidation process in the anolyte reaction chambers 5b. Air sparge 37 draws air 105 into the catholyte reservoir 31, and the air is discharged out the atmospheric vent 47. The progress of the destruction process may be monitored in the controller (oxidation sensor 67) by various cell voltages and currents 55, 57 (e.g., open circuit, anode vs. reference electrode, ion specific electrodes, etc,) as well as monitoring anolyte off-gas (using the sensor 65) composition for $CO_2$, CO and oxygen content.

When the oxidation sensors 65 and 67 determine the desired degree of mixed waste destruction and/or the dissolution of transuranic/actinides has been obtained 107, the system goes to standby 109. The system operator executes system shutdown 111 using the controller keyboard 53.

EXAMPLES

The following examples illustrate the application of the process and the apparatus.

Example (1)

Destruction of Mixed Waste Surrogates

The following surrogates have been destroyed in the MEO System Apparatus: tungsten carbide, manganese dioxide, etc. The destruction results were the oxidizing of the surrogates into solution.

Example (2)

Efficient and Environmentally Safe Products

The MEO process produces oxidized the mixed waste into $CO_2$, water, and trace inorganic salts all of which are considered benign for introduction into the environment by regulatory agencies. The transuranic/actinides ions produced by the MEO process are removed from the anolyte solution by either a precipitation or filtering process. The cost of using the MEO process in this invention is competitive with both the existing methodologies (silver II, cobalt III, cerium IV and peroxysulfate). The MEO process is uniquely suited for destruction of mixed waste because water is actually a source of secondary oxidizing species, rather than parasitic reactions competing for the mediator oxidizing species. Furthermore, the energy that must be provided in the MEO process to heat the waste stream water component from ambient to the electrolyte operating temperature (i.e., 80° C. maximum temperature increase) is trivial compared to the water enthalpy increase required in incineration based processes.

Example (3)

System Flexibility

The system is built so that the composition of the electrolyte may be changed to adapt the system to a given composition of the mixed waste and/or transuranic/actinides stream. Different composition of mixed waste and/or transuranic/actinides stream can be processed by the same system by either using the same electrolyte or replacing the mediator and electrolyte (either or both the catholyte and anolyte) more suitable for the alternative mixed waste and/or transuranic/actinides. The system is configured with ports to flush and drain the anolyte and catholyte separately.

Example (4)

System By-Products are Safe

The system flexibility provides for the introduction of more then one mediator ion resulting in marked improvement in the efficiency of the electrolyte. Furthermore, the wide choice of mediators listed in Table I or available as POMs, and electrolytes in this patent, desensitizes the system to the formation of participates in solution (i.e. allows increased ease in preventing formation of unstable oxy compounds).

While the invention has been described with reference to specific embodiments, modifications and variations of the invention may be constructed without departing from the scope of the invention, which is defined in the following characteristics and features.

The invention provides the following new characteristics and features:

1. A process for treating and oxidizing mixed waste and/or tranuranics/actinides materials comprising disposing an electrolyte in an electrochemical cell, separating the electrolyte into an anolyte portion and a-catholyte portion with an ion-selective membrane or semi permeable membrane applying a direct current voltage between the anolyte portion and the catholyte portion, placing the mixed Waste and/or transuranic/actinides materials in the anolyte portion, and oxidizing the mixed waste and/or transuranic/actinides materials in the anolyte portion with a mediated electrochemical oxidation (MEO) process, wherein the anolyte portion further comprises a mediator in aqueous solution and the electrolyte is an acid, neutral or alkaline aqueous solution.

2. The process of paragraph 1, wherein:

a. the anolyte portion further comprises one or more simple anions mediator ions species selected from the group described in Table I in the aqueous solution and the electrolyte is an acid, neutral or alkaline solution;

b. The oxidizing species are selected from one or more Type I isopolyanions (i.e., complex anion redox couple mediators) containing tungsten, molybdenum, vanadium, niobium, tantalum, or combinations thereof as addenda atoms in aqueous solution and the electrolyte is an acid, neutral or alkaline aqueous solution;

c. The oxidizing species are selected from one or more Type I heteropolyanions formed by incorporation into the aforementioned isopolyanions, as heteroatoms, any of the elements listed in Table II, either singly or in combination thereof in the aqueous solutions and the electrolyte is an acid, neutral, or alkaline aqueous solution;

d. The oxidizing species are selected from one or more of any heteropolyanions containing at least one heteroatom type (i.e., element) contained in both Table I and Table II in the aqueous solutions and the electrolyte is an acid, neutral, or alkaline aqueous solution;

e. The oxidizing species are selected from combinations of anion redox couple mediators from any or all of the previous four subparagraphs (2a., 2b., 2c., and 2d.);

f. introducing catalyst additives to the electrolyte and contributing to kinetics of the mediated electrochemical processes while keeping the additives from becoming directly involved in the oxidizing of the mixed waste and/or transuranic/actinides materials;

g. adding stabilizing compounds to the electrolyte and stabilizing higher oxidation state species of the simple and complex anion redox couple mediators;

h. each of the species has normal valence states and higher valence oxidizing states and further comprising creating the higher valence oxidizing states of the oxidizing species by stripping electrons from normal valence state species in the electrochemical cell;

i. the oxidizing species are "super oxidizers" (SO) (typically exhibit oxidation potentials at least equal to that of the $Ce^{+3}/Ce^{+4}$ redox couple (i.e., 1.7 volts at 1 molar, 25° C. and pH 1)) which are redox couple species that have the capability of producing free radicals such as hydroxyl or perhydroxyl and further comprising creating secondary oxidizers by reacting the SO's with water;

j. using an alkaline solution for aiding decomposing of the mixed waste and/or transuranic/actinides materials derived from the saponification (i.e., base promoted ester hydrolysis) of fatty acids to form water soluble alkali metal salts of the fatty acids (i.e., soaps) and glycerin, a process similar to the production of soap from animal fat by introducing it into a hot aqueous lye solution;

k. using an alkaline anolyte solution that absorbs $CO_2$ forming from oxidation of the mixed waste sodium bicarbonate/carbonate solution which subsequently circulates through the electrochemical cell, producing a percarbonate oxidizer;

l. super oxidizers generating inorganic free radicals in aqueous solutions from species such as but not limited to carbonate, azide, nitrite, nitrate, phosphite, phosphate, sulfite, sulfate, selenite, thiocyanate, chloride, bromide, iodide, and formate oxidizing species;

m. regenerating the anolyte portion within the electrochemical cell;

n. the membrane(separator between anolyte and catholyte solutions) can be microporous plastic, sintered glass frit, etc.;

o. the impression of an AC voltage upon the DC voltage to retard the formation of cell performance limiting surface films on the electrode and/or membranes;

p. disposing a foraminous basket in the anolyte;

q. adding oxygen (this is necessary only for $HNO_3^-$ or $NO_3^-$ salts) to the catholyte portion;

r. described in Table I (simple anions); Type I isopolyanions containing tungsten, molybdenum, vanadium, niobium, tantalum, or combinations thereof as addenda atoms; Type I heteropolyanions formed by incorporation into the aforementioned isoopolyanions, as heteroatoms, any of the elements listed in Table II, either singly or in combinations thereof; or any heteropolyanions containing at least one heteroatom type (i.e., element) contained in both Table I and Table II;

s. adjust the temperature (e.g. between 0° C. and slightly below the boiling point) of the anolyte before it enters the electrochemical cell to enhance the generation of the oxidized form of the anion redox couple mediator; and t. adjust the temperature between 0° C. and slightly below the boiling point of the anolyte entering the anolyte reaction chamber to affect the desired chemical reactions at the desired rates following the lowering of the temperature of the anolyte entering the electrochemical cell.

3. The process of paragraph 1, wherein:

a. introducing ultraviolet energy into the anolyte portion and decomposing hydrogen peroxide into hydroxyl free radicals therein, thereby increasing efficiency of the MEO process by converting products of electron consuming parasitic reactions (i.e., ozone and hydrogen peroxide) into viable free radical (i.e., secondary) oxidizers without the consumption of additional electrons;

b. using a surfactant to be added to the anolyte promote dispersion of the mixed waste or intermediate stage reaction products within the aqueous solution when these mixed waste or reaction products are not water-soluble and tend to form immiscible layers;

c. using simple and/or complex redox couple mediators, and attacking specific halogenated hydrocarbon molecules with the oxidizing species while operating at low temperatures thus preventing the formation of dioxins and furans;

c. breaking down mixed waste materials into organic compounds and attacking the organic compounds using either the simple and/or complex anion redox couple mediator or inorganic free radicals to generating organic free radicals;

e. raising normal valence state anions to a higher valence state and stripping the normal valence state anions of electrons in the electrochemical cell; [The oxidized forms of any other redox couples present are produced either by similar anodic oxidation or reaction with the oxidized form of other redox couples present. The oxidized species of the redox couples oxidize the mixed waste and/or transuranic/actinides molecules and are themselves converted to their reduced form, whereupon they are reoxidized by either of the aforementioned mechanisms and the redox cycle continues];

f. circulating anions through an electrochemical cell to affect the anodic oxidation of the reduced form of the reversible redox couple into the oxidized form;

g. contacting anions with mixed waste and/or transuranic/actinides materials in the anolyte portion;

h. circulating anions through the electrochemical cell;

i. involving anions with an oxidation potential above a threshold value of 1.7 volts at 25° C. and pH 1 (i.e., super oxidizer) in a secondary oxidation process and producing oxidizers;

j. adding a ultra-violet (UV) energy source to the anolyte portion and augmenting secondary oxidation processes, breaking down hydrogen peroxide into hydroxyl free radicals, and thus increasing the oxidation processes; and k. The oxidizer species addressed in this patent are described in Table I (simple anions redox couple mediators): Type I IPAs formed by Mo, W, V, Nb, Ta, or mixtures there of; Type I HPAs formed by incorporation into the aforementioned IPAs if any of the elements listed in Table II (heteroatoms) either singly or in thereof; Or any HPA containing at least one heteroatom type (i.e., element) contained in both Table I and Table II or combinations mediator species from any or all of these generic groups.

4. The process of paragraph 1, further comprising:

a. using oxidizer species that are found in situ in the, mixed waste to be destroyed, by circulating the mixed waste-anolyte mixture through an electrochemical cell where the oxidized form of the in situ reversible redox couple formed by anodic oxidation or alternately reacting with the oxidized form of a more powerful redox couple, if added to the anolyte and anodically oxidized in the electrochemical cell, thereby destroying the mixed waste and/or the dissolution of the transuranic/actinides material;

b. using an alkaline electrolyte, such as but not limited to NaOH or KOH with mediator species wherein the reduced form of said mediator redox couple displays sufficient solubility in said electrolyte to allow the desired oxidation of the mixed waste to proceed at a practical rate. The oxidation potential of redox reactions producing hydrogen ions (i.e., both mediator species and mixed waste molecules reactions) are inversely proportional to the electrolyte pH, thus with the proper selection of a mediator redox couple, it is possible, by increasing the electrolyte pH, to minimize the electric potential required to affect the desired oxidation process, thereby reducing the electric power consumed per unit mass of mixed waste destroyed and/or the dissolution of the transuranic/actinides; c. the aqueous solution is chosen from acids such as but not limited to nitric acid, sulfuric acid, or phosphoric acid, or mixtures thereof; or alkalines such as but not limited to of sodium hydroxide or potassium hydroxide, or mixtures thereof, or neutral electrolytes,. such as but not limited to sodium or potassium nitrates, sulfates, or phosphates or mixtures thereof; and d. the use of ultrasonic energy induce microscopic bubble implosion which may be used to affect a desired reduction in size of the individual second phase waste volumes dispersed in the anolyte.

5. The process of paragraph 1, further comprising:
   a. interchanging oxidizing species in a preferred embodiment without changing equipment; and
   b. the electrolyte is acid, neutral, or alkaline in aqueous solution.

6. The process of paragraph 1, further comprising:
   a. separating the anolyte portion and the catholyte portion with an ion-selective or semi permeable membrane or microporous polymer, porous ceramic or glass frit membrane;
   b. energizing the electrochemical cell at a electrical potential sufficient to form the oxidized form of the redox couple having the highest oxidation potential in the anolyte;
   c. introducing mixed waste materials into the anolyte portion;
   d. forming the reduced form of one or more reversible redox couples by contacting with oxidizable molecules, the reaction with which oxidizes the oxidizable material with the concuminent reduction of the oxidized form of the reversible redox couples to their reduced form;
   e. a ultrasonic source connected to the anolyte for augmenting secondary oxidation processes by momentarily heating the hydrogen peroxide in the electrolyte to 4800° C. at 1000 atmospheres thereby dissociating the hydrogen peroxide into hydroxyl free radicals thus increasing the oxidation processes;
   f. oxidation potentials of redox reactions producing hydrogen ions are inversely related to pH;
   g. the process is performed at a temperature from slightly above 0° C. to slightly below the boiling point of the electrolyte usually less then 100° C.;
   h. the temperature at which the process is performed is varied;
   i. the treating and oxidizing mixed waste and/or transuranic/actinides comprises treating and oxidizing solid waste and/or transuranic/actinides;
   j. the treating and oxidizing mixed waste and/or transuranic/actinides comprises treating and oxidizing liquid waste and/or transuranic/actinides;
   k. the treating and oxidizing mixed waste and/or transuranic/actinides comprises treating and oxidizing a combination of liquids and solids; and
   l. removing and treating precipitates resulting from combinations of oxidizing species and other species released from the mixed waste during destruction.

7. The process of paragraph 1, further comprising that it is not necessary for both the anolyte and catholyte solutions to contain the same electrolyte rather each electrolyte system may be independent of the other, consisting of an aqueous solution of acids, typically but not limited to nitric, sulfuric or phosphoric; alkali, typically but not limited to sodium or potassium hydroxide; or neutral salt, typically but not limited to sodium or potassium salts of the afore mentioned strong acids.

8. The process of paragraph 1, further comprising the operating of the electrochemical cell at a current density greater then 0.5 amp per square centimeter across the membrane, even though this is the limit over which there is the possibility that metallic anions may leak through the membrane in small quantities, and recovering the metallic anions through a devise such as a resin column thus allowing a greater rate of destruction of materials in the anolyte chamber.

9. The process of paragraph 1, wherein:
   a. the catholyte solution further comprises an aqueous solution and the electrolyte in the solution is composed of acids, typically but not limited to nitric, sulfuric or phosphoric; or alkali, typically but not limited to sodium or potassium hydroxide; or neutral salt, typically but not limited to sodium or potassium salts of the afore mentioned strong acids;
   b. adding oxygen (this is necessary only for $HNO_3^-$ or $NO_3^-$ salts) to the catholyte portion;
   c. concentration of electrolyte in the catholyte is governed by its effect upon the conductivity of the catholyte solution desired in the electrochemical cell;
   d. ultrasonic energy induced microscopic bubble implosion is used to affect vigorous mixing in the catholyte solution where it is desirable to oxidize nitric acid and the small amounts of nitrogen oxides when nitric acid is used in the catholyte electrolyte;
   e. mechanical mixing is used to affect vigorous mixing in the catholyte solution where it is desirable to oxidize nitric acid and the small amounts of nitrogen oxides;
   f. air is introduced into the catholyte solution to promote oxidation of nitric acid and the small amounts of nitrogen oxides when nitric acid is used in the catholyte electrolyte;
   g. air is introduced into the catholyte solution to dilute any hydrogen produced in the catholyte solution before being released; and
   h. hydrogen gas evolving from the cathode is feed to an apparatus that uses hydrogen as a fuel such as a proton exchange membrane (PEM)fuel cell.

10. An apparatus for treating and oxidizing mixed waste and/or transuranic/actinides materials comprising an electrochemical cell, an electrolyte disposed in the electrochemical cell, an ion-selective or semi permeable membrane, disposed in the electrochemical cell for separating the cell into anolyte and catholyte chambers and separating the electrolyte into anolyte and catholyte portions, electrodes further comprising an anode and a cathode disposed in the electrochemical cell respectively in the anolyte and catholyte chambers and in the anolyte and catholyte portions of the electrolyte, a power supply connected to the anode and the cathode for applying a direct current voltage between the anolyte and the catholyte portions of the electrolyte, and oxidizing of the mixed waste and/or transuranic/actinides materials in the anolyte portion with a mediated electrochemical oxidation (MEO) process wherein the anolyte portion further comprises a mediator in aqueous solution and the electrolyte is an acid, neutral or alkaline aqueous solution.

11. The apparatus of paragraph 10, wherein:
   a. adding stabilizing compounds to the electrolyte such as tellurate or periodate ions which serve to overcome and stabilize the short lifetime of the oxidized form of the higher oxidation state species of the simple and complex anion redox couple mediators;
   b. the oxidizer species addressed in this patent are described in Table I (simple anions redox couple mediators);
   c. the oxidizer species addressed in this patent are described in Table I (simple anions redox couple mediators):

Type I IPAs formed by Mo, W, V, Nb, Ta, or mixtures there of; Type I HPAs formed by incorporation into the aforementioned IPAs if any of the elements listed in Table II (heteroatoms) either singly or in thereof; Or any HPA containing at least one heteroatom type (i.e., element) contained in both Table I and Table II;

d. the oxidizer species addressed in this patent are combinations mediator species from any or all of these generic groups;

e. the oxidizing species are super oxidizers and further comprising creating secondary oxidizers by reacting the super oxidizers with the aqueous anolyte;

f. an alkaline solution for aiding decomposing the mixed waste and the dissolution of the actinide materials;

g. an alkaline solution for absorbing $CO_2$ and forming alkali metal bicarbonate/carbonate for circulating through the electrochemical cell for producing a percarbonate oxidizer;

h. using oxidizing species from the MEO process inorganic free radicals may be generated in aqueous solutions derived from carbonate, azide, nitrite, nitrate, phosphite, phosphate, sulfite, sulfate, selenite, thiocyanate, chloride, bromide, iodide, and species;

i. organic free radicals for aiding the MEO process and breaking down the mixed waste materials into simpler (i.e., smaller molecular structure) organic compounds;

j. anions with an oxidation potential above a threshold value of 1.7 at 25° C. and pH 1 volts (i.e., super oxidizer) for involving in a secondary oxidation process for producing oxidizers;

k. the use of ultrasonic energy induce microscopic bubble implosion which is used to affect a desired reduction in sized of the individual second phase mixed waste volumes dispersed in the anolyte;

l. membrane can be microporous polymer, ceramic or glass frit;

m. with the possible impression of an AC voltage upon the DC voltage to retard the formation of cell performance limiting surface films on the electrode and/or membranes; and n. external air is introduced through an air sparge into the catholyte reservoir where oxygen contained in the air oxidizes nitrogen compounds produced by the cathode reactions (this is necessary only when nitrogen compounds can occur in the catholyte).

12. The apparatus of paragraph 10, wherein:

a. each of the oxidizing species has normal valence states (i.e., reduced form of redox couple) and higher valence oxidizing states and further comprising creating the higher valence oxidizing states (i.e., oxidized form of redox couple) of the oxidizing species by stripping and reducing electrons off normal valence state species in the electrochemical cell;

b. using species that are usable in alkaline solutions since oxidation potentials of redox reactions producing hydrogen ions are inversely related to pH which reduces the electrical power required to destroy the mixed waste;

c. further oxidizing species, and attacking specific halogenated hydrocarbon molecules with the oxidizing species while operating at temperatures sufficiently low so as to preventing the formation of toxic materials (such as dioxins and furans);

d. energizing the electrochemical cell at a potential level sufficient to form the oxidized form of the redox couple having the highest oxidation potential in the anolyte;

e. adjust the temperature (e.g. between 0° C. and slightly below the boiling point) of the anolyte with the heat exchanger before it enters the electrochemical cell to enhance the generation of the oxidized form of the anion redox couple mediator; and f. raise the temperature between 0° C. and slightly below the boiling point of the anolyte entering the anolyte reaction chamber with the heat exchanger to affect the desired chemical reactions at the desired rates following the lowering of the temperature of the anolyte entering the electrochemical cell.

13. The apparatus of paragraph 10, wherein:

a. the oxidizing species are one or more Type I isopolyanions (i.e., complex anion redox couple mediators) containing tungsten, molybdenum, vanadium, niobium, tantalum, or combinations thereof as addenda atoms in aqueous solution and the electrolyte is an acid, neutral or alkaline aqueous solution;

b. the oxidizing species are one or more Type I heteropolyanions formed by incorporation into the aforementioned isopolyanions, as heteroatoms, any of the elements listed in Table II, either singly or in combination thereof in the aqueous solutions and the electrolyte is an acid, neutral, or alkaline aqueous solution;

c. the oxidizing species are one or more of any heteropolyanions containing at least one heteroatom type (i.e., element) contained in both Table I and Table II in the aqueous solutions and the electrolyte is an acid, neutral, or alkaline aqueous solution;

d. the oxidizing species are combinations of anion redox couple mediators from any or all of the previous four subparagraphs (13a., 13b., 13c);

e. the oxidizing species are higher valence state of species found in situ for destroying the mixed waste and/or the dissolution of actinide material; and f. the electrolyte is an acid, neutral, or alkaline aqueous solution.

14. The apparatus of paragraph 10, further comprising:

a. the aqueous solution is chosen from acids such as but not limited to nitric acid, sulfuric acid, or phosphoric acid; alkalines such as but not limited to of sodium hydroxide or potassium hydroxide; or neutral electrolytes such as but not limited to sodium or potassium nitrates, sulfates, or phosphates;

b. a with a ion-selective or semi-permeable, microporous polymer, ceramic or sintered glass frit membrane for separating the anolyte portion and the catholyte portion while allowing hydrogen or hydronium ion passage from the anolyte to the catholyte;

c. oxidation potentials of redox reactions producing hydrogen ions are inversely related to pH;

d. the mixed waste and/or transuranic/actinides is liquid waste;

e. the mixed waste and/or transuranic/actinides is solid waste;

f. the mixed waste and/or transuranic/actinides is a combination of liquids and solids and non-organic waste; and g. oxidizing species may be interchanged in a preferred embodiment without changing equipment.

15. The apparatus of paragraph 10, further comprising:

a. anolyte reaction chamber(s) 5(*b,c*) and buffer tank 20 housing the bulk of the anolyte portion and the foraminous basket 3;

b. anolyte reaction chamber 5*a* housing the bulk of the anolyte portion;

c. an anolyte reaction chamber 5*d* and buffer tank 20 housing the bulk of the anolyte portion;

d. an input pump 10 is attached to the anolyte reaction chamber 5*a* to enter liquid mixed waste and/or transuranic/actinides into the anolyte reaction chamber 5*a;* e. a spray head 4(*a*) and a stream head 4(*b*) attached to the tubing coming from the electrochemical cell 25 that inputs the anolyte containing the oxidizer into the anolyte reaction chamber(s) 5(*a,b,c*) and buffer tank 20 in such a manner as to promote mixing of the incoming anolyte with the anolyte already in the anolyte reaction chambers(s) 5(*a,b,c*);

f. a anolyte reaction chamber(s) 5(*b,c*) houses a foraminous basket 3 with a top that holds solid forms of the mixed waste and/or transuranic/actinides in the electrolyte;

g. a hinged lid 1 attached to the reaction chamber(s) 5(*a,b,c*) allowing insertion of mixed waste and/or transuranic/actinides into the anolyte portion as liquid, solid, or a mixture of liquids and solids;

h. the lid 1 contains an locking latch 76 to secure the anolyte reaction chamber(s) 5(*a,b,c*) during operation;

i. a suction pump 8 is attached to buffer tank 20 to pump anolyte to the anolyte reaction chamber(s) 5(*c,d*);

j. an input pump 10 is attached to buffer tank 20 to pump anolyte from the anolyte reaction chamber(s) 5(*c,d*) back to the buffer tank 20; and k. an air pump 32 is attached to buffer tank 20 to pump off gases from the anolyte reaction chamber(s) 5(*c,d*) back to the buffer tank 20 for further oxidation.

16. The apparatus of paragraph 10, further comprising:

a. an ultraviolet source 11 connected to the anolyte reaction chamber(s) 5(*a,b,c*) and buffer tank 20 and decomposing hydrogen peroxide into hydroxyl free radicals therein and increasing efficiency of the MEO process by recovering energy through the oxidation of the mixed waste and/or transuranic/actinides materials in the anolyte chamber by these secondary oxidizers;

b. an ultrasonic source 9 connected to the anolyte reaction chamber(s) 5(*a,b,c*) and buffer tank 20 for augmenting secondary oxidation processes by heating the hydrogen peroxide containing electrolyte to produce extremely short lived and localized conditions of 4800° C. and 1000 atmospheres pressure within the anolyte to dissociate hydrogen peroxide into hydroxyl free radicals thus increasing the oxidation processes;

c. an ultrasonic energy 9 source connected into the anolyte reaction chamber(s) 5(*a,b,c*) and buffer tank 20 for irradiating cell membranes in mixed waste materials by momentarily raising temperature within the cell membranes and causing cell membrane fail and rupture thus creating greater exposure of cell contents to oxidizing species in the anolyte;

d. the use of ultrasonic energy for mixing material in the anolyte, via the ultrasonic energy source 9, to induce microscopic bubble implosion which is used to affect a desired reduction in size of the individual second phase waste volumes and disperse throughout the anolyte;

e. a mixer 35 for stirring the anolyte connected to the anolyte reaction chamber(s) 5(*a,b,c*) and the buffer tank 20;

f. a $CO_2$ vent 14 for releasing $CO_2$ atmospherically;

g. an external $CO_2$ vent 14 connected to the housing for releasing $CO_2$ into the atmosphere;

h. a penetrator 34 is attached to the basket 3 to puncture the solids thus increasing the surface area exposed to the oxidizer;

i. an inorganic compounds removal and treatment system 15 connected to the anolyte pump is used should there be more than trace amount of chlorine, or other precipitate forming anions present in the mixed waste being processed, thereby precluding formation of unstable oxycompounds (e.g., perchlorates, etc.);

j. an off-gas cleaning system 16 comprises scrubber/absorption columns;

k. a condenser 13 connected to the anolyte reaction chamber(s) 5(*a,b,c*) and buffer tank 20;

l. non-condensable incomplete oxidation products (e.g., low molecular weight organics, carbon monoxide, etc.) are reduced to acceptable levels for atmospheric release by a gas cleaning system 16;

m. gas-cleaning system 16 is not a necessary component of the MEO apparatus for the destruction of most types of mixed waste;

n. if the gas cleaning system 16 is incorporated into the MEO apparatus, the anolyte off-gas is contacted in a gas cleaning system 16 wherein the noncondensibles from the condenser 13 are introduced into the lower portion of the gas cleaning system 16 through a flow distribution system and a small side stream of freshly oxidized anolyte direct from the electrochemical cell 25 is introduced into the upper portion of the column, this results in the gas phase continuously reacting with the oxidizing mediator species as it rises up the column past the down flowing anolyte;

o. external drain 12, for draining to the organic compound removal system 17 and the inorganic compounds removal and treatment system 15, and for draining the anolyte system;

p. organic compounds recovery system 17 is used to recover a) organic materials that are benign and do not need further treatment, and b) organic materials (such as biphenyls) that may be used in the form they have been reduced and thus would be recovered for that purpose;

q. optional inorganic compound removal and treatment systems 15 is used should there be more than trace amount of precipitate forming ions present in the mixed waste being processed, thereby precluding formation of unstable oxycompounds (e.g., perchlorates, etc.);

r. small thermal control units 21 and 22 are connected to the flow stream to heat or cool the anolyte to the selected temperature range;

s. anolyte is circulated into the reaction chambers 5(*a,b,c,d*) through the electrochemical cell 25 by pump 19 on the anode 26 side of the membrane 27;

t. a flush(s) 18 for flushing the anolyte and catholyte system;

u. filter 6 is located at the base of the reaction chambers 5(*a,b,c,d*) and buffer tank 20 to limit the size of the solid particles to approximately 1 mm in diameter;

v. membrane 27 in the electrochemical cell 25 separates the anolyte portion and catholyte portion of the electrolyte;

w. electrochemical cell 25 is energized by a DC power supply 29, which is powered by the AC power supply 30;

x. DC power supply 29 is low voltage high current supply usually operating below 4V DC but not limited to that range;

y. AC power supply 29 operates off a typical 110v AC line for the smaller units and 240v AC for the larger units;

z. electrolyte containment boundary is composed of materials resistant to the oxidizing electrolyte (e.g., stainless steel, PTFE, PTFE lined tubing, glass, etc.); and aa. an electrochemical cell 25 connected to the anolyte reaction chamber(s) 5(*a,b,c*) and buffer tank 20.

17. The apparatus of paragraph 10, wherein:

a. in the chambers 5(*a,b,c*) and buffer tank 20 is the aqueous acid, alkali, or neutral salt electrolyte and mediated oxidizer species solution in which the oxidizer form of the mediator redox couple initially may be present or may be generated electrochemically after introduction of the mixed waste and/or transuranic/actinides and application of DC power 30 to the electrochemical cell 25;

b. mixed waste and/or transuranic/actinides is introduced when the anolyte is at room temperature, operating temperature or some optimum intermediate temperature;

c. DC power supply 30 provides direct current to an electrochemical cell 25;

d. pump 19 circulates the anolyte portion of the electrolyte and the mixed waste and/or transuranic/actinides material is rapidly oxidized at temperatures below 100° C. and ambient pressure;

e. in-line filter 6 prevents solid particles large enough to clog the electrochemical cell 25 flow paths from exiting this reaction chambers 5(*a,b,c,d*) and buffer tank 20;

f. residue is pacified in the form of a salt and may be periodically removed through the Inorganic Compound Removal and Treatment System 15 and drain outlets 12;

g. electrolyte may be changed through this same plumbing for introduction into the reaction chambers 5 and 31;

h. catholyte reservoir 31 has a screwed top 33 (shown in FIG. 1), which allow access to the catholyte reservoir 31 for cleaning and maintenance by service personnel;

i. the system is scalable to a unit large for a large industrial application;

j. the process operates at low temperature and ambient atmospheric pressure and does not generate toxic compounds during the destruction of the mixed waste and/or transuranic/actinides, making the process indoors compatible;

k. the system is scalable to a unit large for a large industrial application; and l. $CO_2$ oxidation product from the anolyte system A is vented out the $CO_2$ vent 14.

18. The apparatus of paragraph 10, wherein:

a. an anolyte recovery system 41 connected to the catholyte pump (43);

b. a thermal control unit 45 connected to the catholyte reservoir 31 for varying the temperature of the catholyte portion;

c. a catholyte reservoir 31 connected to the cathode portion of the electrochemical cell;

d. bulk of the catholyte is resident in the catholyte reservoir 31;

e. catholyte portion of the electrolyte flows into a catholyte reservoir 31;

f. an air sparge 37 connected to the catholyte reservoir 31 for introducing air into the catholyte reservoir;

g. an anolyte recovery system 41 for capturing the anions and for reintroducing the anions into the anolyte reaction chamber or disposal from the catholyte electrolyte;

h. an off-gas cleaning system 39 for cleaning gases before release into the atmosphere connected to the catholyte reservoir 31;

i. an atmospheric vent 47 for releasing gases into the atmosphere connected to the off-gas cleaning system;

j. cleaned gas from the off-gas cleaning system 39 is combined with unreacted components of the air introduced into the system and discharged through the atmospheric vent 47;

k. a catholyte reservoir 31 has a screwed top 33 (shown in FIG. 1A), which allow access to the reservoir 31 for cleaning and maintenance by service personnel;

l. a mixer 35 for stirring the catholyte connected to the catholyte reservoir 31;

m. a catholyte pump 43 for circulating catholyte back to the electrochemical cell connected to the catholyte reservoir;

n. a drain 12 for draining catholyte;

o. a flush 18 for flushing the catholyte system;

p. an air sparge 37 connected to the housing for introducing air into the catholyte reaction chamber 31;

q. catholyte portion of the electrolyte is circulated by pump 43 through the electrochemical cell 25 on the cathode 28 side of the membrane 27;

r. small thermal control units 45 and 46 are connected to the catholyte flow stream to heat or cool the catholyte to the selected temperature range;

s. contact of the oxidizing gas with the catholyte may be enhanced by using conventional techniques for promoting gas/liquid contact by ultrasonic vibration 48, mechanical mixing 35, etc.;

t. operating the electrochemical cell 25 at higher than normal membrane 27 current densities (i.e., above about 0.5 amps/cm$^2$) increases the rate of mixed waste destruction and/or the dissolution of the transuranic/actinides, but also result in increased mediator ion transport through the membrane into the catholyte;

u. optional anolyte recovery system 41 is positioned on the catholyte side;

v. systems using non-nitric acid catholytes may also require air sparging to dilute and remove off-gas such as hydrogen;

w. some mediator oxidizer ions may cross the membrane 27 and this option is available if it is necessary to remove them through the anolyte recovery system 41 to maintain process efficiency or cell operability, or their economic worth necessitates their recovery;

x. using the anolyte recovery system 41 the capitol cost of expanding the size of the electrochemical cell 25 can be avoided; and y. operating the electrochemical cell 25 at higher than normal membrane current density (i.e., above about 0.5 amps per centimeter squared) improves economic-efficiency.

19. The apparatus of paragraph 10, wherein:

a. operator runs the MEO Apparatus (FIG. 1A) and FIG. 1B by using the MEO Controller depicted in FIG. 3 MEO System Model 5.b Controller;

b. controller 49 with microprocessor is connected to a monitor 51 and a keyboard 53;

c. operator inputs commands to the controller 49 through the keyboard 53 responding to the information displayed on the monitor 51;

d. controller 49 runs a program that sequences the steps for the operation of the MEO apparatus;

e. program has pre-programmed sequences of standard operations that the operator may follow or choose his own sequences of operations;

f. controller 49 allows the operator to select his own sequences within limits that assure a safe and reliable operation;

g. controller 49 sends digital commands that regulates the electrical power (AC 30 and DC 29) to the various components in the MEO apparatus: pumps 19 and 43, mixers 7 and 35, thermal controls 21, 22, 45, 46, heat exchangers 23 and 24, ultraviolet sources 11, ultrasonic sources 9 and 48, $CO_2$ vent 14, air sparge 37, and electrochemical cell 25;

h. controller receives component response and status from the components;

i. controller sends digital commands to the sensors to access sensor information through sensor responses;

j. sensors in the MEO apparatus provide digital information on the state of the various components;

k. sensors measure flow rate 59, temperature 61, pH 63, $CO_2$ venting 65, degree of oxidation 67, air sparge sensor 69, etc; and l. controller 49 receives status information on the electrical potential (voltmeter 57) across the electrochemical cell or individual cells if a multi-cell configuration and between the anode(s) and reference electrodes internal to the cell(s) 25 and the current (ammeter 55) flowing between the electrodes within each cell.

20. The apparatus of paragraph 10, wherein:

a. preferred embodiment, MEO System Model 5.b is sized for use for a small to mid-size application for the destruction of solids and mixtures of solids and liquid mixed waste and/or transuranic/actinides being batch feed. This embodiment depicts a configuration using the system apparatus presented in FIGS. 1A and 1C. Other preferred embodiments (representing FIGS. 1B, 1D, and 1E) have differences in the external configuration and size but are essentially the same in internal function and components as depicted in FIGS. 1A and 1B;

b. preferred embodiment in FIG. 2 comprises a housing 72 constructed of metal or high strength plastic surrounding the electrochemical cell 25, the electrolyte and the foraminous basket 3;

c. AC power is provided to the AC power supply 30 by the power cord 78;

d. monitor screen 51 is incorporated into the housing 72 for displaying information about the system and about the mixed waste and/or transuranic/actinides being treated;

e. control keyboard 53 is incorporated into the housing 72 for inputting information into the system;

f. monitor screen 51 and the control keyboard 53 may be attached to the system without incorporating them into the housing 72;

g. system model 5.b has a control keyboard 53 for input of commands and data;

h. monitor screen 51 to display the systems operation and functions;

i. status lights 73 for on, off and standby, are located below the keyboard 53 and monitor screen 51;

j. in a preferred embodiment, status lights 73 are incorporated into the housing 72 for displaying information about the status of the treatment of the mixed waste and/or transuranic/actinides material;

k. air sparge 37 is incorporated into the housing 72 to allow air to be introduced into the catholyte reservoir 31 below the surface of the catholyte;

l. a $CO_2$ vent 14 is incorporated into the housing 72 to allow for $CO_2$ release from the anolyte reaction chamber housed within;

m. in a preferred embodiment, the housing includes means for cleaning out the MEO mixed waste and/or transuranic/actinides treatment system, including a flush(s) 18 and drain(s) 12 through which the anolyte and catholyte pass;

n. the preferred embodiment further comprises an atmospheric vent 47 facilitating the releases of gases into the atmosphere from the catholyte reservoir 31;

o. hinged lid 1 is opened and the mixed waste and/or transuranic/actinides is deposited in the basket 3 in the anolyte reaction chamber 5b;

p. lid stop 2 keeps lid opening controlled; and q. hinged lid 1 is equipped with a locking latch 76 that is operated by the controller 49.

21. The apparatus of paragraph 10, wherein:

a. MEO apparatus is contained in the housing 72;

b. MEO system is started 81 by the operator engaging the 'ON' button (status buttons 73) on the control keyboard 53;

c. system controller 49, which contains a microprocessor, runs the program that controls the entire sequence of operations 82;

d. monitor screen 51 displays the steps of the process in the proper sequence;

e. status lights 73 on the panel provide the status of the MEO apparatus (e.g. on, off, ready, standby);

f. lid 1 is opened and the mixed waste and/or transuranic/actinides is placed 83 in the basket 3 as a liquid, solid, or a mixture of liquids and solids, whereupon the solid portion of the mixed waste and/or transuranic/actinides is retained and the liquid portion flows through the basket 3 and into the anolyte;

g. locking latch 76 is activated after waste and/or transuranic/actinides is placed in basket;

h. pumps 19 and 43 are activated which begins circulation 85 of the anolyte 87 and catholyte 89, respectively;

i. once the electrolyte circulation is established throughout the system, the mixers 7 and 35 begin to operate 91 and 93;

j. depending upon waste and/or transuranic/actinides characteristics (e.g., reaction kinetics, heat of reaction, etc.) it may be desirable to introduce the mixed waste and/or transuranic/actinides into a room temperature or cooler system with little or none of the mediator redox couple in the oxidizer form;

k. once flow is established the thermal controls units 21, 22, 45, and 46 are turned on 95/97, initiating predetermined anodic oxidation and electrolyte heating programs;

l. the electrochemical cell 25 is energized 94 (by cell commands 56) to the electric potential 57 and current 55 density determined by the controller program;

m. by using programmed electrical power and electrolyte temperature ramps it is possible to maintain a predetermined mixed waste destruction rate and/or the dissolution of the transuranic/actinides profile such as a relatively constant reaction rate as the more reactive mixed waste and/or transuranic/actinides components are oxidized, thus resulting in the remaining waste and/or transuranic/actinides becoming less and less reactive, thereby requiring more and more vigorous oxidizing conditions;

n. the ultrasonic 9 and 48 and ultraviolet systems 11 are activated 99 and 101 in the anolyte reaction chambers 5(a,b,c) and catholyte reservoir 31 if those options are chosen in the controller program;

o. $CO_2$ vent 14 is activated 103 to release $CO_2$ from the mixed waste and/or transuranic/actinides oxidation process in the anolyte reaction chambers 5(a,b,c,d) and buffer tank 20;

p. air sparge 37 and atmospheric vent 47 are activated 105 in the catholyte system;

q. progress of the destruction process is monitored in the controller (oxidation sensor 67) by various cell voltages and currents 55, 57 (e.g., open circuit, anode vs. reference electrode, ion specific electrodes, etc,) as well as monitoring $CO_2$, CO, and $O_2$ gas 65 composition for $CO_2$, CO and oxygen content;

r. mixed waste is being decomposed into water and $CO_2$ the latter being discharged 103 out of the $CO_2$ vent 14;

s. air sparge 37 draws air 105 into the catholyte reservoir 31, and excess air is discharged out the atmospheric vent 47;

t. when the oxidation sensor 67 determine the desired degree of mixed waste destruction and/or the dissolution of the transuranic/actinides has been obtained 107, the system goes to standby 109;

u. MEO apparatus as an option may be placed in a standby mode with mixed waste and/or transuranic/actinides being added as it is generated throughout the day and the unit placed in full activation during non-business hours; and v. system operator executes system shutdown 111 using the controller keyboard 53.

TABLE I

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| I | A | None | | | |
| | B | Copper (Cu) | +2 | $Cu^{-2}$ (cupric) | +2 Species/+3, +4 Species |
| | | | | $HCuO_2$ (bicuprite) | +3 Species/+4 Species |
| | | | | $CuO_2^{-2}$ (cuprite) | |
| | | | +3 | $Cu^{+3}$ | |
| | | | | $CuO_2^-$ (cuprate) | |
| | | | | $Cu_2O_3$ (sesquioxide) | |
| | | | +4 | $CuO_2$ (peroxide) | |
| | | Silver (Ag) | +1 | $Ag^+$ (argentous) | +1 Species/+2, +3 Species |
| | | | | $AgO^-$ (argentite) | +2 Species/+3 Species |
| | | | +2 | $Ag^{-2}$ (argentic) | |
| | | | | $AgO$ (argentic oxide) | |
| | | | +3 | $AgO^+$ (argentyl) | |
| | | | | $Ag_2O_3$ (sesquioxide) | |
| | | Gold (Au) | +1 | $Au^+$ (aurous) | +1 Species/+3, +4 Species |
| | | | +3 | $Au^{+3}$ (auric) | +3 Species/+4 Species |
| | | | | $AuO^-$ (auryl) | |
| | | | | $H_3AuO_3$ (auric acid) | |
| | | | | $H_2AuO_3^-$ (monoauarate) | |
| | | | | $HAuO_3^{-2}$ (diaurate) | |
| | | | | $AuO_3^{-3}$ (triaurate) | |
| | | | | $Au_2O_3$ (auric oxide) | |
| | | | | $Au(OH)_3$ (auric hydroxide) | |
| | | | +4 | $AuO_2$ (peroxide) | |
| II | A | Magnesium (Mg) | +2 | $Mg^{+2}$ (magnesic) | +2 Species/+4 Species |
| | | | +4 | $MgO_2$ (peroxide) | |
| | | Calcium (Ca) | +2 | $Ca^{+2}$ | +2 Species/+4 Species |
| | | | +4 | $CaO_2$ (peroxide) | |
| | | Strontium | +2 | $Sr^{+2}$ | +2 Species/+4 Species |
| | | | +4 | $SrO_2$ (peroxide) | |
| | | Barium (Ba) | +2 | $Ba^{+2}$ | +2 Species/+4 Species |
| | | | +4 | $BaO_2$ (peroxide) | |
| II | B | Zinc (Zn) | +2 | $Zn^{+2}$ (zincic) | +2 Species/+4 Species |
| | | | | $ZnOH^+$ (zincyl) | |
| | | | | $HZnO_2^-$ (bizincate) | |
| | | | | $ZnO_2^{-2}$ (zincate) | |
| | | | +4 | $ZnO_2$ (peroxide) | |
| | | Mercury (Hg) | +2 | $Hg^{+2}$ (mercuric) | +2 Species/+4 Species |
| | | | | $Hg(OH)_2$ (mercuric hydroxide) | |
| | | | | $HHgO_2^-$ (mercurate) | |
| | | | +4 | $HgO_2$ (peroxide) | |
| III | A | Boron | +3 | $H_3BO_3$ (orthoboric acid) | +3 Species/+4.5, +5 Species |
| | | | | $H_2BO_3^-$, $HBO_3^{-2}$, $BO_3^{-3}$ (orthoborates) | |
| | | | | $BO_2^-$ (metaborate) | |
| | | | | $H_2B_4O_7$ (tetraboric acid) | |
| | | | | $HB_4O_7^-/B_4O_7^{-2}$ (tetraborates) | |
| | | | | $B_2O_4^{-2}$ (diborate) | |
| | | | | $B_6O_{10}^{-2}$ (hexaborate) | |
| | | | +4.5 | $B_2O_5^-$ (diborate) | |
| | | | +5 | $BO_3^-/BO_2^- \cdot H_2O$ (perborate) | |
| | | Thallium (Tl) | +1 | $Tl^{+1}$ (thallous) | +1 Species/+3 or +3.33 Species |
| | | | +3 | $Tl^{+3}$ (thallic) | +3 Species/+3.33 Species |
| | | | | $TlO^+$, $TlOH^{+2}$, $Tl(OH)_2^+$ (thallyl) | |
| | | | | $Tl_2O_3$ (sesquioxide) | |
| | | | | $Tl(OH)_3$ (hydroxide) | |
| | | | +3.33 | $Tl_3O_5$ (peroxide) | |
| | B | | | See Rare Earths and Actinides | |
| IV | A | Carbon (C) | +4 | $H_2CO_3$ (carbonic acid) | +4 Species/+5, +6 Species |
| | | | | $HCO_3^-$ (bicarbonate) | |
| | | | | $CO_3^{-2}$ (carbonate) | |
| | | | +5 | $H_2C_2O_6$ (perdicarbonic acid) | |
| | | | +6 | $H_2CO_4$ (permonocarbonic acid) | |
| | | Germanium (Ge) | +4 | $H_2GeO_3$ (germanic acid) | +4 Species/+6 Species |
| | | | | $HGeO_3^-$ (bigermaniate) | |
| | | | | $GeO_3^{-4}$ (germinate) | |
| | | | | $Ge^{+4}$ (germanic) | |
| | | | | $GeO_4^{-4}$ | |
| | | | | $H_2Ge_2O_5$ (digermanic acid) | |
| | | | | $H_2Ge_4O_9$ (tetragermanic acid) | |
| | | | | $H_2Ge_5O_{11}$ (pentagermanic acid) | |
| | | | | $HGe_5O_{11}^-$ (bipentagermanate) | |
| | | | +6 | $Ge_5O_{11}^{-2}$ (pentagermanate) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| | | Tin (Sn) | +4 | $Sn^{+4}$ (stannic) <br> $HSnO_3^-$ (bistannate) <br> $SnO_3^{-2}$ (stannate) <br> $SnO_1$ (stannic oxide) <br> $Sn(OH)_4$ (stannic hydroxide) | +4 Species/+7 Species |
| | | | +7 | $SnO_4^-$ (perstannate) | |
| | | Lead (Pb) | +2 | $Pb^{+2}$ (plumbous) <br> $HPbO_2^-$ (biplumbite) <br> $PbOH^+$ <br> $PbO_2^{-2}$ (plumbite) <br> $PbO$ (plumbus oxide) | +2, +2.67, +3 Species/+4 Species |
| | | | +2.67 | $Pb_3O_4$ (plumbo-plumbic oxide) | |
| | | | +3 | $Pb_2O_3$ (sequioxide) | |
| | | Lead (Pb) | +4 | $Pb^{+4}$ (plumbic) <br> $PbO_3^{-2}$ (metaplumbate) <br> $HPbO_3^-$ (acid metaplumbate) <br> $PbO_4^{-4}$ (orthoplumbate) <br> $PbO_2$ (dioxide) | +2, +2.67, +3 Species/+4 Species |
| | B | Titanium | +4 | $TiO^{+2}$ (pertitanyl) <br> $HTiO_4^-$ titanate) <br> $TiO_2$ (dioxide) | +4 Species/+6 Species |
| | | | +6 | $TiO_2^{+2}$ (pertitanyl) <br> $HTiO_4^-$ (acid pertitanate) <br> $TiO_4^{-2}$ (pertitanate) <br> $TiO_3$ (peroxide) | |
| | | Zirconium (Zr) | +4 | $Zr^{+4}$ (zirconic) <br> $ZrO^{+2}$ (zirconyl) <br> $HZrO_3^-$ (zirconate) | +4 Species/+5, +6, +7 Species |
| | | | +5 | $Zr_2O_5$ (pentoxide) | |
| | | | +6 | $ZrO_3$ (peroxide) | |
| | | | +7 | $Zr_2O_7$ (heptoxide) | |
| | | Hafnium (Hf) | +4 | $Hf^{+4}$ (hafnic) <br> $HfO^{+2}$ (hafnyl) | +4 Species/+6 Species |
| | | | +6 | $HfO_3$ (peroxide) | |
| V | A | Nitrogen | +5 | $HNO_3$ (nitric acid) <br> $NO_3^-$ (nitrate) | +5 species/+7 Species |
| | | | +7 | $HNO_4$ (pernitric acid) | |
| | | Phosphorus (P) | +5 | $H_3PO_4$ (orthophosphoric acid) <br> $H_2PO_4^-$ (monoorthophosphate) <br> $HPO_4^{-2}$ (diorthophosphate) <br> $PO_4^{-3}$ (triorthophosphate) <br> $HPO_3$ (metaphosphoric acid) <br> $H_4P_2O_7$ (pryophosphoric acid) <br> $H_5P_3O_{10}$ (triphosphoric acid) <br> $H_6P_4O_{13}$ (tetraphosphoric acid) | +5 Species/+6, +7 species |
| | | Phosphorus (P) | +6 | $H_4P_2O_8$ (perphosphoric acid) | +5 Species/+6, +7 Species |
| | | | +7 | $H_3PO_5$ (monoperphosphoric acid) | |
| | | Arsenic (As) | +5 | $H_3AsO_4$ (ortho-arsenic acid) <br> $H_2AsO_4^-$ (mono ortho-arsenate) <br> $HAsO_4^{-2}$ (di-ortho-arsenate) <br> $AsO_4^{-3}$ (tri-ortho-arsenate) <br> $AsO_2^+$ (arsenyl) | +5 Species/+7 species |
| | | | +7 | $AsO_3^+$ (perarsenyl) | |
| | | Bismuth (Bi) | +3 | $Bi^{+3}$ (bismuthous) <br> $BiOH^{+2}$ (hydroxybismuthous) <br> $BiO^+$ (bismuthyl) <br> $BiO_2^-$ (metabismuthite) | +3 Species/+3.5, +4, +5 Species |
| | | | +3.5 | $Bi_4O_7$ (oxide) | |
| | | | +4 | $Bi_2O_4$ (tetroxide) | |
| | | | +5 | $BiO_3^-$ (metabismuthite) <br> $Bi_2O_5$ (pentoxide) | |
| | B | Vanadium (V) <br> (See also POM Complex Anion Mediators) | +5 | $VO_2^+$ (vanadic) <br> $H_3V_2O_7^-$ (pyrovanadate) <br> $H_2VO_4^-$ (orthovanadate) <br> $VO_3^-$ (metavanadate) <br> $HVO_4^{-2}$ (orthovanadate) <br> $VO_4^{-3}$ (orthovanadate) <br> $V_2O_5$ (pentoxide) <br> $H_4V_2O_7$ (pyrovanadic acid) <br> $HVO_3$ (metavanadic acid) <br> $H_4V_6O_{17}$ (hexavanadic acid) | +5 Species/+7, +9 Species |
| | | | +7 | $VO_4^-$ (pervanadate) | |
| | | | +9 | $VO_5^-$ (hypervanadate) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| VI | B | Chromium | +3 | $Cr^{+3}$ (chromic)<br>$CrOH^{+2}$, $Cr(OH)_2^+$ (chromyls)<br>$CrO_2^-$, $CrO_3^{-3}$ (chromites)<br>$Cr_2O_3$ (chromic oxide)<br>$Cr(OH)_3$ (chromic hydroxide) | +3 Species/+4, +6 Species<br>+4 Species/+6 Species |
|  |  |  | +4 | $CrO_2$ (dioxide)<br>$Cr(OH)_4$ (hydroxide) |  |
|  |  |  | +6 | $H_2CrO_4$ (chromic acid)<br>$HCrO_4^-$ (acid chromate)<br>$CrO_4^{-2}$ (chromate)<br>$Cr_2O_7^{-2}$ (dichromate) |  |
|  |  | Molybdenum (Mo)<br>(See also POM<br>Complex Anion<br>Mediators) | +6 | $HMoO_4^-$ (bimolybhate)<br>$MoO_4^{-2}$ (molydbate)<br>$MoO_3$ (molybdic trioxide)<br>$H_2MoO_4$ (molybolic acid) | +6 Species/+7 Species |
|  |  |  | +7 | $MoO_4^-$ (permolybdate) |  |
|  |  | Tungsten (W)<br>(See also POM<br>Complex Anion<br>Mediators) | +6 | $WO_4^{-2}$ tungstic)<br>$WO_3$ (trioxide)<br>$H_2WO_4$ (tungstic acid) | +6 Species/+8 Species |
|  |  |  | +8 | $WO_5^{-2}$ (pertungstic)<br>$H_2WO_5$ (pertungstic acid) |  |
| VII | A | Chlorine (Cl) | −1 | $Cl^-$ (chloride) | −1 Species/+1, +3, +5, +7 Species |
|  |  |  | +1 | HClO (hypochlorous acid)<br>$ClO^-$ (hypochlorite) | +1 Species/+3, +5, +7 Species<br>+3 Species/+5, +7 Species |
|  |  |  | +3 | $HClO_2$ (chlorous acid)<br>$ClO_2^-$ (chlorite) | +5 Species/+7 Species |
|  |  |  | +5 | $HClO_3$ (chloric acid)<br>$ClO_3^-$ (chlorate) |  |
|  |  |  | +7 | $HClO_4$ (perchloric acid)<br>$ClO_4^-$, $HClO_5^{-2}$, $ClO_5^{-3}$, $Cl_2O_9^{-4}$ (perchlorates) |  |
| V | B | Niobium (Nb)<br>(See also POM<br>Complex Anion<br>Mediators) | +5 | $NbO_3^-$ (metaniobate)<br>$NbO_4^{-3}$ (orthoniobate)<br>$Nb_2O_5$ (pentoxide)<br>$HNbO_3$ (niobid acid) | +5 Species/+7 species |
|  |  |  | +7 | $NbO_4^-$ (perniobate)<br>$Nb_2O_7$ (perniobic oxide)<br>$HNbO_4$ (perniobic acid) |  |
|  |  | Tantalum (Ta)<br>(See also POM<br>Complex Anion<br>Mediators) | +5 | $TaO_3^-$ (metatantalate)<br>$TaO_4^{-3}$ (orthotanatalate)<br>$Ta_2O_5$ (pentoxide)<br>$HTaO_3$ (tantalic acid) | +5 species/+7 species |
|  |  |  | +7 | $TaO_4^-$ (pentantalate)<br>$Ta_2O_7$ (pertantalate)<br>$HTaO_4 \cdot H_2O$ (pertantalic acid) |  |
| VI | A | Sulfur (S) | +6 | $H_2SO_4$ (sulfuric acid)<br>$HSO_4^-$ (bisulfate)<br>$SO_4^{-2}$ (sulfate) | +6 Species/+7, +8 Species |
|  |  |  | +7 | $S_2O_8^{-2}$ (dipersulfate) |  |
|  |  |  | +8 | $H_2SO_5$ (momopersulfuric acid) |  |
|  |  | Selenium (Se) | +6 | $H_2Se_2O_4$ (selenic acid)<br>$HSeO_4^-$ (biselenate)<br>$SeO_4^{-2}$ (selenate) | +6 species/+7 Species |
|  |  |  | +7 | $H_2Se_2O_8$ (perdiselenic acid) |  |
|  |  | Tellurium (Te) | +6 | $H_2TeO_4$ (telluric acid)<br>$HTeO_4^-$ (bitellurate)<br>$TeO_4^{-2}$ (tellurate) | +6 species/+7 species |
|  |  |  | +7 | $H_2Te_2O_8$ (perditellenic acid) |  |
|  |  | Polonium (Po) | +2 | $Po^{+2}$ (polonous) | +2, +4 species/+6 Species |
|  |  |  | +4 | $PoO_3^{-2}$ (polonate) |  |
|  |  |  | +6 | $PoO_3$ (peroxide) |  |
| VII | A | Bromine (Br) | −1 | $Br^-$ (bromide) | −1 Species/+1, +3, +5, +7 Species |
|  |  |  | +1 | HBrO (hypobromous acid)<br>$BrO^-$ (hypobromitee) | +1 Species/+3, +5, +7 Species<br>+3 Species/+5, +7 Species |
|  |  |  | +3 | $HBrO_2$ (bromous acid)<br>$BrO2^-$ (bromite) | +5 Species/+7 Species |
|  |  |  | +5 | $HBrO_3$ (bromic acid)<br>$BrO_3^-$ (bromate) |  |
|  |  |  | +7 | $HBrO_4$ (perbromic acid)<br>$BrO_4^-$, $HBrO_5^{-2}$, $BrO_5^{-3}$, $Br_2O_9^{-4}$ (prebromates) |  |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| | | Iodine | −1 | $I^-$ (iodide) | −1 Species/+1, +3, +5, +7 Species |
| | | | +1 | HIO (hypoiodus acid) | +1 Species/+3, +5, +7 Species |
| | | | | $IO^-$ (hypoiodite) | +3 Species/+5, +7 Species |
| | | | +3 | $HIO_2$ (iodous acid) | +5 Species/+7 Species |
| | | | | $IO_2^-$ (iodite) | |
| | | | +5 | $HIO_3$ (iodic acid) | |
| | | | | $IO_3^-$ (iodate) | |
| | | | +7 | $HIO_4$ (periodic acid) | |
| | | | | $IO_4^-$, $HIO_5^{-2}$, $IO_5^{-3}$, $I_2O_9^{-4}$ (periodates) | |
| | B | Manganese (Mn) | +2 | $Mn^{+2}$ (manganeous) | +2 Species/+3, +4, +6, +7 Species |
| | | | | $HMnO_2^-$ (dimanganite) | +3 Species/+4, +6, +7 Species |
| | | | +3 | $Mn^{+3}$ (manganic) | +4 Species/+6, +7 Species |
| | | | +4 | $MnO_2$ (dioxide) | +6 Species/+7 Species |
| | | | +6 | $MnO_4^{-2}$ (manganate) | |
| | | | +7 | $MnO_4^-$ (permanganate) | |
| VIII | Period 4 | Iron (Fe) | +2 | $Fe^{+2}$ (ferrous) | +2 Species/+3, +4, +5, +6 Species |
| | | | | $HFeO_2^-$ (dihypoferrite) | +3 Species/+4, +5, +6 Species |
| | | | +3 | $Fe^{+3}$, $FeOH^{+2}$, $Fe(OH)_2^+$ (ferric) | +4 Species/+5, +6 Species |
| | | | | $FeO_2^+$ (ferrite) | +5 Species/+6 Species |
| | | | +4 | $FeO^{+2}$ (ferryl) | |
| | | | | $FeO_2^{-2}$ (perferrite) | |
| | | | +5 | $FeO_2^+$ (perferryl) | |
| | | | +6 | $FeO_4^{-2}$ (ferrate) | |
| | | Cobalt (Co) | +2 | $Co^{+2}$ (cobalous) | +2 Species/+3, +4 Species |
| | | | | $HCoO_2^-$ (dicobaltite) | +3 Species/+4 Species |
| | | | +3 | $Co^{+3}$ (cobaltic) | |
| | | | | $Co_2O_3$ (cobaltic oxide) | |
| | | | +4 | $CoO_2$ (peroxide) | |
| | | | | $H_2CoO_3$ (cobaltic acid) | |
| | | Nickel (Ni) | +2 | $Ni^{+2}$ (nickelous) | +2 Species/+3, +4, +6 Species |
| | | | | $NiOH^+$ | +3 Species/+4, +6 Species |
| | | | | $HNiO_2^-$ (dinickelite) | +4 Species/+6 Species |
| | | | | $NiO_2^{-2}$ (nickelite) | |
| | | | +3 | $Ni^{+3}$ (nickelic) | |
| | | | | $Ni_2O_3$ (nickelic oxide) | |
| | | | +4 | $NiO_2$ (peroxide) | |
| | | | +6 | $NiO_4^{-2}$ (nickelate) | |
| | Period 5 | Ruthenium (Ru) | +2 | $Ru^{+2}$ | +2 Species/+3, +4, +5, +6, +7, +8 Species |
| | | | +3 | $Ru^{+3}$ | +3 Species/+4, +5, +6, +7, +8 Species |
| | | | | $Ru_2O_3$ (sesquioxide) | +4 Species/+5, +6, +7, +8 Species |
| | | | | $Ru(OH)_3$ (hydroxide) | +5 Species/+6, +7, +8 Species |
| | | | +4 | $Ru^{+4}$ (ruthenic) | +6 Species/+7, +8 Species |
| | | | | $RuO_2$ (ruthenic dioxide) | +7 Species/+8 Species |
| | | | | $Ru(OH)_4$ (ruthenic hydroxide) | |
| | | | +5 | $Ru_2O_5$ (pentoxide) | |
| | | | +6 | $RuO_4^{-2}$ (ruthenate) | |
| | | | | $RuO_2^{+2}$ (ruthenyl) | |
| | | | | $RuO_3$ (trioxide) | |
| | | | +7 | $RuO_4^-$ (perruthenate) | |
| | | | +8 | $H_2RuO_4$ (hyperuthenic acid) | |
| | | | | $HRuO_5^-$ (diperruthenate) | |
| | | | | $RuO_4$ (ruthenium tetroxide) | |
| | | Rhodium (Rh) | +1 | $Rh^+$ (hyporhodous) | +1 Species/+2, +3, +4, +6 Species |
| | | | +2 | $Rh^+$ (rhodous) | +2 Species/+3, +4, +6 Species |
| | | | +3 | $Rh^{+3}$ (rhodic) | +3 Species/+4, +6 Species |
| | | | | $Rh_2O_3$ (sesquioxide) | +4 Species/+6 Species |
| | | | +4 | $RhO_2$ (rhodic oxide) | |
| | | | | $Rh(OH)_4$ (hydroxide) | |
| | | | +6 | $RhO_4^{-2}$ (rhodate) | |
| | | | | $RhO_3$ (trioxide) | |
| | | Palladium | +2 | $Pd^{+2}$ (palladous) | +2 Species/+3, +4, +6 Species |
| | | | | $PdO_2^{-2}$ (palladite) | +3 Species/+4, +6 Species |
| | | | +3 | $Pd_2O_3$ (sesquioxide) | +4 Species/+6 Species |
| | | | +4 | $PdO_3$ (palladate) | |
| | | | | $PdO_2$ (dioxide) | |
| | | | | $Pd(OH)_4$ (hydroxide) | |
| | | | +6 | $PdO_3$ (peroxide) | |
| | Period 6 | Iridium (Ir) | +3 | $Ir^{+3}$ (iridic) | +3 Species/+4, +6 Species |
| | | | | $Ir_2O_3$ (iridium sesquioxide) | +4 Species/+6 Species |
| | | | | $Ir(OH)_3$ (iridium hydroxide) | |
| | | | +4 | $IrO_2$ (iridic oxide) | |
| | | | | $Ir(OH)_4$ (iridic hydroxide) | |

TABLE I-continued

SIMPLE ANION REDOX COUPLES MEDIATORS

| GROUP | SUB GROUP | ELEMENT | VALENCE | SPECIES | SPECIFIC REDOX COUPLES |
|---|---|---|---|---|---|
| | | | +6 | $IrO_4^{-2}$ (iridate) | |
| | | | | $IrO_3$ (iridium peroxide) | |
| | | Platinum (Pt) | +2 | $Pt^{+2}$ (platinous) | +2, +3 Species/+4, +6 Species |
| | | | +3 | $Pt_2O_3$ (sesquioxide) | +4 Species/+6 Species |
| | | | +4 | $PtO_3^{-2}$ (palatinate) | |
| | | | | $PtO^{+2}$ (platinyl) | |
| | | | | $Pt(OH)^{+3}$ | |
| | | | | $PtO_2$ (platonic oxide) | |
| IIIB | Rare earths | Cerium (Ce) | +3 | $Ce^{+3}$ (cerous) | +3 Species/+4, +6 Species |
| | | | | $Ce_2O_3$ (cerous oxide) | +4 Species/+6 Species |
| | | | | $Ce(OH)_3$ (cerous hydroxide) | |
| | | | +4 | $Ce^{+4}, Ce(OH)^{+3}, Ce(OH)_2^{+2},$ | |
| | | | | $Ce(OH)_3^+$ (ceric) | |
| | | | | $CeO_2$ (ceric oxide) | |
| | | | +6 | $CeO_3$ (peroxide) | |
| | | Praseodymium (Pr) | +3 | $Pr^{+3}$ (praseodymous) | +3 species/+4 species |
| | | | | $Pr_2O_3$ (sesquioxide) | |
| | | | | $Pr(OH)_3$ (hydroxide) | |
| | | | +4 | $Pr^{+4}$ (praseodymic) | |
| | | | | $PrO_2$ (dioxide) | |
| | | Neodymium | +3 | $Nd^{+3}$ | +3 Species/+4 Species |
| | | | | $Nd_2O_3$ (sesquioxide) | |
| | | | +4 | $NdO_2$ (peroxide) | |
| | | Terbium (Tb) | +3 | $Tb^{+3}$ | +3 Species/+4 Species |
| | | | | $Tb_2O_3$ (sesquioxide) | |
| | | | +4 | $TbO_2$ (peroxide) | |
| | Actinides | Thorium (Th) | +4 | $Th^{+4}$ (thoric) | +4 Species/+6 Species |
| | | | | $ThO^{+2}$ (thoryl) | |
| | | | | $HThO_3^-$ (thorate) | |
| | | | +6 | $ThO_3$ (acid peroxide) | |
| | | Uranium (U) | +6 | $UO_2^{+2}$ (uranyl) | +6 Species/+8 Species |
| | | | | $UO_3$ (uranic oxide) | |
| | | | +8 | $HUO_5^-, UO_5^{-2}$ (peruranates) | |
| | | | | $UO_4$ (peroxide) | |
| | | Neptunium (Np) | +5 | $NpO_2^+$ (hyponeptunyl) | +5 Species/+6, +8 Species |
| | | | | $Np_2O_5$ (pentoxide) | +6 Species/+8 Species |
| | | | +6 | $NpO_2^{+2}$ (neptunyl) | |
| | | | | $NpO_3$ (trioxide) | |
| | | | +8 | $NpO_4$ (peroxide) | |
| | | Plutonium (Pu) | +3 | $Pu^{+3}$ (hypoplutonous) | +3 Species/+4, +5, +6 Species |
| | | | +4 | $Pu^{+4}$ (plutonous) | +4 Species/+5, +6 Species |
| | | | | $PuO_2$ (dioxide) | +5 Species/+6 Species |
| | | | +5 | $PuO_2^+$ (hypoplutonyl) | |
| | | | | $Pu_2O_5$ (pentoxide) | |
| | | | +6 | $PuO_2^{+2}$ (plutonyl) | |
| | | | | $PuO_3$ (peroxide) | |
| | | Americium (Am) | +3 | $Am^{+3}$ (hypoamericious) | |
| | | | +4 | $Am^{+4}$ (americous) | |
| | | | | $AmO_2$ (dioxide) | |
| | | | | $Am(OH)_4$ (hydroxide) | |
| | | | +5 | $AmO_2^+$ (hypoamericyl) | |
| | | | | $Am_2O_5$ (pentoxide) | |
| | | | +6 | $AmO_2^{+2}$ (americyl) | |
| | | | | $AmO_3$ (peroxide) | |

TABLE II

ELEMENTS PARTICIPATING AS HETEROATOMS IN HETEROPOLYANION COMPLEX ANION REDOX COUPLE MEDIATORS

| GROUP | SUB GROUP | ELEMENT |
|---|---|---|
| I | A | Lithium (Li), Sodium (Na), Potassium (K), and Cesium (Cs) |
| | B | Copper (Cu), Silver (Ag), and Gold (Au) |
| II | A | Beryllium (Be), Magnesium (Mg), Calcium (Ca), Strontium (Sr), and Barium (Ba) |
| | B | Zinc (Zn), Cadmium (Cd), and Mercury (Hg) |
| III | A | Boron (B), and Aluminum (Al) |
| | B | Scandium (Sc), and Yttrium (Y) - (See Rare Earths) |
| IV | A | Carbon (C), Silicon (Si), Germanium (Ge), Tin (Sn) and Lead (Pb) |
| | B | Titanium (Ti), Zirconium (Zr), and Hafnium (Hf) |

TABLE II-continued

ELEMENTS PARTICIPATING AS HETEROATOMS IN HETEROPOLYANION COMPLEX ANION REDOX COUPLE MEDIATORS

| GROUP | SUB GROUP | ELEMENT |
|---|---|---|
| V | A | Nitrogen (N), Phosphorous (P), Arsenic (As), Antimony (Sb), and Bismuth (Bi) |
|  | B | Vanadium (V), Niobium (Nb), and Tantalum (Ta) |
| VI | A | Sulfur (S), Selenium (Se), and Tellurium (Te) |
|  | B | Chromium (Cr), Molybdenum (Mo), and Tungsten (W) |
| VII | A | Fluorine (F), Chlorine (Cl), Bromine (Br), and Iodine (I) |
|  | B | Manganese (Mn), Technetium (Tc), and Rhenium (Re) |
| VIII | Period 4 | Iron (Fe), Cobalt (Co), and Nickel (Ni) |
|  | Period 5 | Ruthenium (Ru), Rhodium (Rh), and Palladium (Pd) |
|  | Period 6 | Osmium (Os), Iridium (Ir), and Platinum (Pt) |
| IIIB | Rare Earths | All |

TABLE I

Simple Anion Redox Couples

| GROUP | SUB GROUP | ELEMENT | VALENCE | SPECIES | SPECIFIC REDOX COUPLES |
|---|---|---|---|---|---|
| I | A | None | | | |
|  | B | Copper (Cu) | +2 | $Cu^{-2}$ (cupric) $HCuO_2^-$ (bicuprite) $CuO_2^{-2}$ (cuprite) | +2 Species/ +3, +4 Species; +3 Species/ +4 Species |
|  |  |  | +3 | $Cu^{+3}$ $CuO_2^-$ (cuprate) $Cu_2O_3$ (sesquioxide) | |
|  |  |  | +4 | $CuO_2$ (peroxide) | |
|  |  | Silver (Ag) | +1 | $Ag^+$ (argentous) $AgO^-$ (argentite) | +1 Species/ +2, +3 Species; +2 Species/ +3 Species |
|  |  |  | +2 | $Ag^{-2}$ (argentic) AgO (argentic oxide) | |
|  |  |  | +3 | $AgO^+$ (argentyl) $Ag_2O_3$ (sesquioxide) | |
|  |  | Gold (Au) | +1 | $Au^+$ (aurous) | +1 Species/ +3, +4 Species; +3 Species/ +4 Species |
|  |  |  | +3 | $Au^{+3}$ (auric) $AuO^-$ (auryl) $H_3AuO_3^-$ (auric acid) $H_2AuO_3^-$ (mono-auarate) $HAuO_3^{-2}$ (diaurate) $AuO_3^{-3}$ (triaurate) $Au_2O_3$ (auric oxide) $Au(OH)_3$ (auric hydroxide) | |
|  |  |  | +4 | $AuO_2$ (peroxide) | |
| II | A | Magnesium (Mg) | +2 | $Mg^{+2}$ (magnesic) | +2 Species/ +4 Species |
|  |  |  | +4 | $MgO_2$ (peroxide) | |
|  |  | Calcium (Ca) | +2 | $Ca^{+2}$ | +2 Species/ +4 Species |
|  |  |  | +4 | $CaO_2$ (peroxide) | |
|  |  | Strontium | +2 | $Sr^{+2}$ | +2 Species/ +4 Species |
|  |  |  | +4 | $SrO_2$ (peroxide) | |
|  |  | Barium (Ba) | +2 | $Ba^{+2}$ | +2 Species/ +4 Species |
|  |  |  | +4 | $BaO_2$ (peroxide) | |
| II | B | Zinc (Zn) | +2 | $Zn^{+2}$ (zincic) $ZnOH^+$ (zincyl) $HZnO_2^-$ (bizincate) $ZnO_2^{-2}$ (zincate) | +2 Species/ +4 Species |
|  |  |  | +4 | $ZnO_2$ (peroxide) | |

We claim:

1. A treatment of waste process comprises oxidizing mixed waste by (a) dissolution of transuranic elements plutonium, neptunium, americium, curium, and californium, and/or compounds thereof in transuranic waste (TRUW), low level waste (LLW), low level mixed waste (LLMW), special case waste (SCW), and greater than class C (GTCC) LLW; (b) destruction of non-fluorocarbon organic component in the waste; or (c) decontamination of transuranic/actinide contaminated equipment, further comprising disposing an electrolyte in an electrochemical cell, separating the electrolyte into an anolyte portion and a catholyte portion with an ion-selective membrane, microporous plastic, porous ceramic or glass frit or semi permeable membrane, applying a direct current voltage between the anolyte portion and the catholyte portion, placing the mixed waste and/or transuranic/actinides materials in the anolyte portion, and oxidizing the mixed waste and/or transuranic/actinides materials in the anolyte portion with a mediated electrochemical oxidation (MEO) process, wherein the anolyte portion further comprises a mediator oxidizing species in aqueous solution and containing an acid, neutral or alkaline electrolytes, and wherein the mediator oxidizing species are simple anion redox couples described in Table I as below; Type I isopolyanions complex anion redox couples formed by incorporation of Mo, W, V, Nb, Ta, or mixtures thereof as addenda atoms; Type I heteropolyanions complex anion redox couples formed by incorporation in to Type I isopolyanions as heteroatoms any of the elements listed in Table II either singly or in combination thereof, or heteropolyanions complex anion redox couples containing at least one heteroatom type element contained in both Table I and Table II below or combinations of the mediator oxidizing species from any or all of these generic groups:

TABLE I-continued

Simple Anion Redox Couples

| GROUP | SUB GROUP | ELEMENT | VALENCE | SPECIES | SPECIFIC REDOX COUPLES |
|---|---|---|---|---|---|
| | | Mercury (Hg) | +2 | $Hg^{+2}$ (mercuric) $Hg(OH)_2$ (mercuric hydroxide) $HHgO_2^-$ (mercurate) | +2 Species/ +4 Species |
| | | | +4 | $HgO_2$ (peroxide) | |
| III | A | Boron | +3 | $H_3BO_3$ (orthoboric acid) $H_2BO_3^-$, $HBO_3^{-2}$, $BO_3^{-3}$ (orthoborates) $BO_2^-$ (metaborate) $H_2B_4O_7$ (tetraboric acid) $HB_4O_7^-/B_4O_7^{-2}$ (tetraborates) $B_2O_4^{-2}$ (diborate) $B_6O_{10}^{-2}$ (hexaborate) | +3 Species/ +4.5, +5 Species |
| | | | +4.5 | $B_2O_5^-$ (diborate) | |
| | | | +5 | $BO_3^-/BO_2^- \cdot H_2O$ (perborate) | |
| | | Thallium (Tl) | +1 | $Tl^{+1}$ (thallous) | +1 Species/ +3 or +3.33 Species; +3 Species/ +3.33 Species |
| | | | +3 | $Tl^{+3}$ (thallic) $TlO^+$, $TlOH^{+2}$, $Tl(OH)_2^+$ (thallyl) $Tl_2O_3$ (sesquioxide) $Tl(OH)_3$ (hydroxide) | |
| | | | +3.33 | $Tl_3O_5$ (peroxide) | |
| | B | See Rare Earths and Actinides | | | |
| IV | A | Carbon (C) | +4 | $H_2CO_3$ (carbonic acid) $HCO_3^-$ (bicarbonate) $CO_3^{-2}$ (carbonate) | +4 Species/ +5, +6 Species |
| | | | +5 | $H_2C_2O_6$ (perdicarbonic acid) | |
| | | | +6 | $H_2CO_4$ (permonocarbonic acid) | |
| | | Germanium (Ge) | +4 | $H_2GeO_3$ (germanic acid) $HGeO_3^-$ (bigermaniate) $GeO_3^{-4}$ (germinate) $Ge^{+4}$ (germanic) $GeO_4^{-4}$ $H_2Ge_2O_5$ (digermanic acid) $H_2Ge_4O_9$ (tetragermanic acid) $H_2Ge_5O_{11}$ (pentagermanic acid) $HGe_5O_{11}^-$ (bipentagermanate) | +4 Species/ +6 Species |
| | | | +6 | $Ge_5O_{11}^{-2}$ (pentagermanate) | |
| | | Tin (Sn) | +4 | $Sn^{+4}$ (stannic) $HSnO_3^-$ (bistannate) $SnO_3^{-2}$ (stannate) $SnO_2$ (stannic oxide) $Sn(OH)_4$ (stannic hydroxide) | +4 Species/ +7 Species |
| | | | +7 | $SnO_4^-$ (perstannate) | |
| | | Lead (Pb) | +2 | $Pb^{+2}$ (plumbous) $HPbO_2^-$ (biplumbite) $PbOH^+$ $PbO_2^{-2}$ (plumbite) $PbO$ (plumbus oxide) | +2, +2.67, +3 Species/+4 Species |
| | | | +2.67 | $Pb_2O_4$ (plumbo-plumbic oxide) | |
| | | | +3 | $Pb_2O_3$ (sequioxide) | |
| IV | A | Lead (Pb) | +4 | $Pb^{+4}$ (plumbic) $PbO_3^{-2}$ (metaplumbate) $HPbO_3^-$ (acid metaplumbate) $PbO_4^{-4}$ (orthoplumbate) $PbO_2$ (dioxide) | +2, +2.67, +3 Species/+4 Species |
| IV | B | Titanium | +4 | $TiO^{+2}$ (pertitanyl) $HTiO_4^-$ titanate) $TiO_2$ (dioxide) | +4 Species/ +6 Species |
| | | | +6 | $TiO_2^{+2}$ (pertitanyl) $HTiO_4^-$ (acid pertitanate) | |

TABLE I-continued

Simple Anion Redox Couples

| GROUP | SUB GROUP | ELEMENT | VALENCE | SPECIES | SPECIFIC REDOX COUPLES |
|---|---|---|---|---|---|
| | | | | $TiO_4^{-2}$ (pertitanate) $TiO_3$ (peroxide) | |
| | | Zirconium (Zr) | +4 | $Zr^{+4}$ (zirconic) $ZrO^{+2}$ (zirconyl) $HZrO_3^-$ (zirconate) | +4 Species/+5, +6, +7 Species |
| | | | +5 | $Zr_2O_5$ (pentoxide) | |
| | | | +6 | $ZrO_3$ (peroxide) | |
| | | | +7 | $Zr_2O_7$ (heptoxide) | |
| | | Hafnium (Hf) | +4 | $Hf^{+4}$ (hafnic) $HfO^{+2}$ (hafhyl) | +4 Species/ +6 Species |
| | | | +6 | $HfO_3$ (peroxide) | |
| V | A | Nitrogen | +5 | $HNO_3$ (nitric acid) $NO_3^-$ (nitrate) | +5 species/ +7 Species |
| | | | +7 | $HNO_4$ (pernitric acid) | |
| | | Phosphorus (P) | +5 | $H_3PO_4$ (orthophosphoric acid) $H_2PO_4^-$ (monoorthophosphate) $HPO_4^{-2}$ (diorthophosphate) $PO_4^{-3}$ (triorthophosphate) $HPO_3$ (metaphosphoric acid) $H_4P_2O_7$ (pryophosphoric acid) $H_5P_3O_{10}$ (triphosphoric acid) $H_6P_4O_{13}$ (tetraphosphoric acid) | +5 Species/ +6, +7 species |
| V | A | Phosphorus (P) | +6 | $H_4P_2O_8$ (perphosphoric acid) | +5 Species/ +6, +7 Species |
| | | | +7 | $H_3PO_5$ (monoperphosphoric acid) | |
| V | A | Arsenic (As) | +5 | $H_3AsO_4$ (ortho-arsenic acid) $H_2AsO_4^-$ (mono ortho-arsenate) $HAsO_4^{-2}$ (di-ortho-arsenate) $AsO_4^{-3}$ (tri-ortho-arsenate) | +5 Species/ +7 species |
| | | | +7 | $AsO_2^+$ (arsenyl) $AsO_3^+$ (perarsenyl) | |
| | | Bismuth (Bi) | +3 | $Bi^{+3}$ (bismuthous) $BiOH^{+2}$ (hydroxy-bismuthous) $BiO^+$ (bismuthyl) $BiO_2^-$ (meta-bismuthite) | +3 Species/ +3.5, +4, +5 Species |
| | | | +3.5 | $Bi_4O_7$ (oxide) | |
| | | | +4 | $Bi_2O_4$ (tetroxide) | |
| | | | +5 | $BiO_3^-$ (meta-bismuthite) $Bi_2O_5$ (pentoxide) | |
| | B | Vanadium (V) | +5 | $VO_2^+$ (vanadic) $H_3V_2O_7^-$ (pyro-vanadate) $H_2VO_4^-$ (ortho-vanadate) $VO_3^-$ (meta-vanadate) $HVO_4^{-2}$ (ortho-vanadate) $VO_4^{-3}$ (ortho-vanadate) $V_2O_5$ (pentoxide) $H_4V_2O_7$ (pyrovanadic acid) $HVO_3$ (metavanadic acid) $H_4V_6O_{17}$ (hexavanadic acid) | +5 Species/ +7, +9 Species |
| | | | +7 | $VO_4^-$ (per-vanadate) | |
| | | | +9 | $VO_5^-$ (hyper-vanadate) | |
| V | B | Niobium (Nb) | +5 | $NbO_3^-$ (meta-niobate) $NbO_4^{-3}$ (ortho-niobate) $Nb_2O_5$ (pentoxide) $HNbO_3$ (niobid acid) | +5 Species/+7 species |
| | | | +7 | $NbO_4^-$ (perniobate) $Nb_2O_7$ (perniobic oxide) | |

TABLE I-continued

Simple Anion Redox Couples

| GROUP | SUB GROUP | ELEMENT | VALENCE | SPECIES | SPECIFIC REDOX COUPLES |
|---|---|---|---|---|---|
| | | | | $HNbO_4$ (perniobic acid) | |
| | | Tantalum (Ta) | +5 | $TaO_3^-$ (metatantalate) | +5 species/+7 species |
| | | | | $TaO_4^{-3}$ (orthotanatalate) | |
| | | | | $Ta_2O_5$ (pentoxide) | |
| | | | | $HTaO_3$ (tantalic acid) | |
| | | | +7 | $TaO_4^-$ (pentantalate) | |
| | | | | $Ta_2O_7$ (pertantalate) | |
| | | | | $HTaO_4 \cdot H_2O$ (pertantalic acid) | |
| VI | A | Sulfur (S) | +6 | $H_2SO_4$ (sulfuric acid) | +6 Species/+7, +8 Species |
| | | | | $HSO_4^-$ (bisulfate) | |
| | | | | $SO_4^{-2}$ (sulfate) | |
| | | | +7 | $S_2O_8^{-2}$ (dipersulfate) | |
| | | | +8 | $H_2SO_5$ (momopersulfuric acid) | |
| | | Selenium (Se) | +6 | $H_2Se_2O_4$ (selenic acid) | +6 species/+7 Species |
| | | | | $HSeO_4^-$ (biselenate) | |
| | | | | $SeO_4^{-2}$ (selenate) | |
| | | | +7 | $H_2Se_2O_8$ (perdiselenic acid) | |
| | | Tellurium (Te) | +6 | $H_2TeO_4$ (telluric acid) | +6 species/+7 species |
| | | | | $HTeO_4^-$ (bitellurate) | |
| | | | | $TeO_4^{-2}$ (tellurate) | |
| | | | +7 | $H_2Te_2O_8$ (perditellenic acid) | |
| | | Polonium (Po) | +2 | $Po^{+2}$ (polonous) | +2, +4 species/ +6 Species |
| | | | +4 | $PoO_3^{-2}$ (polonate) | |
| | | | +6 | $PoO_3$ (peroxide) | |
| VI | B | Chromium | +3 | $Cr^{+3}$ (chromic) | +3 Species/+4, +6 Species; +4 Species/ +6 Species |
| | | | | $CrOH^{+2}$, $Cr(OH)_2^+$ (chromyls) | |
| | | | | $CrO_2^-$, $CrO_3^{-3}$ (chromites) | |
| | | | | $Cr_2O_3$ (chromic oxide) | |
| | | | | $Cr(OH)_3$ (chromic hydroxide) | |
| | | | +4 | $CrO_2$ (dioxide) | |
| | | | | $Cr(OH)_4$ (hydroxide) | |
| | | | +6 | $H_2CrO_4$ (chromic acid) | |
| | | | | $HCrO_4^-$ (acid chromate) | |
| | | | | $CrO_4^{-2}$ (chromate) | |
| | | | | $Cr_2O_7^{-2}$ (dichromate) | |
| | | Molybdenum (Mo) | +6 | $HMoO_4^-$ (bimolybhate) | +6 Species/ +7 Species |
| | | | | $MoO_4^{-2}$ (molydbate) | |
| | | | | $MoO_3$ (molybdic trioxide) | |
| | | | | $H_2MoO_4$ (molybolic acid) | |
| | | | +7 | $MoO_4^-$ (permolybdate) | |
| | | Tungsten (W) | +6 | $WO_4^{-2}$ (tungstic) | +6 Species/ +8 Species |
| | | | | $WO_3$ (trioxide) | |
| | | | | $H_2WO_4$ (tungstic acid) | |
| | | | +8 | $WO_5^{-2}$ (pertungstic) | |
| | | | | $H_2WO_5$ (pertungstic acid) | |
| VII | A | Chlorine (Cl) | +1 | $HClO$ (hypochlorous acid) | +1 Species/+3, +5, +7 Species; +3 Species/ +5, +7 Species; +5 Species/ +7 Species |
| | | | | $ClO^-$ (hypochlorite) | |
| | | | +3 | $HClO_2$ (chlorous acid) | |
| | | | | $ClO_2^-$ (chlorite) | |
| | | | +5 | $HClO_3$ (chloric acid) | |
| | | | | $ClO_3^-$ (chlorate) | |
| | | | +7 | $HClO_4$ (perchloric acid) | |
| | | | | $ClO_4^-$, $HClO_5^{-2}$, $ClO_5^{-3}$, $Cl_2O_9^{-4}$ (perchlorates) | |
| VII | A | Bromine (Br) | +1 | $HBrO$ (hypobromous acid) | +1 Species/+3, +5, +7 Species; +3 Species/+5, +7 Species; |

TABLE I-continued

Simple Anion Redox Couples

| GROUP | SUB GROUP | ELEMENT | VALENCE | SPECIES | SPECIFIC REDOX COUPLES |
|---|---|---|---|---|---|
| | | | | $BrO^-$ (hypobromitee) | +5 Species/+7 Species |
| | | | +3 | $HBrO_2$ (bromous acid) $BrO2^-$ (bromite) | |
| | | | +5 | $HBrO_3$ (bromic acid) $BrO_3^-$ (bromate) | |
| | | | +7 | $HBrO_4$ (perbromic acid) $BrO_4^-$, $HBrO_5^{-2}$, $BrO_5^{-3}$, $Br_2O_9^{-4}$ (prebromates) | |
| | | Iodine | +1 | HIO (hypoiodus acid) $IO^-$ (hypoiodite) | +1 Species/+3, +5, +7 Species; +3 Species/+5, +7 Species; +5 Species/+7 Species |
| | | | +3 | $HIO_2$ (iodous acid) $IO_2^-$ (iodite) | |
| | | | +5 | $HIO_3$ (iodic acid) $IO_3^-$ (iodate) | |
| | | | +7 | $HIO_4$ (periodic acid) $IO_4^-$, $HIO_5^{-2}$, $IO_5^{-3}$, $I_2O_9^{-4}$ (periodates) | |
| | B | Manganese (Mn) | +2 | $Mn^{+2}$ (manganeous) $HMnO_2^-$ (dimanganite) | +2 Species/+3, +4, +6, +7 Species; +3 Species/+4, +6, +7 Species; +4 Species/+6, +7 Species; +6 Species/+7 Species |
| | | | +3 | $Mn^{+3}$ (manganic) | |
| | | | +4 | $MnO_2$ (dioxide) | |
| | | | +6 | $MnO_4^{-2}$ (manganate) | |
| | | | +7 | $MnO_4^-$ (permanganate) | |
| VIII | Period 4 | Iron (Fe) | +3 | $Fe^{+3}$ (ferric) $Fe(OH)^{+2}$ $Fe(OH)_2^+$ $FeO_2^{-2}$ (ferrite) | +3 Species/+4, +5, +6 Species; |
| | | | +4 | $FeO^{+2}$ (ferryl) $FeO_2^{-2}$ (perferrite) | +4 Species/+5, +6 Species; +5 Species/+6 Species |
| | | | +5 | $FeO_2^+$ (perferryl) | |
| | | | +6 | $FeO_4^{-2}$ (ferrate) | |

TABLE I-continued

Simple Anion Redox Couples

| GROUP | SUB GROUP | ELEMENT | VALENCE | SPECIES | SPECIFIC REDOX COUPLES |
|---|---|---|---|---|---|
| | | Cobalt (Co) | +2 | $Co^{+2}$ (cobalous) $HCoO_2^-$ (dicobaltite) | +2 Species/+3, +4 Species; +3 Species/+4 Species |
| | | | +3 | $Co^{+3}$ (cobaltic) $Co_2O_3$ (cobaltic oxide) | |
| | | | +4 | $CoO_2$ (peroxide) $H_2CoO_3$ (cobaltic acid) | |
| | | Nickel (Ni) | +2 | $Ni^{+2}$ (nickelous) $NiOH^+$ $HNiO_2^-$ (dinickelite) $NiO_2^{-2}$ (nickelite) | +2 Species/+3, +4, +6 Species; +3 Species/+4, +6 Species; +4 Species/+6 Species |
| | | | +3 | $Ni^{+3}$ (nickelic) $Ni_2O_3$ (nickelic oxide) | |
| | | | +4 | $NiO_2$ (peroxide) | |
| | | | +6 | $NiO_4^{-2}$ (nickelate) | |
| VIII | Period 5 | Ruthenium (Ru) | +2 | $Ru^{+2}$ | +2 Species/+3, +4, +5, +6, +7, +8 Species; +3 Species/+4, +5, +6, +7, +8 Species; +4 Species/+5, +6, +7, +8 Species; +5 Species/+6, +7, +8 Species; +6 Species/+7, +8 Species; +7 Species/+8 Species |
| | | | +3 | $Ru^{+3}$ $Ru_2O_3$ (sesquioxide) $Ru(OH)_2$ (hydroxide) | |
| | | | +4 | $Ru^{+4}$ (ruthenic) $RuO_2$ (ruthenic dioxide) $Ru(OH)_4$ (ruthenic hydroxide) | |
| | | | +5 | $Ru_2O_5$ (pentoxide) | |
| | | | +6 | $RuO_4^{-2}$ (ruthenate) $RuO_2^{+2}$ (ruthenyl) $RuO_3$ (trioxide) | |
| | | | +7 | $RuO_4^-$ (perruthenate) | |
| | | | +8 | $H_2RuO_4$ (hyperuthenic acid) $HRuO_5^-$ (diperruthenate) $RuO_4$ (ruthenium tetroxide) | |
| | | Rhodium (Rh) | +1 | $Rh^+$ (hyporhodous) | +1 Species/+2, +3, +4, +6 Species; |
| | | | +2 | $Rh^{+2}$ (rhodous) | +2 Species/+3, +4, +6 Species; |

TABLE I-continued

Simple Anion Redox Couples

| GROUP | SUB GROUP | ELEMENT | VALENCE | SPECIES | SPECIFIC REDOX COUPLES |
|---|---|---|---|---|---|
| | | | +3 | $Rh^{+3}$ (rhodic) | +3 Species/+4, +6 Species; |
| | | | | $Rh_2O_3$ (sesquioxide) | +4 Species/+6 Species |
| | | | +4 | $RhO_2$ (rhodic oxide) | |
| | | | | $Rh(OH)_4$ (hydroxide) | |
| | | | +6 | $RhO_4^{-2}$ (rhodate) | |
| | | | | $RhO_3$ (trioxide) | |
| | | Palladium | +2 | $Pd^{+2}$ (palladous) | +2 Species/+3, +4, +6 Species; |
| | | | | $PdO_2^{-2}$ (palladite) | +3 Species/+4, +6 Species; |
| | | | +3 | $Pd_2O_3$ (sesquioxide) | +4 Species/+6 Species |
| | | | +4 | $PdO_3^{-2}$ (palladate) | |
| | | | | $PdO_2$ (dioxide) | |
| | | | | $Pd(OH)_4$ (hydroxide) | |
| | | | +6 | $PdO_3$ (peroxide) | |
| VIII | Period 6 | Iridium (Ir) | +3 | $Ir^{+3}$ (iridic) | +3 Species/+4, +6 Species; |
| | | | | $Ir_2O_3$ (iridium sesquioxide) | +4 Species/+6 Species |
| | | | | $Ir(OH)_3$ (iridium hydroxide) | |
| | | | +4 | $IrO_2$ (iridic oxide) | |
| | | | | $Ir(OH)_4$ (iridic hydroxide) | |
| | | | +6 | $IrO_4^{-2}$ (iridate) | |
| | | | | $IrO_3$ (iridium peroxide) | |
| | | Platinum (Pt) | +2 | $Pt^{+2}$ (platinous) | +2, +3 Species/+4, +6 Species; |
| | | | +3 | $Pt_2O_3$ (sesquioxide) | +4 Species/+6 Species |
| | | | +4 | $PtO_3^{-2}$ (palatinate) | |
| | | | | $PtO^{+2}$ (platinyl) | |
| | | | | $Pt(OH)^{+3}$ | |
| | | | | $PtO_2$ (platonic oxide) | |
| | | | +6 | $PtO_4^{-2}$ (Per-platinate) | |
| | | | | $PtO_3$ (perplatinic oxide) | |
| IIIB | Rare earths | Cerium (Ce) | +3 | $Ce^{+3}$ (cerous) | +3 Species/+4, +6 Species; |
| | | | | $Ce_2O_3$ (cerous oxide) | +4 Species/+6 Species |
| | | | | $Ce(OH)_3$ (cerous hydroxide) | |
| | | | +4 | $Ce^{+4}$, $Ce(OH)^{+3}$, $Ce(OH)_2^{+2}$, $Ce(OH)_3^{+}$ (ceric) | |
| | | | | $CeO_2$ (ceric oxide) | |
| | | | +6 | $CeO_3$ (peroxide) | |
| | | Praseodymium (Pr) | +3 | $Pr^{+3}$ (praseodymous) | +3 species/+4 species |
| | | | | $Pr_2O_3$ (sesquioxide) | |
| | | | | $Pr(OH)_3$ (hydroxide) | |
| | | | +4 | $Pr^{+4}$ (praseodymic) | |
| | | | | $PrO_2$ (dioxide) | |
| | | Neodymium | +3 | $Nd^{+3}$ | +3 Species/+4 Species |
| | | | | $Nd_2O_3$ (sesquioxide) | |
| | | | +4 | $NdO_2$ (peroxide) | |
| | | Terbium (Tb) | +3 | $Tb^{+3}$ | +3 Species/+4 Species |
| | | | | $Tb_2O_3$ (sesquioxide) | |
| | | | +4 | $TbO_2$ (peroxide) | |
| IIIB | Actinides | Thorium (Th) | +4 | $Th^{+4}$ (thoric) | +4 Species/+6 Species |
| | | | | $ThO^{+2}$ (thoryl) | |
| | | | | $HThO_3^{-}$ (thorate) | |
| | | | +6 | $ThO_3$ (acid peroxide) | |
| | | Uranium (U) | +6 | $UO_2^{+2}$ (uranyl) | +6 Species/+8 Species |
| | | | | $UO_3$ (uranic oxide) | |
| | | | +8 | $HUO_5^{-}$, $UO_5^{-2}$ (peruranates) | |
| | | | | $UO_4$ (peroxide) | |
| | | Neptunium (Np) | +5 | $NpO_2^{+}$ (hyponeptunyl) | +5 Species/+6, +8 Species; |
| | | | | $Np_2O_5$ (pentoxide) | +6 Species/+8 Species |
| | | | +6 | $NpO_2^{+2}$ (neptunyl) | |
| | | | | $NpO_3$ (trioxide) | |
| | | | +8 | $NpO_4$ (peroxide) | |
| | | Plutonium (Pu) | +3 | $Pu^{+3}$ (hypoplutonous) | +3 Species/+4, +5, +6 Species; |
| | | | +4 | $Pu^{+4}$ (plutonous) | +4 Species/+5, +6 Species; |
| | | | | $PuO_2$ (dioxide) | +5 Species/+6 Species |
| | | | +5 | $PuO_2^{+}$ (hypoplutonyl) | |
| | | | | $Pu_2O_5$ (pentoxide) | |

TABLE I-continued

Simple Anion Redox Couples

| GROUP | SUB GROUP | ELEMENT | VAL-ENCE | SPECIES | SPECIFIC REDOX COUPLES |
|---|---|---|---|---|---|
| | | | +6 | $PuO_2^{+2}$ (plutonyl) $PuO_3$ (peroxide) | |
| | | Americium (Am) | +3 | $Am^{+3}$ (hypo-americicous) | +3 Species/+4, +5, +6 Species; +4 Species/+5, +6 Species; +5 Species/+6 Species |
| | | | +4 | $Am^{+4}$ (americous) $AmO_2$ (dioxide) $Am(OH)_4$ (hydroxide) | |
| | | | +5 | $AmO_2^+$ (hypo-americyl) $Am_2O_5$ (pentoxide) | |
| | | | +6 | $AmO_2^{+2}$ (americyl) $AmO_3$ (peroxide) | |

TABLE II

Elements Participating as Heteroatoms in Heteropolyanion Complex Anion Redox Couple Mediators

| GROUP | SUB GROUP | ELEMENT |
|---|---|---|
| I | A | Lithium (Li), Sodium (Na), Potassium (K), and Cesium (Cs) |
| | B | Copper (Cu), Silver (As), and Gold (Au) |
| II | A | Beryllium (Be), Magnesium (Mg), Calcium (Ca), Strontium (Sr), and Barium (Ba) |
| | B | Zinc (Zn), Cadmium (Cd), and Mercury (Hg) |
| III | A | Boron (B), and Aluminum (Al) |
| | B | Scandium (Sc), and Yttrium (Y) - (See Rare Earths) |
| IV | A | Carbon (C), Silicon (Si), Germanium (Ge), Tin (Sn) and Lead (Pb) |
| | B | Titanium (Ti), Zirconium (Zr), and Hafnium (Hf) |
| V | A | Nitrogen (N), Phosphorous (P), Arsenic (As), Antimony (Sb), and Bismuth (Bi) |
| | B | Vanadium (V), Niobium (Nb), and Tantalum (Ta) |
| VI | A | Sulfur (S), Selenium (Se), and Tellurium (Te) |
| | B | Chromium (Cr), Molybdenum (Mo), and Tungsten (W) |
| VII | A | Fluorine (F), Chlorine (Cl), Bromine (Br), and Iodine (I) |
| | B | Manganese (Mn), Technetium (Tc), and Rhenium (Re) |
| VIII | Period 4 | Iron (Fe), Cobalt (Co), and Nickel (Ni) |
| | Period 5 | Ruthenium (Ru), Rhodium (Rh), and Palladium (Pd) |
| | Period 6 | Osmium (Os), Iridium (Ir), and Platinum (Pt) |
| IIIB | Rare Earths. | All |

2. The process of claim 1, further comprising adding stabilizing compounds to the electrolyte for overcoming and stabilizing the short lifetime of oxidized forms of higher oxidation state species of the mediator oxidizing species.

3. The process of claim 1, wherein the mediator oxidizing species are super oxidizers which exhibit oxidation potentials of at least 1.7 volts at 1 molar, 25° C. and pH 1 and which are redox couple species that have the capability of producing free radicals of hydroxyl or perhydroxyl, and further comprising creating free radical secondary oxidizers by reacting the super oxidizers with water, adding energy from an energy source, ultra sonic and/or ultraviolet, to the anolyte portion and augmenting the secondary oxidation processes, breaking down hydrogen peroxide in the anolyte portion into hydroxyl free radicals, and increasing an oxidizing effect of the secondary oxidation processes, and further comprising generating inorganic free radicals in aqueous solutions from carbonate, azide, nitrite, nitrate, phosphite, phosphate, sulfite, sulfate, selenite, thiocyanate, chloride, bromide, iodide, and formate oxidizing species.

4. The process of claim 1, further comprising using an alkaline solution, aiding decomposing of the biological materials in mixed waste derived from base promoted ester hydrolysis, saponification, of fatty acids, and forming water soluble alkali metal salts of the fatty acids and glycerin in a process similar to the production of soap from animal fat by introducing it into a hot aqueous lye solution.

5. The process of claim 1, further comprising using an alkaline anolyte solution for absorbing $CO_2$ from the oxidizing of mixed waste materials and forming bicarbonate/carbonate solutions, which subsequently circulate through the electrochemical cell, producing percarbonate oxidizers.

6. The process of claim 1, further comprising impressing an AC voltage upon the direct current voltage for retarding formation of cell performance limiting surface films on the electrodes or the membrane.

7. The process of claim 1, further comprising introducing an ultrasonic energy into the anolyte portion, rupturing cell membranes in the biological materials in mixed waste by momentarily raising local temperature and pressure within the cell membranes with the ultrasonic energy to above several thousand degrees and thousand atmospheres, and causing cell membrane failure, and wherein the added energy comprises using ultrasonic energy and inducing microscopic bubble expansion and implosion for reducing in size individual second phase mixed waste volumes dispersed in the anolyte.

8. The process of claim 1, further comprising introducing ultraviolet energy into the anolyte portion and decomposing hydrogen peroxide into hydroxyl free radicals therein, thereby increasing efficiency of the process by converting product of electron consuming parasitic reactions, hydrogen peroxide, into viable free radical secondary oxidizers without consumption of additional electrons.

9. The process of claim 1, further comprising adding a surfactant to the anolyte portion for promoting dispersion of the mixed waste or intermediate stage reaction products within the aqueous solution when the mixed waste or reaction products are not water-soluble and tend to form immiscible layers.

10. The process of claim 1, further comprising attacking specific organic molecules in the mixed waste with the mediator oxidizing species while operating at a sufficiently low temperatures and preventing formation of dioxins and furans.

11. The process of claim 1, further comprising breaking down the mixed waste materials into biological and organic compounds and attacking these compounds using as the mediator simple and/or complex anion redox couple mediators or inorganic free radicals and generating organic free radicals.

12. The process of claim 1, further comprising raising normal valence state mediator anions to a higher valence state by stripping the mediator anions of electrons in the electrochemical cell, wherein oxidized forms of weaker redox couples present in the mediator oxidizing species are produced by similar anodic oxidation or reaction with oxidized forms of stronger redox couples present and the oxidized species of the redox couples oxidize molecules of the mixed waste and are themselves converted to their reduced form, whereupon they are oxidized by the aforementioned mechanisms and the redox cycle continues.

13. The process of claim 1, further comprising using the mediator oxidizing species that are found in situ in the mixed waste to be decomposed, by circulating the mixed waste-anolyte mixture through the electrochemical cell wherein an oxidized form of an in situ reversible redox couple is formed by anodic oxidizing or reacting with an oxidized form of a more powerful redox couple added to or already present in the anolyte portion and anodically oxidized in the electrochemical cell, thereby destroying biological and organic materials in the mixed waste.

14. The process of claim 1, further comprising using an alkaline electrolyte selected from a group consisting of NaOH or KOH and combinations thereof, with the mediator oxidizing species, wherein a reduced form of a mediator redox couple has sufficient solubility in said electrolyte for allowing desired oxidation of biological and organic materials in the mixed waste.

15. The process of claim 1, wherein the oxidation potential of redox reactions of the mediator oxidizing species and the biological and organic molecules in the mixed waste producing hydrogen ions are inversely proportional to electrolyte pH, and thus with a selection of a mediator redox couple increasing the electrolyte pH reduces the electric potential required, thereby reducing electric power consumed per unit mass of the mixed waste destroyed.

16. The process of claim 1, wherein the electrolyte is an aqueous solution chosen from acids, alkalines and salt electrolytes.

17. The process of claim 1, further comprising interchanging the mediator oxidizing species without changing equipment, and wherein the anolyte and catholyte portions of electrolyte are independent of one another and comprise aqueous solutions of acids, alkali or salts.

18. The process of claim 1, wherein the oxidizing and destroying mixed waste materials comprises oxidizing and destroying a combination of liquids and solids in mixed waste.

19. The process of claim 1, further comprising requiring removing and treating precipitates resulting from combinations of the oxidizing species and other species released from the mixed waste during destruction and sterilization.

20. The process of claim 1, further comprising separating a catholyte portion of the electrolyte from the anolyte portion with a membrane, operating the electrochemical cell at a higher current density across the membrane, and near a limit over which there is the possibility that metallic anions may leak through the membrane in small quantities, and recovering the metallic anions through a resin column, thus allowing a greater rate of destruction of mixed waste materials in the anolyte portion.

21. The process of claim 1, wherein the catholyte portion further comprises an aqueous solution and the electrolyte in the solution is composed of acids, alkali or neutral, and further comprising adding oxygen to the solution when $HNO_3$ or $NO_3^-$ can occur in the catholyte portion, controlling concentration of electrolyte in the catholyte to maintain conductivity of the catholyte portion desired in the electrochemical cell, providing mechanical mixing and/or ultrasonic energy induced microscopic bubble formation, and implosion for vigorous mixing in the catholyte solution for oxidizing the nitrous acid and small amounts of nitrogen oxides $NO_x$, introducing air into the catholyte portion for promoting the oxidizing of the nitrous acid and the small amounts of $NO_x$, and diluting any hydrogen produced in the catholyte portion before releasing the air and hydrogen.

22. The process of claim 1, further comprising additives disposed in the electrolyte for contributing to kinetics of the mediated electrochemical processes while keeping it from becoming directly involved in the oxidizing of the mixed waste materials, and stabilizer compounds disposed in the electrolyte for stabilizing higher oxidation state species of oxidized forms of the reversible redox couples used as the mediator oxidizing species in the electrolyte.

23. The process of claim 1, further comprising placing the system in a standby mode during the day and adding mixed waste as it is generated throughout the day, placing the system in full activation during non-business hours, operating the system at low temperature and ambient atmospheric pressure and not generating toxic compounds during the oxidation of the mixed waste, making the process indoors compatible, scaling the system between units small enough for use by a single practitioner and units large enough for replacing hospital incinerators, releasing $CO_2$ oxidation product from the anolyte system out through the $CO_2$ vent, and venting off-gas products from the catholyte reservoir through the atmospheric vent.

* * * * *